(12) United States Patent
Barnes et al.

(10) Patent No.: US 10,664,967 B2
(45) Date of Patent: May 26, 2020

(54) METHODS, SYSTEMS, AND APPARATUSES FOR QUANTITATIVE ANALYSIS OF HETEROGENEOUS BIOMARKER DISTRIBUTION

(71) Applicants: Ventana Medical Systems, Inc., Tucson, AZ (US); OREGON HEALTH & SCIENCE UNIVERSITY, Portland, OR (US)

(72) Inventors: Michael Barnes, Oro Valley, AZ (US); David Chafin, Tucson, AZ (US); Karl Garsha, Sahuarita, AZ (US); Thomas M. Grogan, Tucson, AZ (US); Esteban Roberts, Tucson, AZ (US); Benjamin Stevens, Oro Valley, AZ (US); Franklin Ventura, Tucson, AZ (US); Christophe Chefd'hotel, Sunnyvale, CA (US); Kandavel Shanmugam, Chandler, AZ (US); Joe Gray, Lake Oswego, AZ (US); Damien Ramunno-Johnson, Vancouver, WA (US); Tania Vu, Portland, OR (US); Brian J. Druker, Portland, OR (US); Thomas Jacob, Beaverton, OR (US)

(73) Assignees: VENTANA MEDICAL SYSTEMS, INC., Tucson, AZ (US); OREGON HELATH & SCIENCE UNIVERSITY, Portland, OR (US)

( * ) Notice: Subject to any disclaimer, the term of this patent is extended or adjusted under 35 U.S.C. 154(b) by 269 days.

(21) Appl. No.: 15/606,122

(22) Filed: May 26, 2017

(65) Prior Publication Data
US 2017/0262984 A1    Sep. 14, 2017

Related U.S. Application Data

(63) Continuation of application No. PCT/EP2015/078532, filed on Dec. 3, 2015.
(Continued)

(51) Int. Cl.
*G06T 7/00* (2017.01)
*G06T 7/11* (2017.01)
(Continued)

(52) U.S. Cl.
CPC ........ *G06T 7/0012* (2013.01); *G06K 9/00147* (2013.01); *G06T 7/11* (2017.01);
(Continued)

(58) Field of Classification Search
CPC ............. G06K 9/0014; G06K 9/00147; G06K 9/00127; G06T 7/0012; G01N 21/64
See application file for complete search history.

(56) References Cited

U.S. PATENT DOCUMENTS

2014/0153841 A1* 6/2014 Tatsuzawa .............. G06T 5/003
382/263

OTHER PUBLICATIONS

Mean shift, Wikipedia: the free encyclopedia, Nov. 22, 2013, https://en.wikipedia.org/w/index.php?title=Mean_shift&oldid= 582844116 (Year: 2013).*
(Continued)

*Primary Examiner* — Vincent Rudolph
*Assistant Examiner* — Raphael Schwartz
(74) *Attorney, Agent, or Firm* — Charney IP Law LLC; Thomas M. Finetti

(57) ABSTRACT

Methods, systems, and apparatuses for detecting and describing heterogeneity in a cell sample are disclosed herein. A plurality of fields of view (FOV) are generated for one or more areas of interest (AOI) within an image of the cell sample are generated. Hyperspectral or multispectral
(Continued)

data from each FOV is organized into an image stack containing one or more z-layers, with each z-layer containing intensity data for a single marker at each pixel in the FOV. A cluster analysis is applied to the image stacks, wherein the clustering algorithm groups pixels having a similar ratio of detectable marker intensity across layers of the z-axis, thereby generating a plurality of clusters having similar expression patterns.

20 Claims, 27 Drawing Sheets

Related U.S. Application Data

(60) Provisional application No. 62/086,840, filed on Dec. 3, 2014.

(51) Int. Cl.
*G06K 9/00* (2006.01)
*G06T 7/90* (2017.01)
*G06K 9/62* (2006.01)
*G06K 9/32* (2006.01)
*G06K 9/46* (2006.01)

(52) U.S. Cl.
CPC .............. *G06T 7/90* (2017.01); *G06K 9/3233* (2013.01); *G06K 9/4652* (2013.01); *G06K 9/6222* (2013.01); *G06K 9/6226* (2013.01); *G06T 2207/10036* (2013.01); *G06T 2207/10056* (2013.01); *G06T 2207/10064* (2013.01); *G06T 2207/20032* (2013.01); *G06T 2207/20104* (2013.01); *G06T 2207/20152* (2013.01); *G06T 2207/30024* (2013.01); *G06T 2207/30096* (2013.01)

(56) References Cited

OTHER PUBLICATIONS

Phase-contrast imaging, Wikipedia: the free encyclopedia, Jul. 8, 2013, https://en.wikipedia.org/w/index.php?title=Phase-contrast_imaging&oldid=563366973 (Year: 2013).*

Qian, Yu, et al. "Elucidation of seventeen human peripheral blood B-cell . . . " Cytometry Part B: Clinical Cytometry 78.S1 (2010): S69-S82. (Year: 2010).*

Gerdes, Michael J., et al. "Highly multiplexed single-cell analysis of formalin-fixed, paraffin-embedded cancer tissue." Proceedings of the National Academy of Sciences 110.29 (2013): 11982-11987. (Year: 2013).*

International Search Report and Written Opinion, dated Feb. 23, 2016.

Levenson, R. et al., "Spectral imaging in preclinical research and clinical pathology", Journal of Analytical Cellular Pathology, vol. 35, pp. 339-361, 2012.

Moles Lopez, X. et al., "Clustering Methods Applied in the Detection of Ki67 Hot-Spots in Whole Tumor Slide Images: An Efficient Way to Characterize Heterogeneous Tissue-Based Biomarkers", Cytometry Part A, No. 9, pp. 765-775, 2012.

Chen, Y. et al., "Automated 5-0 analysis of cell migration and interaction in the thymic cortex from time-lapse sequences of 3-0 multi-channel multi-photon images", J. Immunological Methods, vol. 340, No. 1, pp. 65-80, 2009.

* cited by examiner

| Tumor ID | Mutation | Function markers |
|---|---|---|
| 1-CA3 | PIK3CA E545K | ER+, PR+, HER2-, Ki67 (8%), PTEN+ |
| 2-CA1 | None detected | ER+, PR-, HER2-, Ki67(15%), PTEN+ |
| 3-CA1 | AKT1 | ER+, PR+, HER2-, Ki67(80%), PTEN+ |
| 4-CA2 | None detected | ER-, PR-, HER2-, Ki67(95%), PTEN- |
| 5-CA3 | PIK3CA, TP53 H1047R, R248W | ER-, PR-, HER2+, Ki67(100%), PTEN Eq |

Tissue images
Tumor 2-CA1
Phosphopathway maps
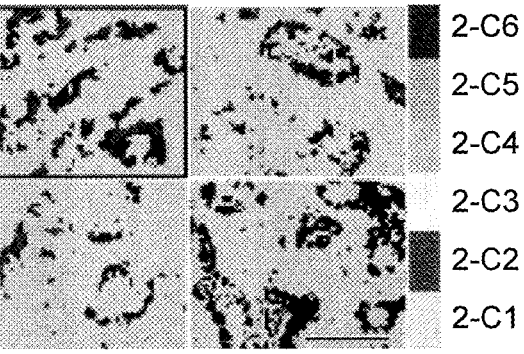
2-C6
2-C5
2-C4
2-C3
2-C2
2-C1
Tumor 3-CA1
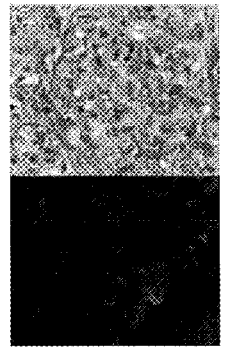
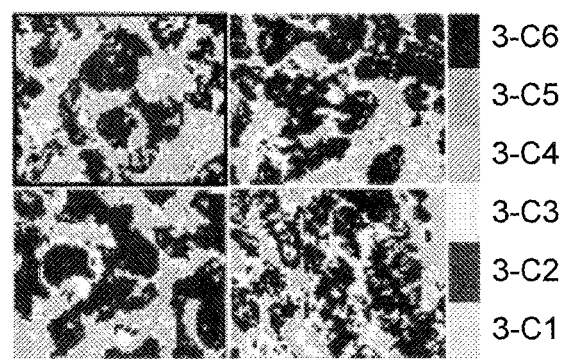
3-C6
3-C5
3-C4
3-C3
3-C2
3-C1
Tumor 4–CA2
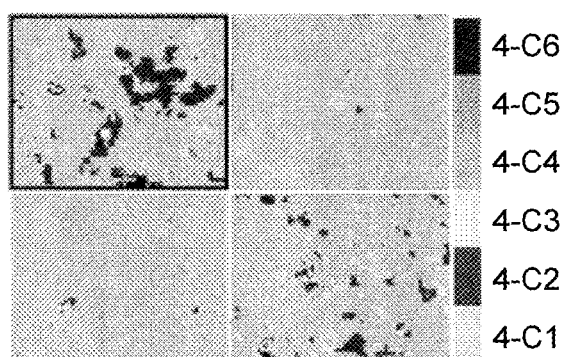
4-C6
4-C5
4-C4
4-C3
4-C2
4-C1
Tumor 5–CA3
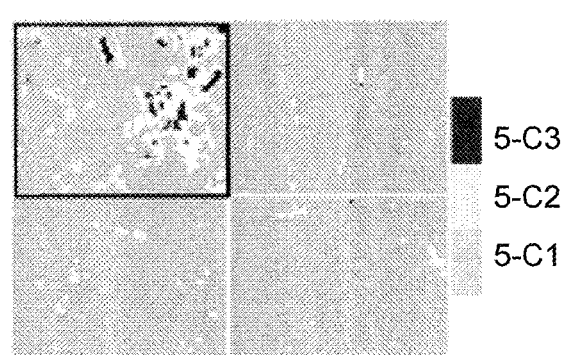
5-C3
5-C2
5-C1
FIG. 19A    FIG. 19B

METHODS, SYSTEMS, AND APPARATUSES FOR QUANTITATIVE ANALYSIS OF HETEROGENEOUS BIOMARKER DISTRIBUTION

CROSS-REFERENCE TO RELATED APPLICATIONS

This patent application is a continuation of International Patent Application No. PCT/EP2015/078532 filed Dec. 3, 2015, which claims priority to and the benefit of U.S. Provisional Application No. 62/086,840, filed Dec. 3, 2014. Each of the above patent applications are hereby incorporated by reference herein in their entireties.

BACKGROUND OF THE INVENTION

Field of the Invention

The present disclosure relates to the field of automated image acquisition and analysis, particularly as applied to microscopic evaluation of diseases.

Description of Related Art

Historically available technology for evaluating tissue has permitted routine evaluation of only single genetic or protein expression/activation biomarkers in isolation. It has become clear that these valuable single biomarkers do not provide a complete picture. Sequencing technologies and biochemical measurements of protein expression and activation have focused on homogenized tissue samples and in such cases the spatial context of the expression pattern or genetic change is lost. Though the information gained through biochemical assay and sequencing technology is useful, there still remain important gaps in the information content, and an incomplete understanding of the expression and activation patterns of cells within a tumor results from the averaging of protein content from many cells.

Recent research now indicates there is important information that is missed by conventional assay technologies. One such situation is the presence of multiple genetic rearrangements or aberrations in a tumor, and the realization that if the different rearrangements occur in the same cells they can have a cooperative effect (Zong et al. 2009, Goldstein et al. 2010). Genetic inter tumor and intra tumor heterogeneity has been reported and such heterogeneity is thought to contribute to treatment failure and drug resistance in treatment (Gerlinger et al. 2012, Marusyk et al. 2012). It is therefore important to recognize not just that a tumor has multiple genetic rearrangements or deletions, but also whether these occur in the same cells, different cells or a combination of situations (Svensson, et al. 2011). Phenotypic heterogeneity and protein expression signatures have also been shown to be an important consideration in evaluating biomarkers in tumor tissue (Yap et al. 2012, Marusyk et al. 2012).

Phenotypic heterogeneity may arise from genetic or epigenetic causes, and is thought to contribute to drug resistance, and relapse of cancer growth.

The ability to characterize multiple biomarkers in tissue, and to measure heterogeneity of the presence and levels of said biomarkers within and between tissues, thus will provide important information for understanding and characterizing a variety of disease states. Additionally, the ability to discern and measure the areas in tissue that have different distributions of key biomarkers may provide important information to inform development of targeted and combination therapies.

Others have attempted to analyze expression heterogeneity using different clustering methods and alternative multiplexing schemes (Gerdes et al. 2013, Qian, et al. 2010). The hierarchical clustering approach requires significant assumptions to be made. Knowing the distance between points that determines where to draw the boundary to form a new cluster is a key parameter for hierarchical clustering algorithms. Alternatively, some hierarchical algorithms (such as Ward's method (Ward 1963)) require entry of the number of clusters as a parameter. However, cut-off thresholds (distance) and number of expected clusters are both parameters that are often unknown. Additionally, some algorithms enforce assumptions about even cluster size (e.g. k-means), distance between points that are members of different clusters (hierarchical clustering) or assumptions about the expected number of clusters to be found (hierarchical clustering, k-means). Though widely used, hierarchical methods are better suited to variables measured on a discontinuous scale (e.g. +, ++, +++, ++++). For this reason, hierarchical clustering algorithms are not ideal for the requirements of expression heterogeneity analysis. Alternative density-based tools such as FLOCK (Qian, et al. 2010) have limitations in that parameters for size of hyper-regions used to calculate density and density cut-off thresholds must be estimated and entered to the algorithm to enable cluster determination.

Recently, tools such as SPADE (Qiu et al, 2012, Giesen et al. 2014) and viSNE (El-ad et al. 2013) are used for mapping hierarchical relationships between clusters of cells with high-dimensionality multiparametric expression patterns. The emphasis of such tools is to map similarity relationships between expression patterns and, in this sense, provides a different and complimentary window into the nature of multiparameter expression heterogeneity. The tools such as SPADE and viSNE were developed in the context of cytometry and place greater emphasis on mapping relationships between cell populations in high-dimensional space to visualize and classify populations outside of the context of the spatial location of expression patterns in tissue. In this sense, SPADE and viSNE represent mapping tools rather than clustering tools.

To date, we are unaware of any systems or methods that sufficiently identify clusters of heterogeneity of expression, localization, and/or activation of biomolecules within the original spatial context of cell and tissue samples.

In a multiplex slide of a tissue specimen, different nuclei and tissue structures are simultaneously stained with specific biomarker-specific stains, which can be either chromogenic or fluorescent dyes, each of which has a distinct spectral signature, in terms of spectral shape and spread. The spectral signatures of different biomarkers can be either broad or narrow spectral banded and spectrally overlap. A slide containing a specimen, for example an oncology specimen, stained with some combination of dyes is imaged using a multi-spectral imaging system. Each channel image corresponds to a spectral band. The multi-spectral image stack produced by the imaging system is therefore a mixture of the underlying component biomarker expressions, which, in some instances, may be co-localized. More recently, quantum dots are widely used in immunofluorescence staining for the biomarkers of interest due to their intense and stable fluorescence.

Identifying the individual constituent stains for the biomarkers and the proportions they appear in the mixture is a fundamental challenge that is solved using a spectral unmixing operation. Spectral unmixing decomposes each pixel of the multi-spectral image into a collection of constituent spectrum end members or components, and the fractions of their intensity contributions in the multi-spectral image from each of them. An example spectral unmixing method is a non-negative linear least squares operation commonly used both in fluorescent and brightfield microscopy. WO 2015/101507 (PCT/EP2014/078392) and WO 2015/124772 (PCT/EP2015/053745) which are incorporated herein by reference in their entirety disclose various unmixing methods for unmixing a multichannel image (also referred to as multispectral image).

BRIEF SUMMARY OF THE INVENTION

Provided herein are methods of detecting and describing heterogeneity in a cell sample comprising at least one analyte labelled with a detectable marker, said methods comprising analyzing an image of the cell sample on a computer apparatus comprising a computer processor programmed to apply a cluster analysis to a dataset obtained from the image of the cell sample to create a cluster map comprising a plurality of clusters of expression patterns, wherein:
  (a) the dataset comprises an image stack for each of a plurality of fields of view (FOV) within one or more areas of interest (AOI) of the cell sample, wherein the image stack comprises a x-axis, a y-axis, and a z-axis, wherein the x-axis and the y-axis represent spatial coordinates within the field; and the z-axis comprises one or more layers, wherein each layer of the z axis comprises intensity data for a single detectable marker at a plurality of x,y coordinates; and
  (b) the cluster analysis comprises applying an unsupervised, non-parametric, density-based clustering algorithm to the image stacks, wherein the clustering algorithm groups x,y coordinates with other x,y coordinates having a similar ratio of detectable marker intensity across layers of the z-axis, thereby generating the plurality of clusters having similar expression patterns.

A 'cell sample' as understood herein is any biological tissue sample, such as a surgical specimen that is obtained from a human or animal body for anatomic pathology. The cell sample may be a prostate tissue sample, a breast tissue sample, a colon tissue sample or a tissue sample obtained from another organ or body region.

A 'multi-spectral' or 'multi-channel' pixel as understood herein encompasses a pixel contained in a digital image obtained from a biological cell sample in which different nuclei and tissue structures are simultaneously stained with specific dyes.

A 'multi-channel image' or 'multi-spectral' image as understood herein encompasses an image that is composed of multi-spectral or multi-channel pixels. A single channel image is obtained for each of the channels of the multi-channel image by means of an unmixing method.

In an embodiment, the density based clustering algorithm is a Mean-Shift clustering algorithm In another embodiment, the dataset of the foregoing methods is obtained by a method comprising:
  (a1) calculating a FOV sampling grid (which optionally comprises a plurality of FOVs at regularly spaced intervals across the AOI) for each of a plurality of AOI within the image;
  (a2) automatically collecting multi-spectral data and/or hyper-spectral data at single or multiple z-planes in each FOV (which optionally may be automatically saved in a nested data structure or data base with metadata attributes, said metadata attributes comprising patient, assay, biopsy, section, AOI position, and/or FOV position);
  (a3) computationally segmenting detectable marker signals from the multi-spectral data and/or hyper-spectral data;
  (a4) selecting FOVs to be compared as a group in the cluster analysis into a dataset structure, wherein, optionally,
    (a4a) the FOVs selected to be compared as a group correspond to different tumor foci in the same tissue section or
    (a4b) the FOV are grouped on the basis of a biopsy taken from the same patient for comparison to a different biopsy taken from the same patient; or
    (a4c) FOVs are grouped on the basis of tumor location; or
    (a4d) FOVs are grouped based on the patient for comparison to another patient; or
    (a4e) FOVs are grouped on the basis of tumor genotype; and
  (a5) applying automatic morphological feature segmentation to each detectable marker signal of each FOV in the data set, said feature segmentation optionally being based on size constraints, intensity constraints, or a combination of size constraints and intensity constraints.

In another embodiment, the method for obtaining said dataset of the foregoing methods further comprises:
  (a6) manually designating regions in one or more FOVs to include or exclude from the cluster analysis.

In another embodiment, the detectable marker of the foregoing methods generates a signal that is separable from other markers and tissue on basis of spectral or other physical characteristics when co-localized, and quantifiable. In an embodiment, the detectable marker is attached to an antibody or an antigen-binding fragment thereof. In an exemplary embodiment, the detectable label is attached to at least one antibody that specifically binds to at least one phosphorylated protein (such as, for example, a member of PI-3 kinase signal transduction pathway or MAP kinase signal transduction pathway). In a further embodiment, the cell sample that is labeled with the anti-phospho antibody is a tissue that was fixed using a two-temperature fixation.

Also provided herein are methods of characterizing a tumor according to physiological state of a signal transduction pathway in the tumor, the methods comprising analyzing an image of a sample of the tumor according to the foregoing methods, wherein:
  two or more analytes are labeled with the detectable marker;
  at least one of the analytes labeled with a detectable marker is a phosphorylated signal transduction protein; and
  hyperspectral or multispectral data is collected at single or multiple z-planes in each FOV for the image.

Also provided herein are systems for automatically identifying heterogeneity in a cell sample is provided, the systems comprising:
  (a) an analytical imaging analysis system comprising:
    a processor; and
    a memory coupled to the processor, the memory to store computer-executable instructions that, when executed by the processor, cause the processor to perform operations comprising any of the foregoing methods; and, optionally, (b) an analytical imaging hardware system adapted to capture a digitized image of the cell sample and multi-spectral data and/or hyper-spectral data from the cell sample and to communicate the digitized image to the analytical imaging analysis system; and, optionally, (c) a relational database.

In an exemplary embodiment, the foregoing system may further comprising a slide containing a cell sample in which one or more analytes of interest is labeled with a detectable label. In a further embodiment, the cell sample is a formalin-fixed paraffin embedded tissue sample that has been preserved using a two-temperature fixation, and said detectable label is attached to at least one antibody that specifically binds to at least one phosphorylated protein.

Also provided herein are non-transitory computer readable storage media for storing computer-executable instructions that are executed by a processor to perform operations, the operations comprising any of the foregoing methods.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 19A-19D: MTIP Reveals Heterogeneous Spatial Distribution of PI3K network signaling in breast tumors. a) Representative H&E image and corresponding spectral data for the pAKT 473 channel shows morpohlgical context of cluster map outlined in black in panel b. b) cluster maps show the unique phosphoexpression patterns, which are color coded. Cluster maps generated by applying mean shift cluster analysis algorithm on the phosphomarker intensities of 8 ROIs/patient (4 representative ROIs showns). Scale bar is 80 µm in a and b. c) Cluster plots show the quantitative measurements of 6 phosphomarker intensities in each cluster. 3 representative cluster plots are shown for each patient. The area of tissue occupied by each phosphomarker in clusters 2-C1, 2-C2, 2-C6 are 85.1%, 4.09%, 10.66%; in clusters 3-C1, 3-C2, 3-C5 are 26.6%, 54.6%, 1.43%; in clusters 4-C1, 4-C2,4-C5 are 93.9% 3.89%, 1.43%, and in clusters 5-C1, 5-C2, 5C3 are 96.6%, 3%, and 0.36% respectively. d) Dendrogram shows the hierarchal distribution of the network signaling clusters for the five example breast tumors (FIG. 4a) and reveals a scattered grouping of clusters of similar genotpype. Clusters having area less than 1% of the largest cluster are not included in the dendrogram analysis. Each cluster name is represented by the tumor identifier numbers, followed by cluster number C1, C2, C3 etc. WT is wild type, and C is the control, which is FFPE specimen stained in the absence of primary antibodies. Clusters with PIK3CA and AKT1 mutations, and WT and C are color-coded.

DETAILED DESCRIPTION OF THE INVENTION

I. Abbreviations and Definitions

Figure 1:
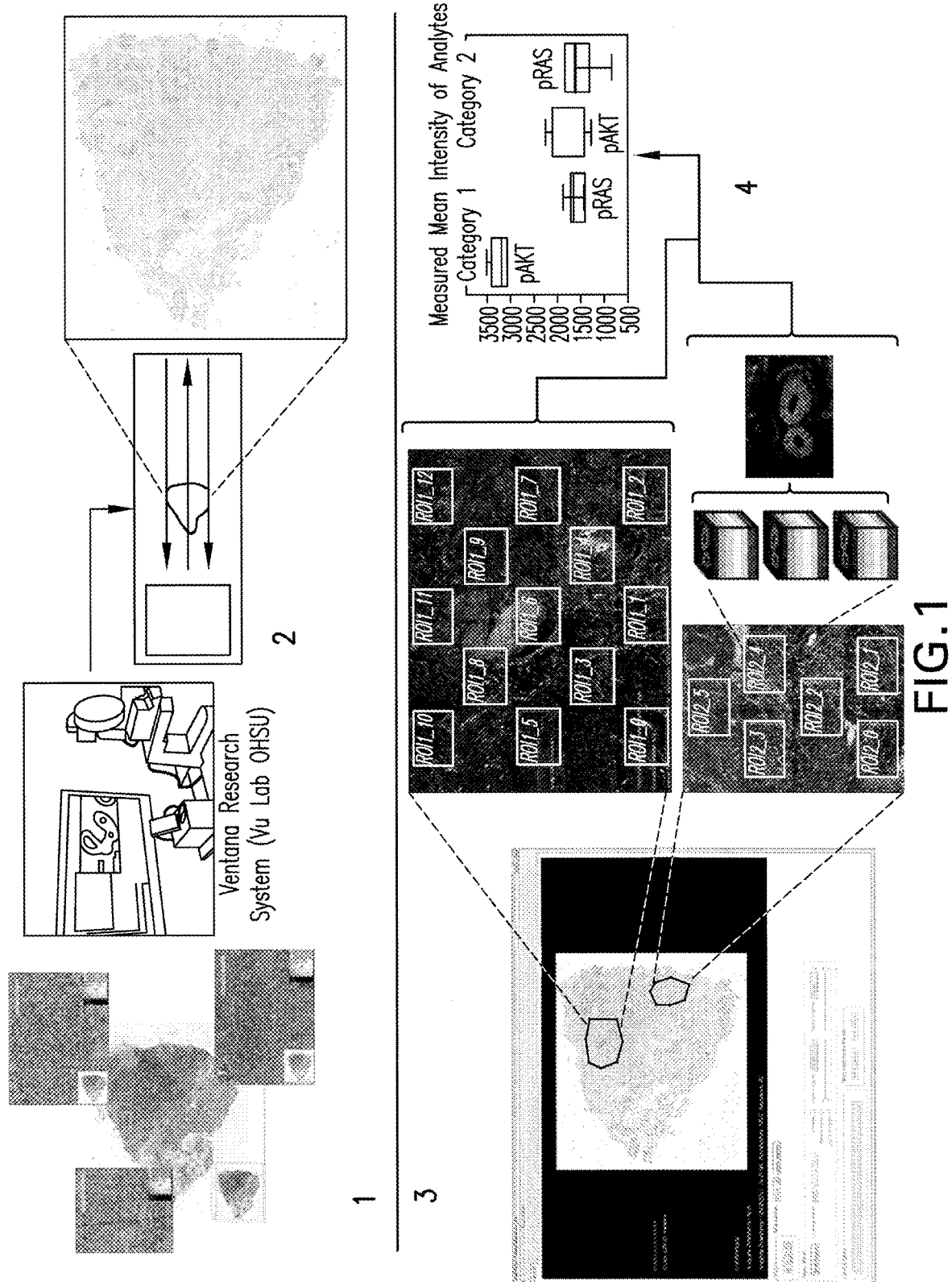
FIG. 1: Diagram of the Basic workflow for digitization, visualization and annotation of tissue anatomy (1,2,3), followed by collection of spectral datasets in annotated fields of view (4), followed by computational quantitative analysis of the multiplexed marker levels (4).

In order to facilitate review of the various examples of this disclosure, the following explanations of abbreviations and specific terms are provided:

CISH: Chromogenic in situ hybridization.
CRC: colorectal cancer
FFPE tissue: Formalin-fixed, paraffin-embedded tissue.
FISH: Fluorescent in situ hybridization.
H&E: Hematoxylin and eosin staining.
IHC: Immunohistochemistry.
ISH: In situ hybridization.
NBF: neutral buffered formalin solution.
NSCLC: non-small cell lung cancer
PI3Ks: phosphatidylinositol 3-kinases. Also referred to as Phosphatidylinositol-4,5-bisphosphate 3-kinase, phosphatidylinositide 3-kinases, PI 3-kinases, PI(3)Ks, and PI-3Ks.
TNBC: triple negative breast cancer
Analyte: A molecule or group of molecules that are to be specifically detected in a sample.
Analyte-binding entity: Anything that is capable of specifically binding to an analyte. Examples of analyte-binding entities include: antibodies and antibody fragments (including single chain antibodies), which bind to target antigens; t-cell receptors (including single chain receptors), which bind to MHC:antigen complexes; MHC: peptide multimers (which bind to specific T-cell receptors); aptamers, which bind to specific nucleic acid or peptide targets; zinc fingers, which bind to specific nucleic acids, peptides, and other molecules; receptor complexes (including single chain receptors and chimeric receptors), which bind to receptor ligands; receptor ligands, which bind to receptor complexes; and nucleic acid probes, which hybridize to specific nucleic acids.

Antibody: The term "antibody" herein is used in the broadest sense and encompasses various antibody structures, including but not limited to monoclonal antibodies, polyclonal antibodies, multispecific antibodies (e.g., bispecific antibodies), and antibody fragments so long as they exhibit the desired antigen-binding activity.

Antibody fragment: A molecule other than an intact antibody that comprises a portion of an intact antibody that binds the antigen to which the intact antibody binds. Examples of antibody fragments include but are not limited to Fv, Fab, ab', ab'-SH, F(ab')2; diabodies; linear antibodies; single-chain antibody molecules (e.g. scFv); and multispecific antibodies formed from antibody fragments.

Anti-phospho-antibody: An antibody or antibody fragment that binds to a phosphorylated protein or amino acid residue, but not to a non-phosphorylated version of the same protein or amino acid residue. Examples of anti-phospho antibodies include:

antibodies specific for a specific phosphorylated amino acid residue, such as phosphorylated histidine (anti-phospho-His), phosphorylated serine (anti-phospho-Ser), phosphorylated threonine (anti-phospho-Thr), and phosphorylated tyrosine (anti-phospho-Tyr); and antibodies specific for a particular antigen containing a phosphorylated amino acid, e.g. Akt phosphorylated at serine 473 (anti-phospho-Akt (Ser473)); PI3

Antigen: A compound, composition, or substance that may be specifically bound by the products of specific humoral or cellular immunity, such as an antibody molecule or T-cell receptor. Antigens can be any type of molecule including, for example, haptens, simple intermediary metabolites, sugars (e.g., oligosaccharides), lipids, and hormones as well as macromolecules such as complex carbohydrates (e.g., polysaccharides), phospholipids, nucleic acids and proteins. Common categories of antigens include, but are not limited to, viral antigens, bacterial antigens, fungal antigens, protozoa and other parasitic antigens, tumor antigens, antigens involved in autoimmune disease, allergy and graft rejection, toxins, and other miscellaneous antigens. In one example, an antigen is a Bacillus antigen, such as yPGA.

Peptide: The term "peptide" is intended to encompass any arrangement of two or more amino acids joined together by amide bonds, including oligopeptides and polypeptides. When the amino acids are alpha-amino acids, either the L-optical isomer or the D-optical isomer can be used.

Oligopeptide: A peptide from 2 to 20 amino acids in length.

Polypeptide: A peptide longer than 20 amino acids in length. The terms "polypeptide" or "protein" as used herein are intended to encompass any amino acid sequence and include modified sequences such as glycoproteins.

Post-translational modification: A chemical modification of a protein after its translation. It is one of the later steps in protein biosynthesis, and thus gene expression, for many proteins. The post-translational modification of amino acids extends the range of functions of the protein by attaching it to other biochemical functional groups (such as acetate, phosphate, various lipids and carbohydrates), changing the chemical nature of an amino acid (e.g. citrullination), or making structural changes (e.g. formation of disulfide bridges). Also, enzymes may remove amino acids from the amino end of the protein, or cut the peptide chain in the middle. For instance, the peptide hormone insulin is cut twice after disulfide bonds are formed, and a pro-peptide is removed from the middle of the chain; the resulting protein consists of two polypeptide chains connected by disulfide bonds. Also, most nascent polypeptides start with the amino acid methionine because the "start" codon on mRNA also codes for this amino acid. This amino acid is usually taken off during post-translational modification. Other modifications, like phosphorylation, are part of common mechanisms for controlling the behavior of a protein, for instance activating or inactivating an enzyme.

Sample: A biological specimen obtained from a subject containing genomic DNA, RNA (including mRNA), protein, or combinations thereof. Examples include, but are not limited to, peripheral blood, urine, saliva, tissue biopsy, surgical specimen, amniocentesis samples and autopsy material.

Specific binding: Specific binding occurs when an entity binds to a molecule in a sample to the substantial exclusion of binding to other molecules. For example, an entity may be considered to specifically bind to a given molecule when it has a binding constant that is at least $10^3$ $M^{-1}$ greater, $10^4$ $M^{-1}$ greater or $10^5$ $M^{-1}$ greater than a binding constant for other molecules in the sample.

Two-temperature fixation: As used herein, the term "two-temperature fixation" refers to a fixation protocol using an aldehyde-based fixative in which the tissue sample is first immersed in an aldehyde-based fixative at a cold temperature for a sufficient period of time to allow the fixative to diffuse throughout the tissue without substantially fixing the tissue sample, and then immersed in an aldehyde-based fixative at a high temperature for a sufficient period of time to allow the aldehyde to fix the tissue sample.

Pixel: A regularly spaced coordinate within a 2-dimensional grid pattern that is associated with a numerical value that represents the signal intensity of the sample at that coordinate.

II. Introduction

The ability to characterize multiple biomarkers in tumor tissue, and to measure heterogeneity of the presence and levels of said biomarkers within tumor tissues and between tumor tissues, will provide important information for the appropriate selection of available targeted therapeutics to a patient's disease state. The development and selection of appropriate combination therapies may further be an important factor in preventing relapse, and the ability to discern and measure the areas in tissue that have different distributions of key biomarkers will provide important information to determine combination therapy.

Figure 2:
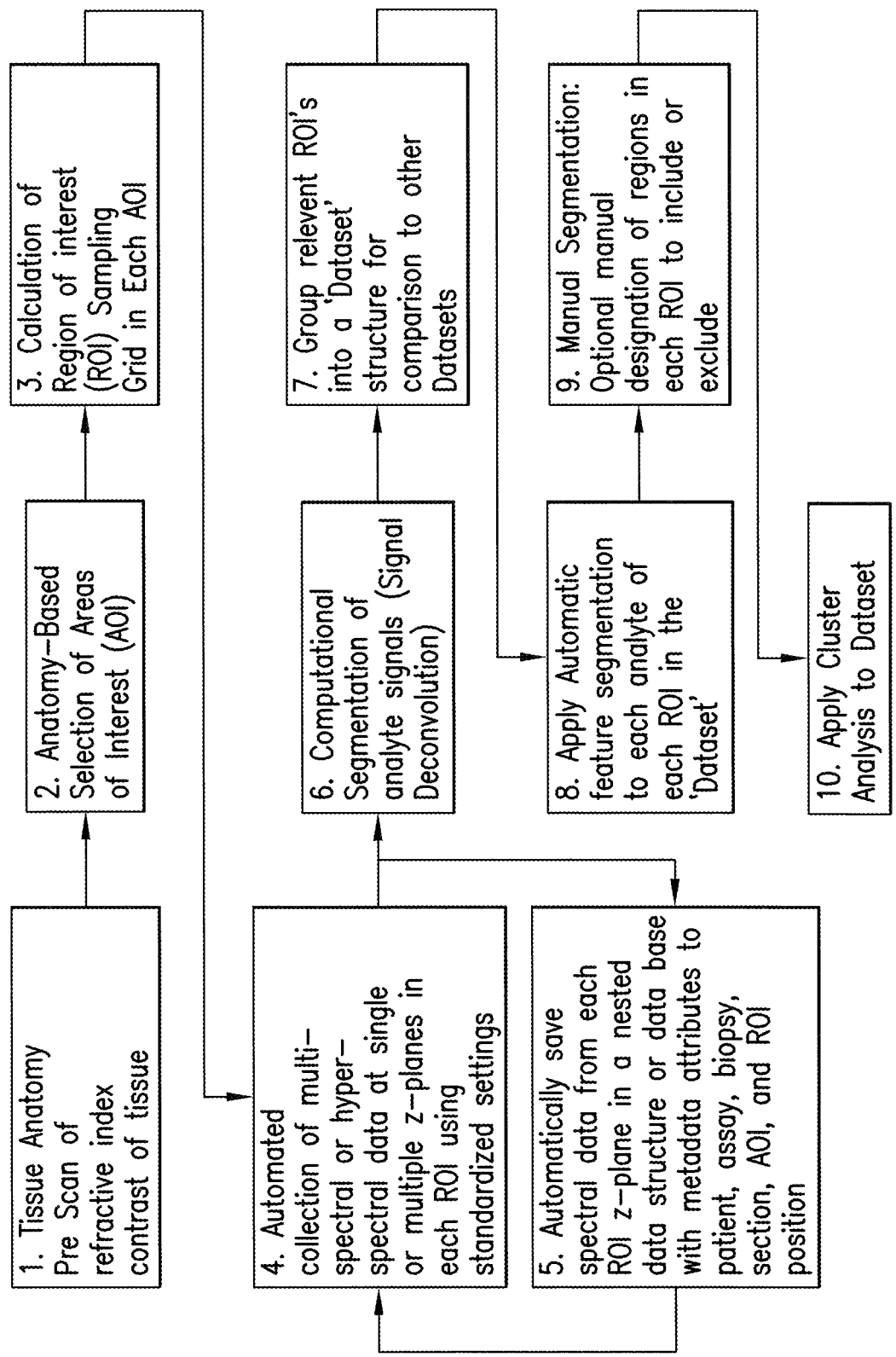
FIG. 2: Major steps in an exemplary workflow for heterogeneity analysis.

As illustrated at FIG. 1, the basic workflow rests on digitization, visualization and annotation of the cell sample, followed by collection of spectral datasets in annotated fields of view, followed by computational quantitative analysis of the marker levels. An exemplary workflow applicable to tissue samples is displayed at FIG. 2. The present disclosure relates to new methods of data acquisition and analysis for quantitative microscopy that extend a quantitative multiplexing platform to yield important information pertaining to phenotypic heterogeneity of biomarkers. We have combined new methods and instrumentation to enable a workflow that permits measurement of biomarker levels and heterogeneity over large anatomic areas in clinical samples as well as cell line and tissue arrays.

III. Sample

Before the present methods and systems can be used, a sample that is detectably labeled for analytes of interest must be generated. In principle, the present methods and systems can be used with any type of cell sample that can be labelled and imaged. Exemplary samples include: tissue sections, such as those generated from formalin-fixed paraffin embedded tissue samples or cryopreserved tissue blocks; cell smears, such as cervical smears; and cell suspensions, such as those fixed to slides using, for example, a CYTOSPIN centrifuge.

Samples should generally be processed in a manner that will preserve the molecular details to be evaluated. Thus, for example, where at least one of the biomarkers is to be measured by immunohistochemistry, fixatives and fixation protocols that eliminate the antigenicity of analytes to be detected should be avoided. For example, where one of the analytes to be detected is a post-translationally modified protein (such as a phosphorylated protein), the samples should be processed so that changes to the pattern of post-translational modifications is minimized. Exemplary processing methods to minimize or eliminate such changes to post-translational modifications are disclosed in, for example, US 2012-0214195 A1, WO 2008-073187 A2, WO 2008-073187 A2, and Lawson et al.

In one particular embodiment, the sample contains or is suspected of containing a phosphorylated protein, and the sample is fixed in an aldehyde-based fixative (such as formaldehyde, glutaraldehyde, glyoxal, and acrolein) using a two-temperature fixation.

The first step of a two-temperature fixation is to subject a tissue sample to high-concentration aldehyde-based under conditions effective to allow substantially complete diffusion of the composition throughout substantially the entire cross section of the sample. An effective temperature range for the first step is from greater than −20° C. to at least 15° C., preferably greater than 0° C. to an upper temperature more typically about 10° C., and even more typically from about 1° C. to about 7° C. For working embodiments, the temperature typically was about 4° C. The time period for the first processing step ranges from about 15 minutes up to about 4 hours, most typically from greater than 15 minutes to about 3 hours, with good results typically being obtained by conducting the fixative composition diffusion step for about 1.5 hours to about 2 hours. Although increasing the diffusion time to 4 hours or greater generally had little beneficial effect, leaving tissues in the cold formalin for an extended period of time (for example, up to 14 days) generally does not have a deleterious effect on processing. For particularly thick tissues, or samples that are particularly sensitive to loss of post-translational modifications, higher aldehyde concentrations in the first step can increase the rate of diffusion into the sample. Thus, for example, the first step of the two-temperature fixation uses from at least 10% formalin to about 50% formalin.

The second step of a two-temperature fixation immerses the tissue in a high temperature aldehyde-based fixative solution for a period of time sufficient to allow cross-linking to occur at as fast a rate as possible without compromising tissue morphology or antigenicity of analytes contained therein. The temperature associated with the second step typically is higher than ambient, such as higher than about 22° C. For working embodiments, the temperature typically is greater than ambient up to at least 55° C., more typically from about 35° C. to about 45° C., as this temperature range increases the cross-linking kinetics sufficiently to allow relatively quick tissue cross-linking. However, if the temperature is increased above about 50° C., the sample generally begins to degrade, which may have a deleterious effect on certain subsequent histological reactions. Thus, the upper temperature and time period are selected to allow subsequent imaging process steps, such as in situ hybridization, IHC and/or H & E, to proceed effectively. The time period for the second processing step ranges from greater than 15 minutes up to at least about 5 hours, more typically is at least about 1 hour to about 4 hours, and more typically is from about 2 hours to about 3 hours. In certain embodiments, the second processing step is conducted for 1.5 hours at 45° C.

More detail about two-temperature fixation can be found in US 2012-0214195 A1 (incorporated herein by reference in its entirety).

It should be emphasized, however, that the present methods and systems are compatible with any sample that is susceptible to methods of labeling analytes of interest in cells, including immunohistochemistry, in situ hybridization, and methods of staining/labeling for morphology (such as H&E staining).

The samples can be visualized so that the analytes of interest can be detected—and preferably quantified. Any method of labeling samples or contrast generation can be used, including for example immunohistochemical methods, in situ hybridization methods (such as FISH and CISH), genetically encoded reporters (e.g. GFP, YFP, CFP), or constitutively fluorescent moeties.

In an embodiment, the sample is labeled by contacting the sample with an analyte-binding entity under conditions sufficient to permit specific binding of the analyte-binding entity to the analyte of interest. The analyte-binding entity is labeled with a detectable label, which may be attached directly to the analyte-binding entity (such as by covalent attachment) or may be applied by contacting the sample with a detectably-labeled second entity specific for the analyte-binding entity. Preferably, the detectable labels are separable from other markers and tissue on basis of spectral or other physical characteristics when co-localized, and quantifiable in the sense that there exists a consistent relationship between the amount of signal measured and the amount of contrast agent present in a pixel. The dynamic range of the label may be an important factor for resolving small changes in marker levels. The dynamic range of a label describes the smallest increase or decrease in intensity that can be reliably determined to reflect a change in the target molecule level in the sample; dynamic range is a figure of merit that is limited by the combined noise of the labeling system and imaging system. If the dynamic range is small, the difference between the smallest quantity that can be reliably measured and the largest quantity that can be reliably measured is also small. Thus, relatively small changes in marker levels become difficult or impossible to discern. A high dynamic range means there is a large difference between the largest value that can be measured and the smallest value that can be measured. Small changes, relative to the brightest values, can therefore be reliably measured. It is preferred to use detectable labels that have a relatively high dynamic range. Exemplary detectable labels that meet these parameters include semiconductor nanocrystals (quantum dots); organic fluorescent markers such as FITC, TRITC, CY3, CY3.5, Texas Red, CY 5, Fluorescein, polymeric dyes (such as those disclosed in U.S. Pat. No. 8,354,239; chromophores; light absorbing stains; and chemiluminescent markers such as luciferin.

In one exemplary embodiment, a labeling scheme is used in which a primary antibody specific for the analyte comprises one or more specific haptens. A detectably-labeled secondary antibody specific for the specific hapten can then be used to detectably label the primary antibody. A large variety of different hapten-secondary antibody pairs exist, thereby permitting more extensive multiplexing of analytes and detectable signals than traditional primary-secondary antibody pairings. Moreover, because multiple hapten copies can be attached to each primary antibody, signal amplification can be greatly enhanced compared to traditional primary-secondary antibody pairings. Exemplary hapten-antibody combinations are disclosed at, for example, U.S. Pat. Nos. 7,695,929, 8,618,265, and WO 2008-063378, the contents of each of which are incorporated herein by reference.

Figure 3:
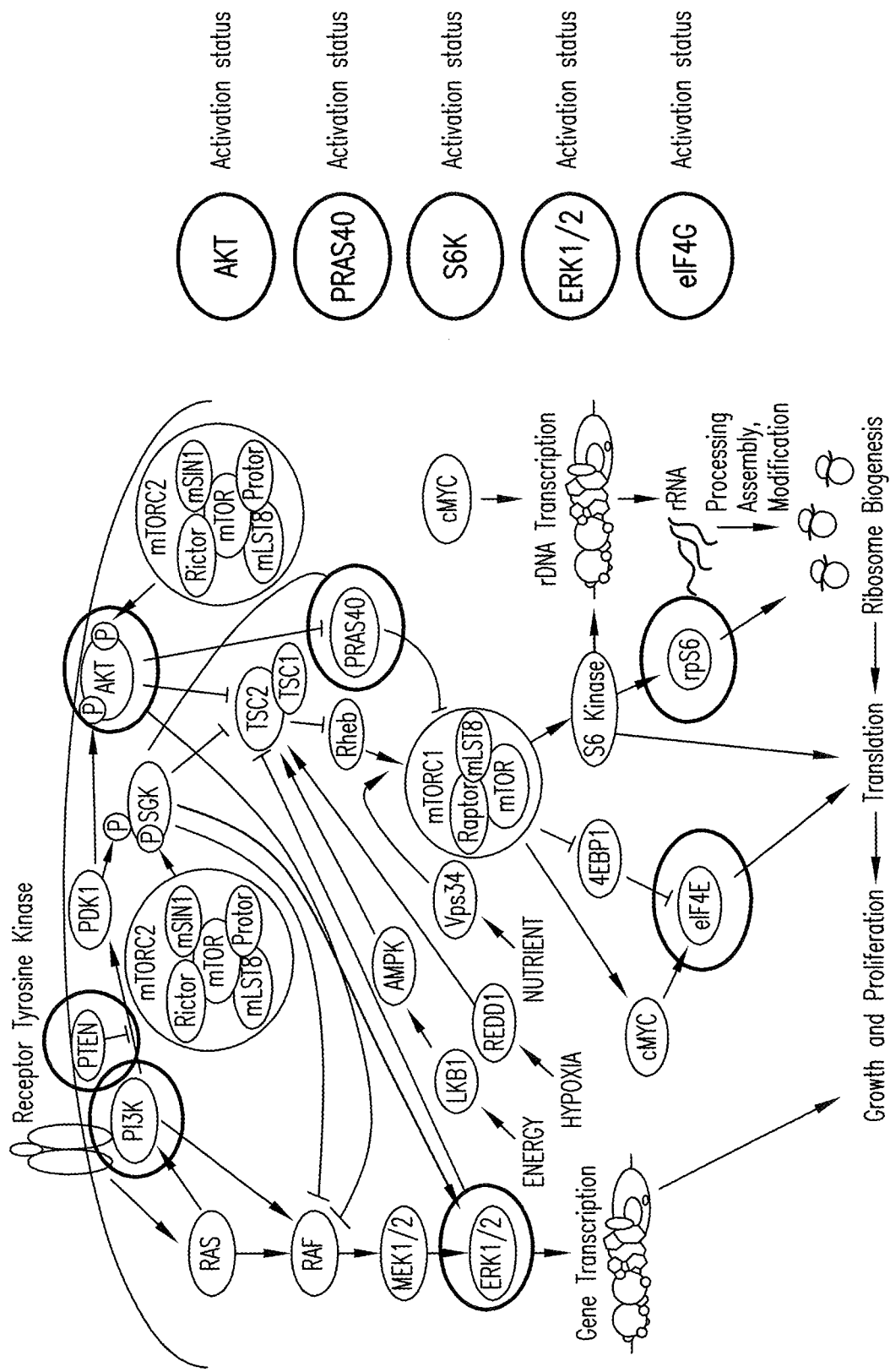
FIG. 3: Illustration of the PI3K/AKT/mTOR and Ras/MAPK Pathways. Circled proteins indicate targets chosen for an exemplary study as described in the Examples.
Figure 12:
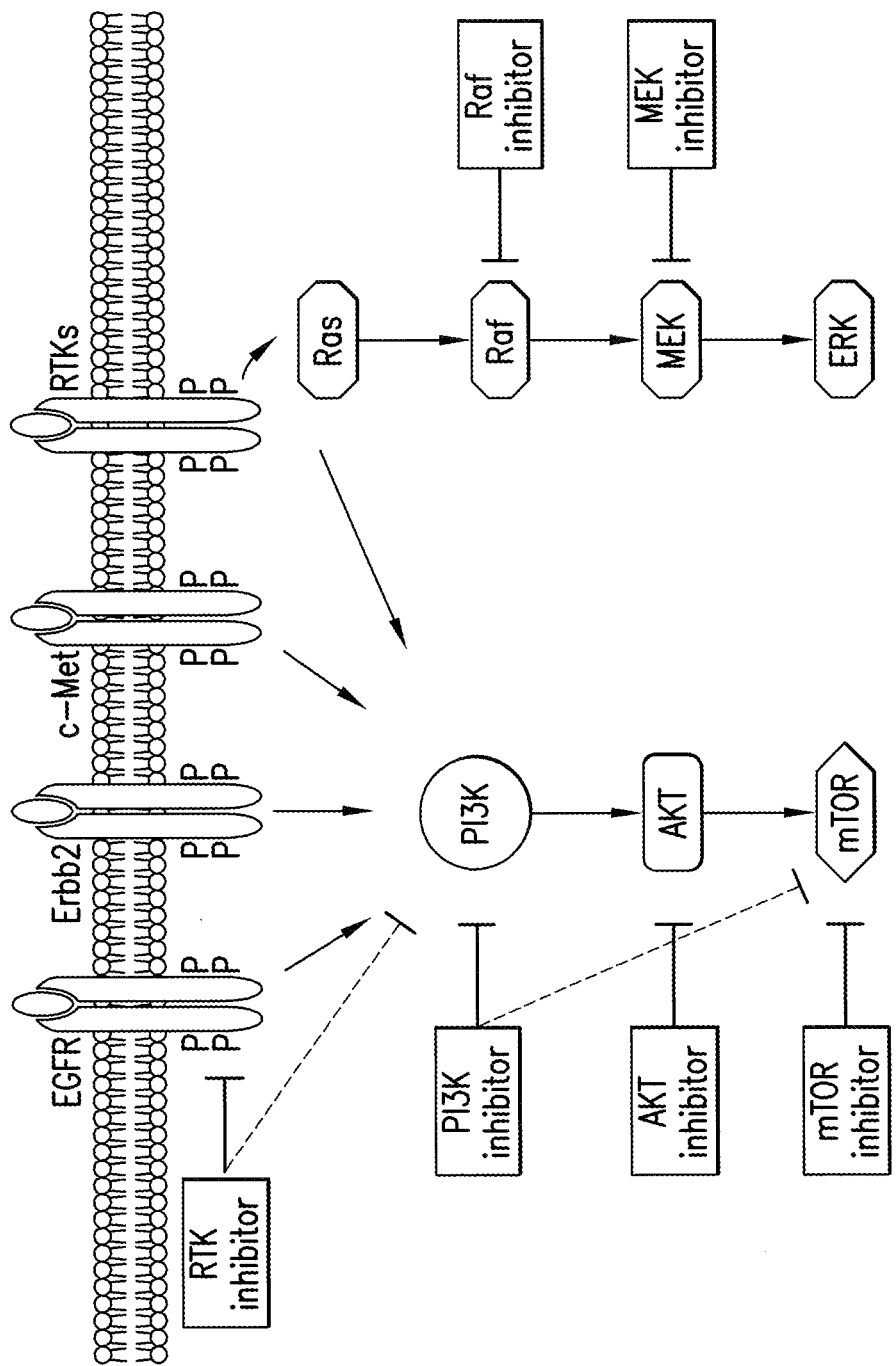
FIG. 12: Illustration of the MAP-kinase and PI-3 Kinase pathways.
Figure 13:
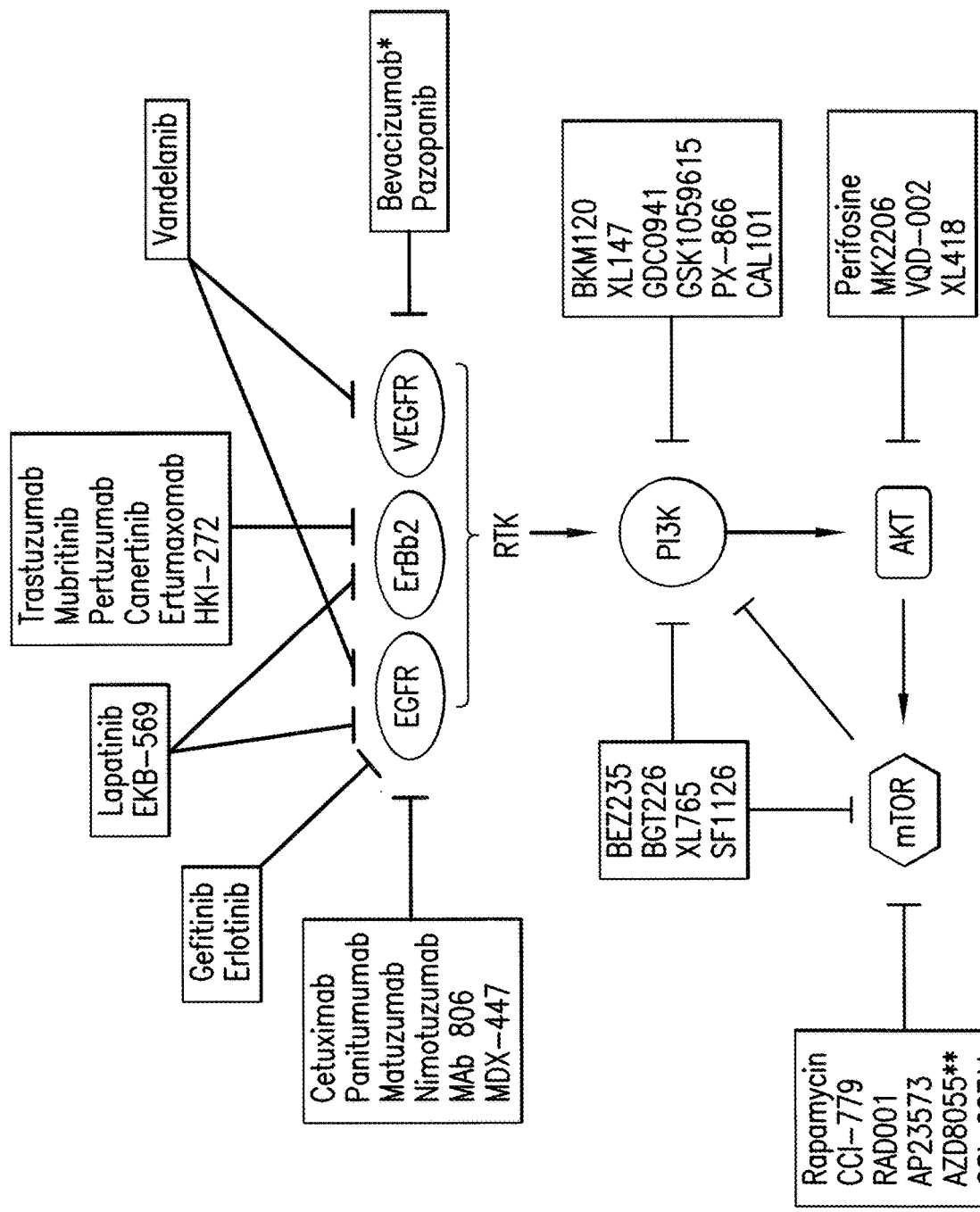
FIG. 13: Illustration of the PI-3 Kinase pathway and associated kinase inhibitors.

One particular application of the present methods and systems is in evaluating heterogeneity in activation of signal transduction pathways, such as kinase cascades. Therefore, in an embodiment, the sample is labeled with a plurality of analyte-binding entities, wherein one or more of the analyte binding entities bind specifically to a phosphorylated protein, such as an anti-phospho-antibody or an antibody fragment thereof. In an embodiment, the anti-phospho antibody is anti-phospho-His, anti-phospho-Ser, anti-phospho-Thr, or anti-phospho-Tyr. This embodiment is particularly useful for determining overall levels of phosphorylation. In another embodiment, the anti-phospho-antibody is specific for a specific phosphorylated protein. This embodiment is especially useful for determining heterogeneity in a given kinase cascade pathway or group of such pathways. For example, the anti-phospho-antibody may be specific for a phosphorylated target involved in the PI3K/AKT/mTOR pathway or the Ras/MAPK Pathway. These pathways are illustrated at FIGS. 3, 12, and 13. In an embodiment, the detectable label associated with the anti-phospho antibody is a semiconductor fluorescent nanoparticle (such as a QUANTUM DOT), the signal of which is detected with hyperspectral imaging. Semiconductor fluorescent nanoparticles exhibit intense and stable bright emission intensity, which can be harnessed to overcome the limitations of fluorescent and light-based dyes in traditional IC assays (Watson et al, 2003; Bruchez et al, 2005; Michalet, X, et al, 2005). Semiconductor fluorescent nanoparticles already surpass traditional assays: 1) Semiconductor fluorescent nanoparticles have enhanced sensitivity; they are capable of detecting single and small numbers of protein molecules, 2) the bright and discrete emission of semiconductor fluorescent nanoparticles can be used to more accurately quantify protein levels in tissue, and 3) multiple colored semiconductor fluorescent nanoparticles can be used to simultaneously identify multiple protein populations in cells and tissues (Fichter, et al. 2010; Scholl et al, 2009; Sundara Raj an et al, 2006).

IV. Image Acquisition and Annotation

The present methods and systems are applied to an image of the labeled tissue containing data regarding the identity, location, and intensity of each analyte of interest. Therefore, a digital image containing the morphological features of the cell sample is captured and optionally annotated for areas of interest (AOIs), and then multi-spectral data and/or hyperspectral data is captured regarding the identity, location, and intensity of each detectable label associated with each analyte of interest is captured from the AOIs. An example of a basic workflow for this analysis A. Image Acquisition A morphological image is first captured and then annotated to identify one or more areas of interest (AOI) to be evaluated for heterogeneity.

One type of morphological image that is useful is a refractive index contrast image. The refractive index of the tissue can be used to render tissue anatomy in sufficient resolution to identify anatomic landmarks and areas of interest to be interrogated using analytical imaging methods. An overview of the tissue anatomy is provided by tiling many fields of view captured at a magnification, which permits selection of AOIs for further interrogation. By using transmitted illumination and contrast based on the refractive and scattering properties of the tissue, an image analogous to the eosin stain can be rendered, which may optionally be compared to an actual H&E stained serial section for confirmation of pathology. The use of transmitted illumination in the near-IR ensures that photodamage to the tissue, counterstains or reporters is minimized while also permitting bright enough illumination to permit fast exposures for efficient production of the scanned image. Alternatives to using refractive contrast are the use of tissue autofluorescence or fluorescent stains to highlight the tissue structure, and designation of AOIs on a serial section image that has been registered with the fluorescent tissue section. In some instances, a technician may simply find anatomic landmarks on the fluorescent tissue section directly through eyepieces, and confirm the morphology on an H&E serial section viewed on a separate microscope equipped for brightfield.

B. Image Annotation

1. Area of Interest Annotation

Once the morphological image is collected, it is annotated by a skilled user (such as a physician or pathologist) to select one or more AOIs for further interrogation. The boundaries of the AOIs are translated by the computer into stage coordinates. In an embodiment, the AOI may correspond to the entire image, or it may be limited to a certain portion of the image, for example, a portion of the image having certain morphological characteristics. Various criteria may be used to annotate the image, for instance, the annotation may be based on medical training to recognize anatomic structures such as glands or cell types such as epithelial, or the distinction may be based on the differentiation of tumor vs. stroma. The annotation may be automated using machine recognition of texture features, morphometric properties of segmented cells, data from serial sections registered to the section being viewed, or a combination of these methods. In one embodiment, the one or more AOIs are selected on the basis of tissue anatomy.

In an embodiment, a special viewer is used to annotate the morphological image of the tissue. In exemplary software the tissue section may be imaged using refractive contrast and rendered either in black and white as a darkfield image or by using a color lookup table that provides color contrast similar in appearance to eosin viewed under transmitted illumination. The software permits zooming and panning of the tissue section such that anatomic features can be visualized with sufficient detail to permit recognition of relevant morphology. In some cases the overview scan may be registered with images of stained serial sections acquired in brightfield or the overview scan may be acquired in multiple color channels, such as a DAPI channel and refractive contrast channel providing a 2 color image of nuclear counterstain combined with the tissue anatomy. The software user interface provides drawing tools that enable a technician to demarcate the AOIs that are to be imaged at higher resolution for multiplexed markers. The software provides means of saving these AOIs as files along with the image such that the image and AOIs may be reloaded and edited and also provides means of translating the coordinates of the AOIs from the coordinate system of the image to the coordinate system of the stage upon which the actual slide is placed. The software also provides means of designating fiducials on the tissue image such that an AOI file from one section may be registered to a different serial section by manually or automatically recognizing the homologous features on the serial section.

2. Field of View Annotation

The AOI is subdivided into multiple FOVs to generate an FOV sampling grid. The FOV sampling grid is generated in order to have a set of representative regions within the image that can be compared against one another. Therefore, the FOVs should be distributed across the AOI in a manner that captures a representative sample of relevant regions for analysis within the AOI.

Figure 4:
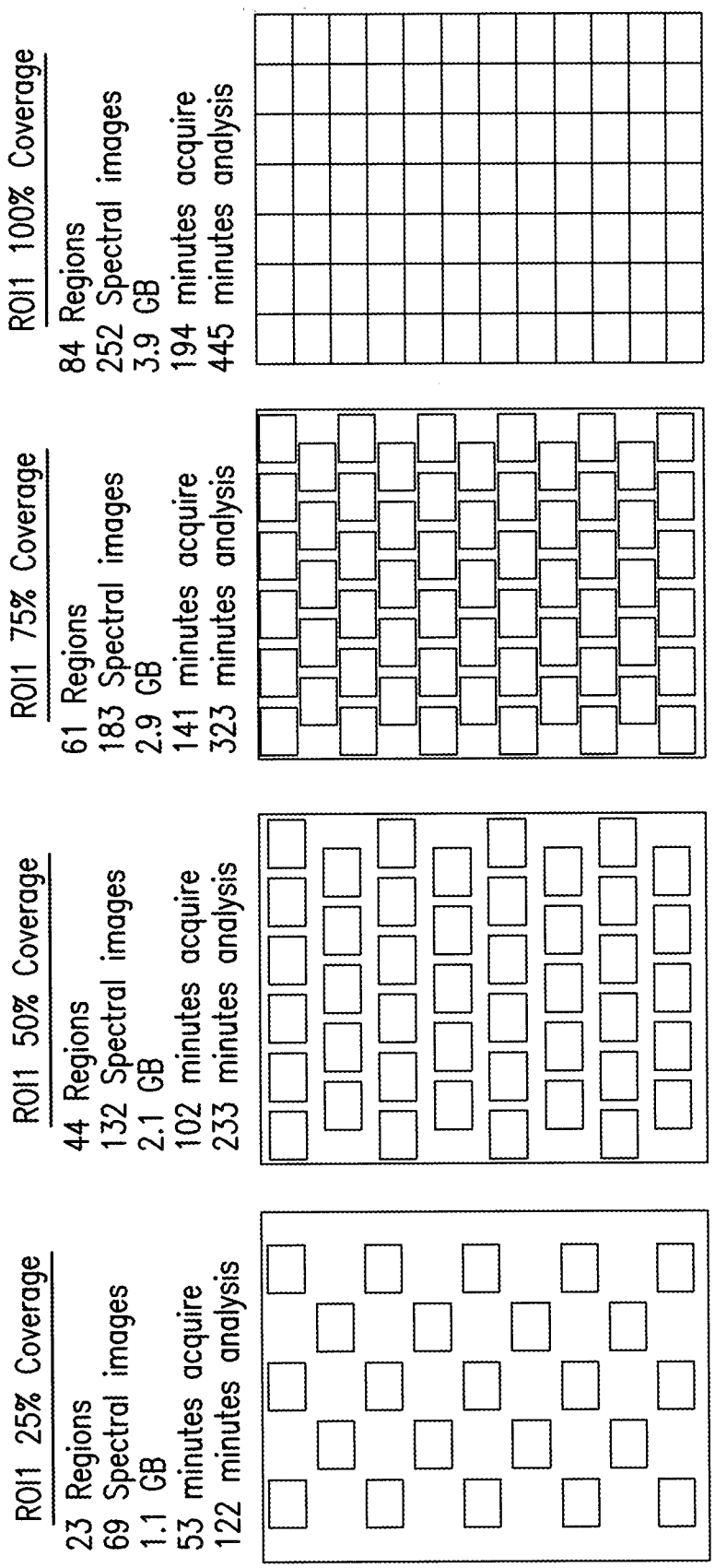
FIG. 4: Illustration of systematic sampling over fields of view (regions to be acquired using spectral imaging indicated by rectangles overlayed onto pre-scanned anatomy image rendered in mock brightfield).

One way that this can be accomplished is to automatically or manually generate a regularly spaced grid of FOVs to provide an unbiased structured sampling over the AOI. The instrument operator may choose a degree of coverage such that FOVs cover 100% of the AOI, or a lower percent (e.g. 75% coverage, 50% coverage, 25% coverage). This is illustrated at FIG. 4. Large regions can be acquired using principles of systematic random sampling to derive a faithful representation of the biomarker levels and spatial distribution with reduced acquisition time, analysis time, and computer memory requirements. The advantage of being able to designate a lower coverage is that the process results in a smaller dataset, and the dataset can be acquired faster. Also, where the spectral data is acquired only from the FOVs, less area of the tissue is exposed to illumination, which permits reimaging of the areas interspersed between previously imaged areas. This is especially beneficial where photobleaching of reporters is an issue. The percentage coverage should be selected to be sufficient to provide an accurate representation of the overall AOI.

Another way that this could be accomplished is to assign an FOV to each region within the AOI having a specific set of morphological features. For example, the FOVs could be selected to correspond only to nucleated cells, only to tubular regions within tumor tissue, only to tumorous regions within tissue samples, etc. The FOVs corresponding to specific morphological features could be manually selected by a skilled user, or could be selected on the basis of automated morphological analysis, such as that disclosed in Parimi et al., and Nguyen et al.

Where the FOV sampling grid is automatically generated, it may be manually audited to add or remove FOVs as desired by the user, which may be done before or after spectral data acquisition.

Generally it is advantageous to select the AOI and sample the tissue area with FOVs; this reduces the amount of overall data to process and store, reduces computational overhead, and provides sufficient data to model the distribution of expression across the entire AOI.

In one embodiment, both the morphological image and the spectral data may be captured for the entire image before annotation. Alternatively, the spectral data may be collected only from each AOI. As yet another alternative, the spectral data may be collected only from one or more fields of view (FOVs) within each AOI.

V. Generation of Datasets

Data from the FOVs is organized into datasets comprising a plurality of image stacks for each FOV within the AOI.

A. Spectral Data Collection

Once the FOVs have been selected in the AOI, multi-spectral and/or hyper-spectral data is collected from each FOV. This data can be collected de novo (i.e. by collecting spectral data after FOV selection) or may be extracted from a pre-collected spectral dataset after the FOVs are selected. Detectable marker signals are then computationally segmented from the collected multi-spectral data and/or hyper-spectral data.

There are 3 general strategies for obtaining spectral data in 2 dimensions of space, as in a spectral image. The first strategy is to filter a limited bandwidth of the spectrum to be imaged by a detector, for instance an array detector such as a CCD or CMOS camera. The camera collects the image produced in this limited bandwidth of the spectrum, then the filter bandwidth is changed to the adjacent region of the spectrum and the process is repeated. This process continues until images representing the spectral range desired have been produced. These images are combined into a stack with 2 dimensions of space and the third dimension being the spectral. The second strategy is based around a dispersive element in the path of the light coming back from the specimen. The dispersive element, for instance a prism or a grating, spatially separates the spectral components of the light. An aperture is used to select a particular bandwidth of the light to pass to the detector, or alternatively, the aperture may be used to select a thin slice of the image area which is then dispersed over the second dimension of a 2 dimensional detector such as a CCD. The specimen or the aperture may be moved after each image is acquired to gradually build up a stack of image representing a 2 dimensional area with a $3^{rd}$ spectral dimension. The third method for obtaining a spectral image is to use a Sagnac or Michelson interferometer in the path of light leading from the sample to the detector. The image taken at a given path length for the interferometer is effectively an 2D interferogram. Many interferograms are taken, each at a different path length and these are combined into a 3 dimensional array that is then Fourier transformed to produce a stack of images with 2 dimensions of space and intensity values mapped as a function of wavelength in the third dimension. Exemplary methods of spectral imaging capture are discussed at Garini et al. 2006.

The terms 'hyperspectral' and 'multispectral' are overlapping and differentiated by the degree of spectral resolution that the acquisition achieves. As a general rule, the term 'hyperspectral' refers to modalities that produce a continuous spectral sampling with at least 20-nm resolution across the visible range. Multi-spectral capture may refer to the capture of only 2 to 4 spectral bands that are discontinuous across the visible range.

In one embodiment, the multi-spectral data and/or hyper-spectral data is collected at a single tissue depth or multiple tissue depths. Capturing data at multiple tissue depths ensures capture through the tissue thickness and to alleviate axial chromatic aberration (colors coming to focus at different depths in the specimen). Alternatively, a polyfocal capture device may be employed that would permit simultaneous capture of multiple depths in the specimen to correct for chromatic aberration (Garsha et al. 2011).

Figure 5:
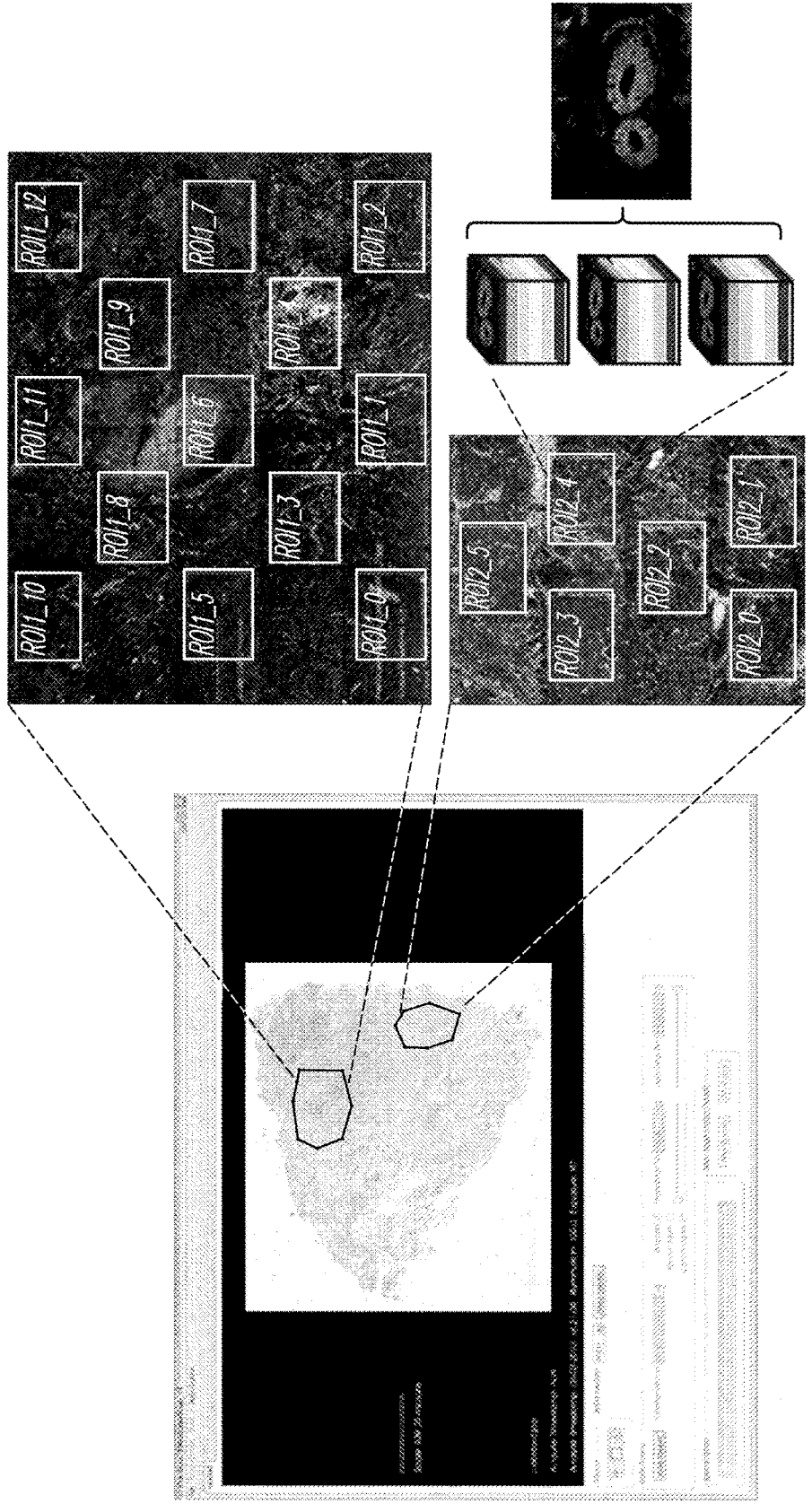
FIG. 5: Diagram illustrating the concept of spectral acquisition over annotated fields of view.

FIG. 5 illustrates an example in which spectral data is acquired over specific FOVs. Coordinates of the FOV sampling grid covering the AOI are determined from the digital annotation and used to automate acquisition of spectral data cubes at these coordinates. The spectral data from multiple planes at a given FOV are projected to provide a 3D dataset that provides the input to spectral unmixing of the signal layers.

After the spectral data is acquired, the analyte channels are unmixed (deconvolved) to provide pure analyte channel images that represent the staining intensity for each marker as captured under standardized conditions of illumination and exposure. Exemplary methods of doing so are disclosed at Lett et al. 2008, Garini et al. 2006, Garsha et al. 2013, the contents of each of which is incorporated herein by reference. The process of separating the signals from each of the stains of interest can occur at any time after the unprocessed data is acquired, before or after storage of the unprocessed data.

The individual FOVs within an AOI are collected and stored in such a way (for instance, in an image database, or specialized directory structure) that the fields for an AOI are grouped for further analysis. Ideally, the data organization will permit grouping of fields for comparison between fields from a single AOI, comparison between AOIs of a common tissue section, comparison of all or some AOI's from a tissue section to those from a different tissue section and other permutations that may provide information useful to the investigator. In one embodiment, said multi-spectral data and/or said hyper-spectral data is automatically saved in a nested data structure or data base with metadata attributes to patient, assay, biopsy, section, AOI position, and/or FOV position.

B. Dataset Creation

The next step is selection of the individual FOVs or entire AOIs that are to be included in a dataset. The term 'dataset' is used here to describe a population of acquired fields that are grouped for purposes of comparison to a different 'datase2'. This may involve grouping of fields that are from one tumor area for comparison to fields from a normal area of the same tissue, or a group of fields from one tumor for comparison to a group of fields from a different tumor from the same patient, or a group of fields from a tumor from one patient to be compared to a group of fields from a tumor from a different patient. Another example would be grouping the fields acquired for each core of a micro array for comparison to one another, or grouping fields from replicate cores for comparison to other 'datasets' of replicate cores. This flexible grouping of fields for data analysis allows comparisons to be made of marker expression on different levels: inter tumor, intra tumor, inter patient, intra patient, multiple patients according to treatment group, micro-array inter core.

This ability to group sets of acquired fields requires an organization of acquired data could be facilitated by a relational database, such as the OMERO server (Allan et al., 2012). Use of a relational database permits acquired data to be grouped in different ways, to perform analysis comparing expression patterns within tumors, between tumors, or between patients. Interfacing to image database technology permits scalability for future development and a centralized repository for multimodal image data, data mining, metadata, and data from other analytical methods. Ideally, the database technology is capable of storing heterogeneous data to include n-dimensional image data and associated metadata (image coordinates, instrument parameters, z-plane, wavelength channel for each layer, optical configuration, exposure time, illumination level and other relevant annotations such as FOV's). The database data-model should also permit linking of data into groups based on metadata parameters for comparison, such as AOI, tumor, section, patient. The database and associated accessibility layers should enable distributed access to large datasets via computer network and efficient uploading of large image data from acquisitions. These and other desirable characteristics for n-dimensional image databasing are discussed in Allen et al. (2012).

Figure 6:
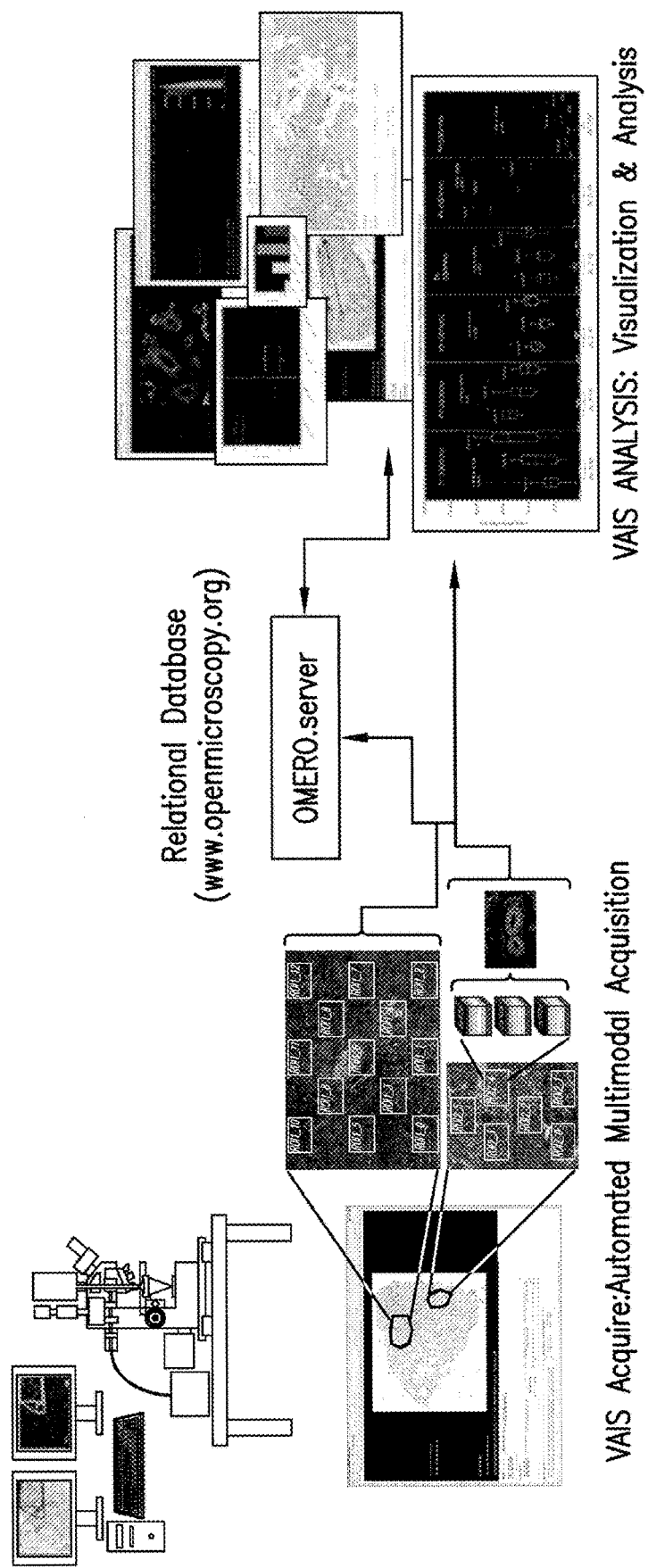
FIG. 6: Illustration of an exemplary system combining automated multimodal spectral data acquisition with a relational database and visualization and analysis software.

FIG. 6 illustrates an exemplary embodiment combining automated multimodal spectral data acquisition with a relational database and visualization and analysis software. The remote database is connected via a high-bandwidth network and the VAIS software is able to act as a client that can remotely access the database. In this way, the VAIS Analysis software can upload or retrieve specific datasets that have been acquired for an experiment. The VAIS software is configured to communicate with the database using a protocol that permits the linking of various pertinent metadata parameters to the actual uploaded image data. Such metadata parameters may include identification of specific project and experimenter, and password protected credentials used to restrict access to sensitive data. By using a centralized repository, large and complex datasets can be efficiently stored and accessed remotely by several researchers at different physical locations. The database interface encapsulates the complexity of organizing unconventional nested data that consists of many dimensions and metadata tags such as multiple wavelengths, multiple z-planes, multiple FOV's, multiple AOI's, multiple tissue sections, multiple biopsies, multiple patients. To this data may be associated data from orthogonal studies such as sequencing or mass spec; keeping such data organized using conventional file formats and directory structures may become inefficient and cumbersome.

While less desirable, the ability to flexibly group fields can also be accomplished by means of a rigid directory structure and a specialized software browser that creates lists of files and analytes to be included in an analysis. The example VAIS Analysis software provides both database client capabilities and ability to organize data based on the directory structure. For organizing data based on directory structure, the browser interface must recognize the file types that are commonly grouped (for example, tiff images, or text image layers). Our example provides the capability to browse acquisition directories and select FOV directories or individual image files for inclusion into a dataset. Sets of FOV's can be selected from different acquisition directories to be combined, and the relevant unmixed analyte layers are recognized in the image data directories and can be included (or not included) based on checking boxes in a list of the analyte layer images found for a given set of FOV's grouped into a dataset. The software interface itself creates a set of lists that represent the dataset, the lists include such relevant information as the path to each image file in the dataset, grouped by analyte layer. These lists may be used to open the respective files and combine them in memory into a single data structure for processing and analysis.

C. Feature Segmentation

The unmixed stain channels for each field in a dataset can optionally be further segmented automatically to select features of interest based on morphometric properties (size, shape), or photometric properties (signal intensity range). Automatic feature selection permits structures to be rejected from analysis based on intensity range, size and shape constraints. This helps to keep the impact of background staining and noise on analysis to a minimum. These segmentations persist as part of the dataset and can be re-segmented and over-written by opening the dataset in a specialized viewer and changing the segmentation parameters.

Figure 7:
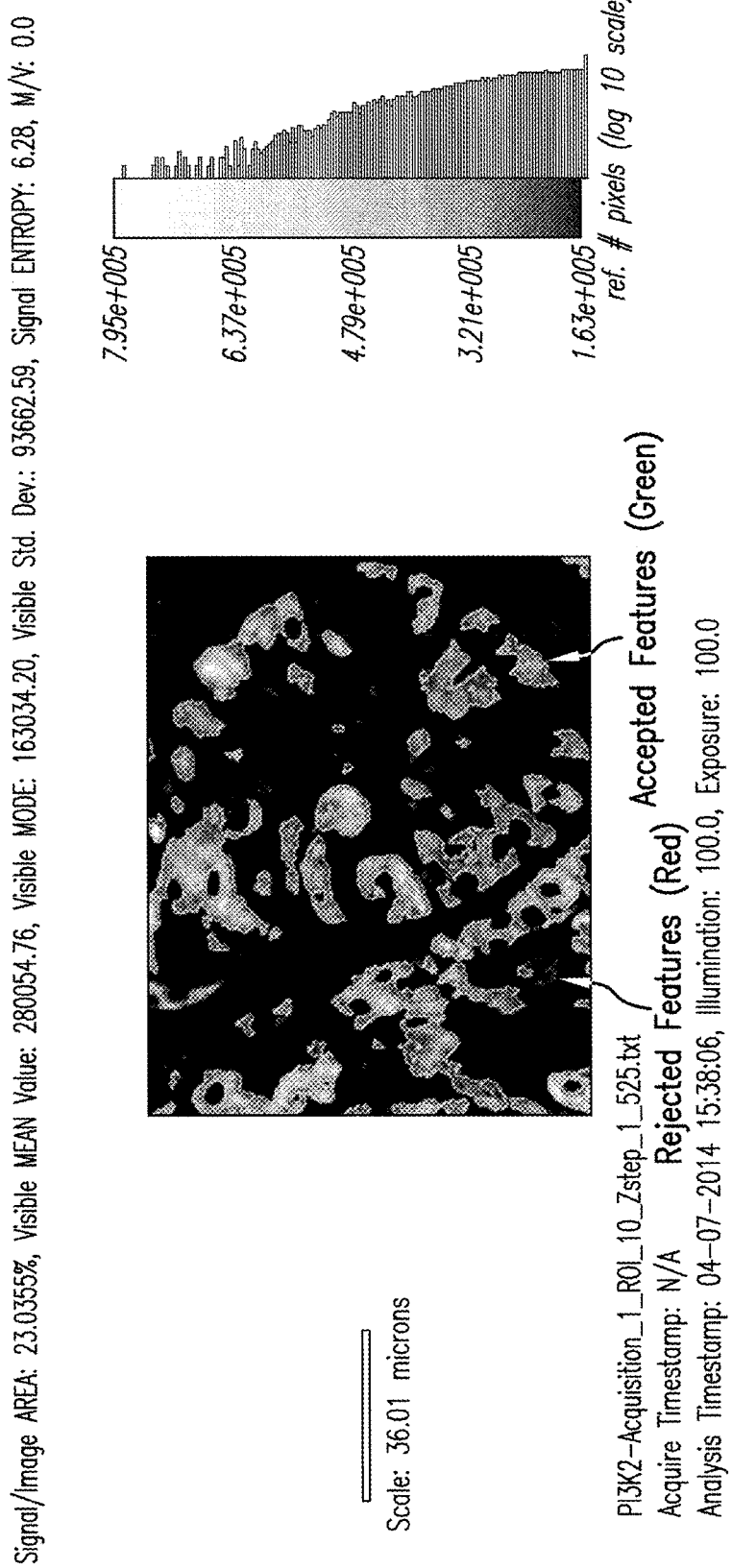
FIG. 7: An illustration of an exemplary automatic feature selection permitting structures to be rejected from analysis based on intensity range, size and shape constraints.
Figure 8:
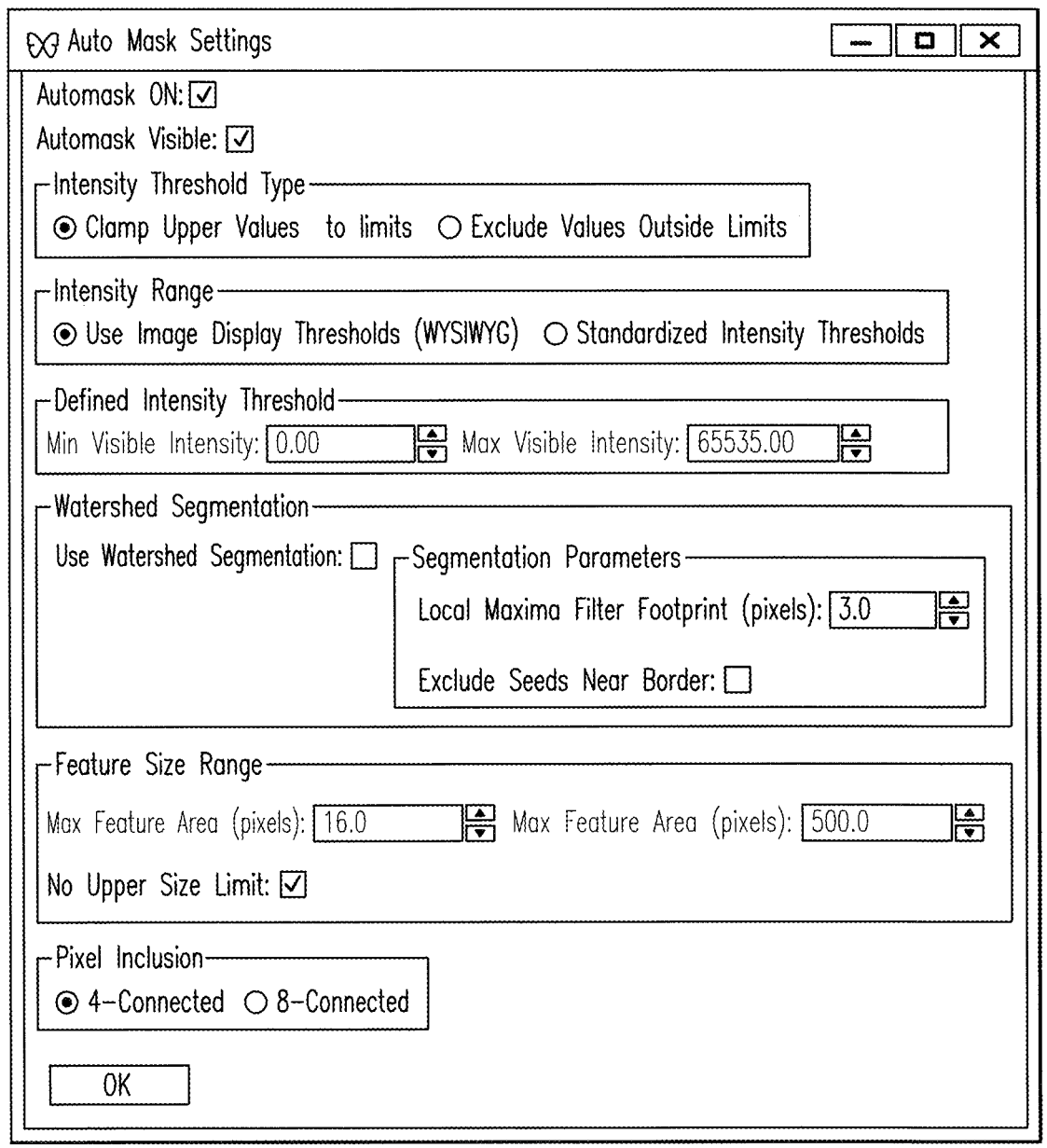
FIG. 8: An illustration of an exemplary auto-mask settings dialogue interface to set the parameters for feature segmentation.

FIG. 7 illustrates an exemplary image in which certain features have been excluded on the basis of an automated feature selection. In order to identify and sort features, the VAIS software first identifies pixels that are within a specified range of intensities provided as a configuration setting. In the next step, the software identifies whether each pixel within the intensity window is touching other pixels within the intensity window. In the case where a pixel touches other pixels, those pixels are grouped into an object that is composed of pixel coordinates. The object's borders are defined by the point at which pixels fall outside the intensity window specified. Next the software will look at the number of pixels in each object to determine the pixel area, and compare the pixel area to limits on the area size specified in the settings. The objects that are larger than or smaller than the specified size range are identified and removed from the list of objects that will be included in further analysis. Though this is a simple example based on size and intensity constraints, there could also be morphometric constraints such as roundness or length included as part of the selection process. This type of segmenting forms the basis for automated selection of relevant anatomic features such as nuclei, or different cell types FIG. 8 exhibits an exemplary user interface for setting feature segmentation parameters. In this example there are checkboxes to turn the automated feature selection on or off, and also to enable visible color outlines of selected (green) and rejected (red) objects. For the intensity range selection, the user may select an approach that reject pixels that are brighter than the specified upper limit, or an approach that simply resets all pixel values that are brighter than the specified limit to the value of the limit. The intensity limits that are used may be defined by the settings for visualization, or the limits may be set to be different from the display by using standardized intensity thresholds. There is also a provision to enable watershed segmentation. Watershed segmentation may be used to sub-divide objects that are likely to be separate structures that are touching. For instance, where cells are packed close together there may be a visible change in intensity near borders, but because the cells are touching they will be regarded as a single object. Watershed segmentation is an algorithm used to split the cells into plausible separate objects. There is a provision in the interface to set the limits for the size range for features that will be included in downstream analysis. Finally, there is a parameter for determining whether pixels are touching other pixels within the intensity window. Four-connected determination will only check to see if any of the sides of the pixel being tested touch other bright pixels. Eight-connected testing will also check to see if the corners of the pixel being tested are touching other bright pixels.

The segmented features may be further edited by a technician using a specialized viewer with annotation tools to mark features for analysis. For instance, a technician may wish to include only cells in a glandular area within the field and not include stromal cells. Alternatively, a technician may designate areas that are to be excluded from analysis. As an example, the technician may wish to designate a necrotic area be excluded from any downstream analysis. These annotations and segmentations then persist as part of the dataset and can be edited by other technicians who open the dataset with a specialized viewer and appropriate permissions. The VAIS Analysis software used in this reduction to practice is an example of software that provides this type of visualization and annotation capability for multiplex data.

Figure 9:
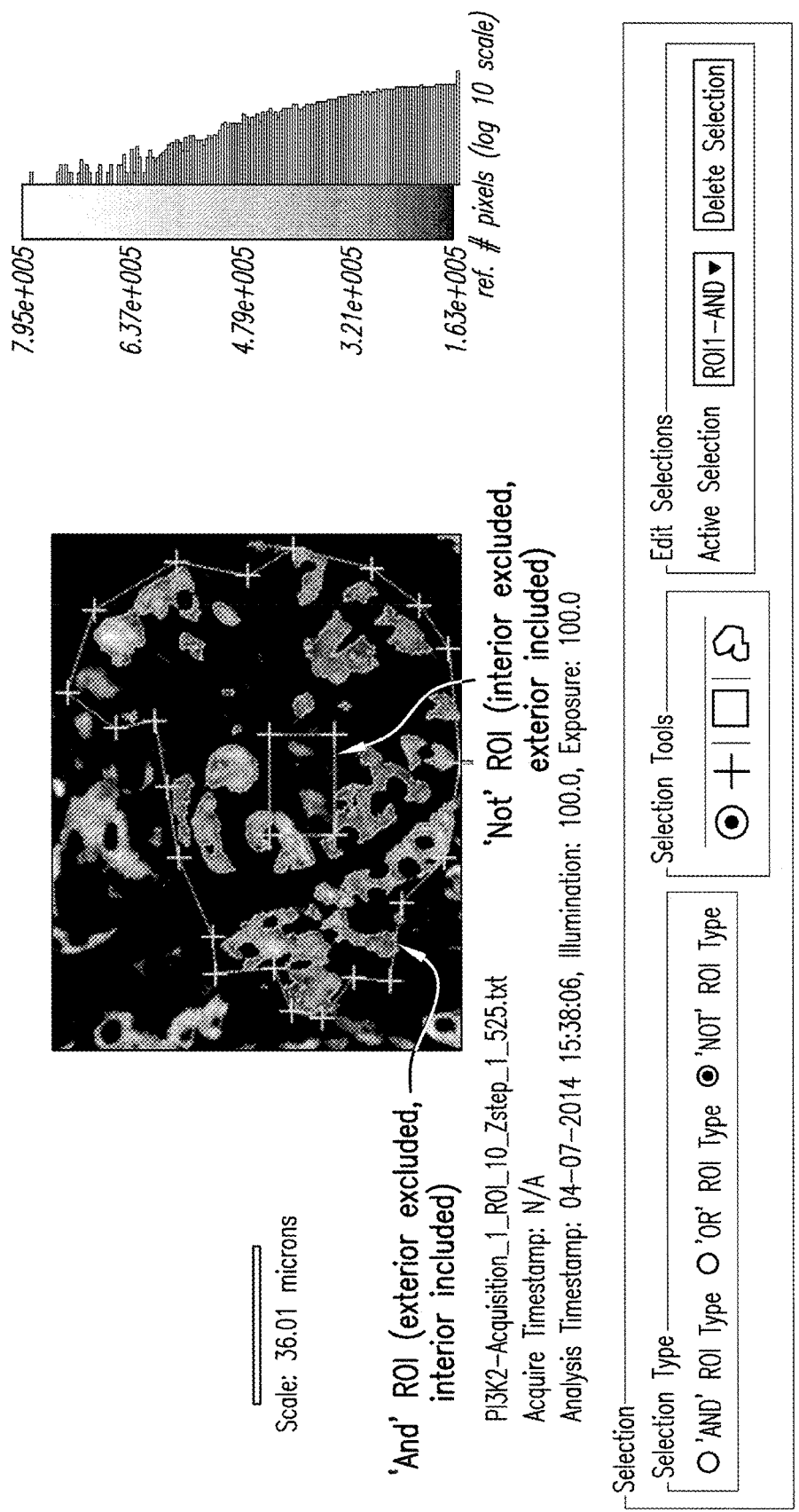
FIG. 9: Illustration of exemplary manual FOV annotation and editing tools.

FIG. 9 provides an exemplary tool for manual editing of segmented features. The tool provides the ability to draw regions directly on the image in the viewer. By selecting a Boolean type ('and', 'or', 'not'), the regions drawn may designate areas that are to be explicitly included in analysis, or explicity not included in analysis. The 'And' type of FOV, for instance, will include all areas that are inside the FOV drawn and inside areas that have been automatically segmented to be included. In other words, features that are too small to be included in the automatic feature selection will still be rejected from analysis. The 'Not' type of FOV will reject any features inside the designated FOV from downstream analysis. The 'OR' type of FOV will include the entire area in the designated FOV, as well as areas that have been automatically selected that are outside the FOV, in this sense, it is a mechanism to override the automatic segmentation to include regions for analysis. The FOV's may be deleted or edited after creation by use of a dropdown list to select the FOV of interest, followed by adjusting the vertices of the FOV or by deletion of the FOV from the list. Manual FOV designation permits a technician to over-ride the automatic feature segmentation within an area of interest to include or exclude pertinent regions of anatomy from analysis. Once created, an FOV can be edited or deleted. Different types of FOVs can be added ('And', 'OR', 'NOT') depending on the situation, and different FOV types can be nested. FOVs become a persistent part of the 'dataset' description. A dataset can be opened and the FOV's reviewed, and edited in subsequent editing sessions for different analysis requirements.

VI. Cluster Analysis

In order to determine heterogeneity within the cell or tissue sample, cluster analysis is applied to the optionally segmented dataset. The dataset object described above contains the information of which fields to include in analysis, which analytes to include in the analysis, and what areas of each field to include (segmented features and annotations).

Figure 10:
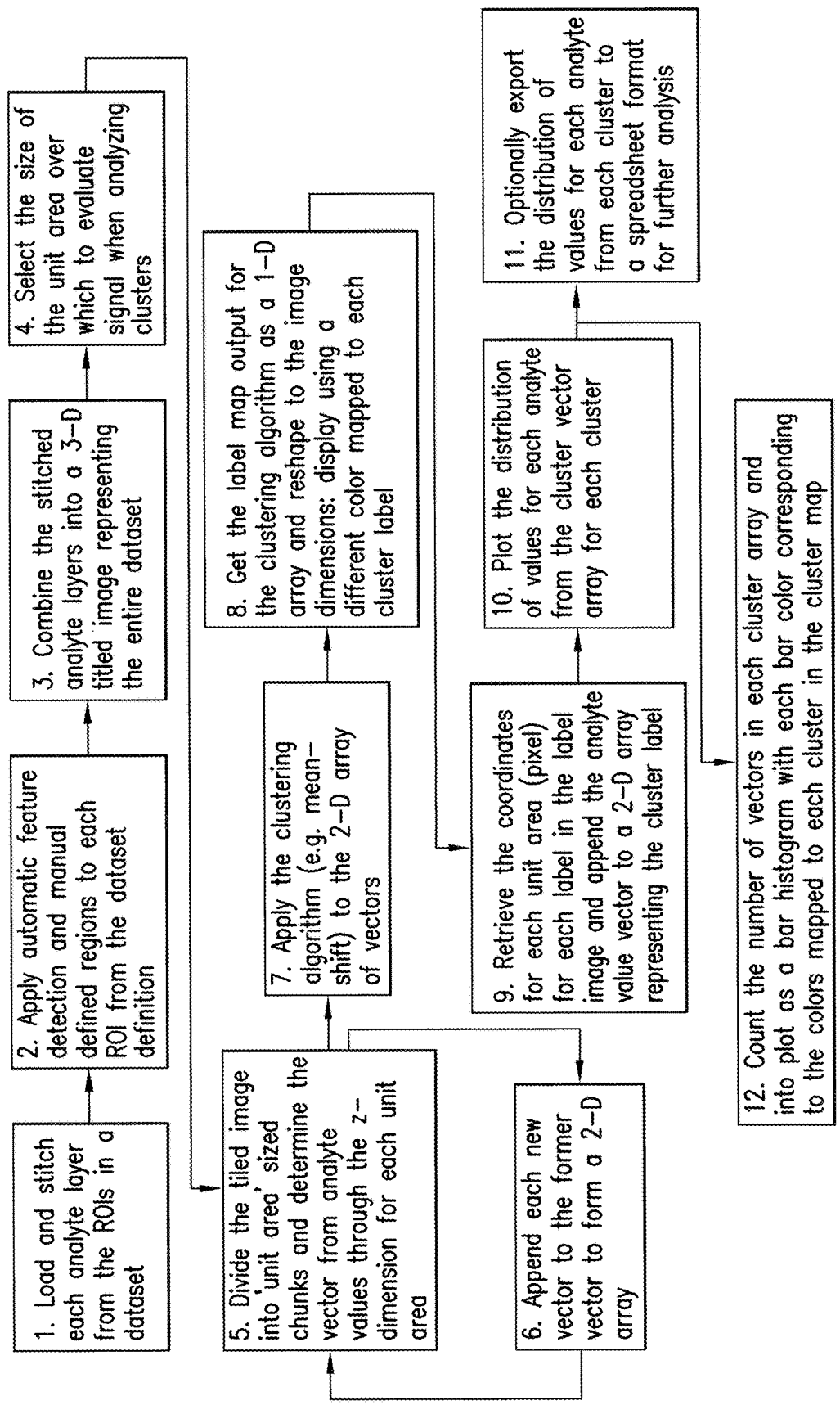
FIG. 10: Flowchart illustrating an exemplary workflow for loading a dataset, determining multi-analyte expression clusters, and presenting output.

FIG. 10 illustrates an exemplary workflow for performing clustering analysis.

Figure 11:
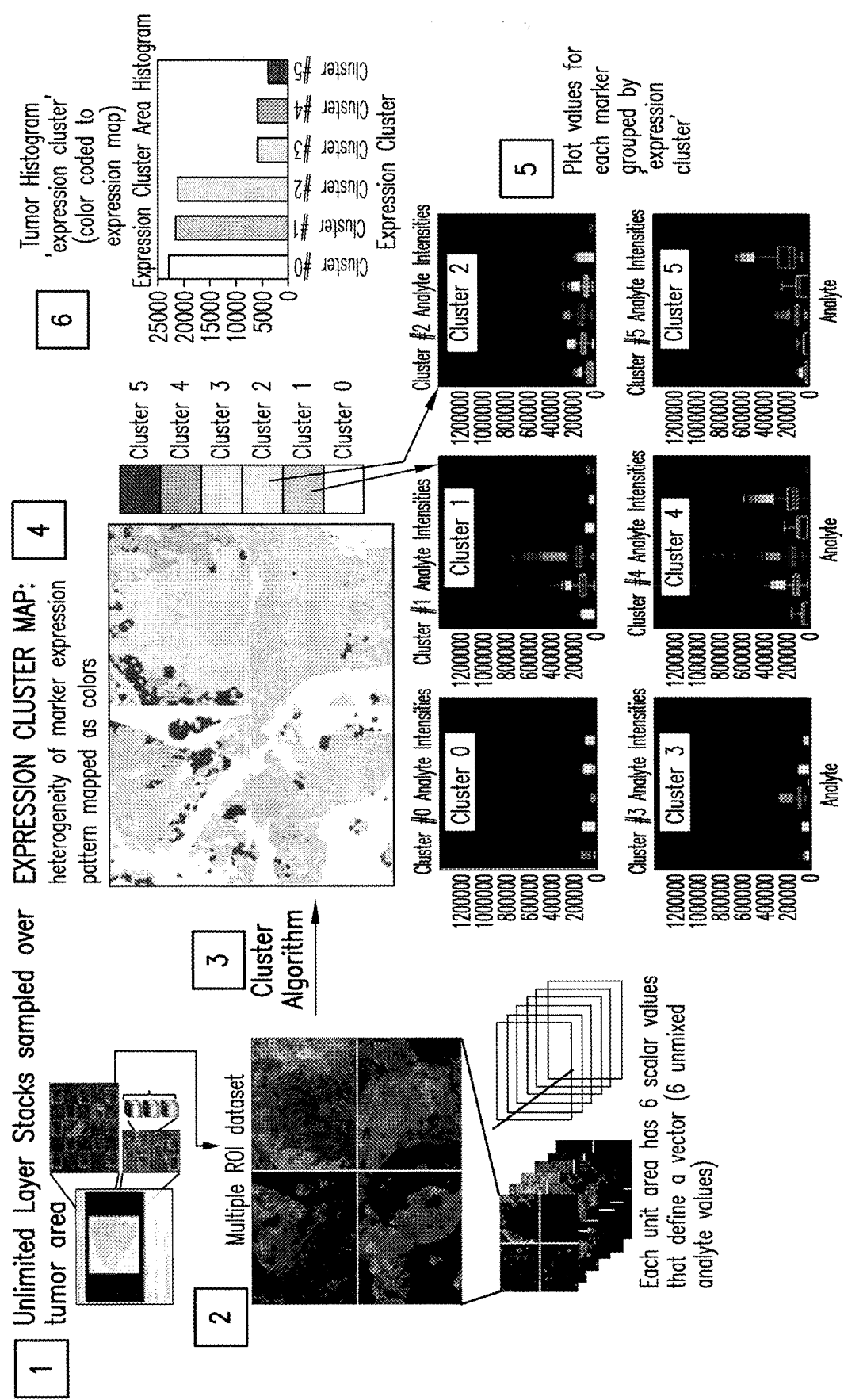
FIG. 11: Cluster analysis for quantification of heterogenous expression. 1.) Anatomic fields of view are digitally annotated for automated acquisition of spectral data in the annotated regions. The data acquired for each field in an area of interest is umixed and projected through the z-dimension to produce a set of 2D images representing the analyte intensity for each analyte. 2.) the 2D image for each analyte in each field is appended to the 2D images from all the other fields to create an image that spans the entire dataset, each analyte is appended in the z axis to produce a 3-D image representing the analyte distribution for each analyte over the entire dataset. 3.) A density-based clustering algorithm is applied to the 3-D dataset created in the previous step. The clustering algorithm creates a new image with the x,y coordinates of the 3-D dataset, and groups each pixel into a cluster where members have similar expression pattern over all the markers. Each cluster created has a different expression pattern for the plurality of markers from the others. 4.) The cluster map is colorized to indicate regions of the tissue anatomy that belong to each cluster 5.) The intensity values for each marker are collected from the regions belonging to each cluster, these intensity values can then be plotted or exported to spreadsheet. Placing the biomarker plot for each cluster side-by-side facilitates determination of which areas on the color map are high or low in expression for biomarkers of interest. 6.) a cluster histogram is produced that indicates the proportional area for each cluster in the dataset. This facilitates simple determination of which expression patterns are dominating the area, and which expression patterns represent a smaller proportion of the overall cell population.

The datasets for analysis are loaded into a heterogeneity analysis interface, and each analyte for each FOV is loaded into an image 'stack' (3D array) such that the x and y axis are spatial coordinates the z-axis contains one or more layers, each layer representing a different analyte map. An exemplary analysis is illustrated at FIG. 11. Parameters set by the user control whether pixels in the z-axis layers are subjected to a median filter to homogenize signal over a given footprint area, or whether the signals are averaged over a given footprint area. These parameters determine the size of each 'pixel' or unit area that is input to the cluster algorithm. For instance, it may be desirable to homogenize the signal over a footprint that is roughly the size of a cell so that cell-sized regions are clustered into groups. Each FOV image stack is appended to the prior image stack on either an x or a y edge, so that the fields are tiled into a large x,y,z image that represents the entire AOI. As each analyte field is loaded, the FOVs that have been previously selected to be included are left intact, and other areas are set to a value of zero.

An unsupervised, non-parametric clustering algorithm is applied to the image stacks to group areas of similar expression pattern into 'clusters'. Preferably, the clustering algorithm is used that can scale to fairly large data, can minimize assumptions, and has as few parameters to enter as possible. Additionally, it is preferred to have a clustering algorithm to find patterns of expression that would be scalable from 1 to many analytes and that uses single or multiple analyte intensity values that range on a continuous scale and may have differently shaped distributions of values for each analyte.

In an embodiment, the clustering algorithm is selected from the group consisting of DBSCAN (Ester et al. 1996, incorporated herein by reference), Affinity Propogation (Frey & Dueck, 2007, incorporated herein by reference), and Mean-Shift (Comaniciu & Meer, 2002 and http://efavdb.com/mean-shift/, incorporated herein by reference).

In an embodiment, the cutoff for similarity in multimarker expression is specified through a parameter (termed "bandwidth") that describes the distribution cutoff. The bandwidth influences the number of clusters in the result. In an embodiment, a bandwidth estimator function is applied to determine the bandwidth to use, wherein the bandwidth estimator function takes inputs of number of pixels to sample and a quantile parameter. The bandwidth estimator samples a plurality of regions from the image and determines bandwidth from the samples and the quantile (between 0 and 1, 0.5 is the median of pairwise distances between sample values). This enable adjustment of the clustering algorithm to enforce a higher similarity or permit relatively less similarity between members of a cluster, but the thresholds for 'high' and 'low' similarity are determined from the sample itself. Setting a higher quantile enforces a greater similarity for members of a cluster, and this generally results in more clusters, each with fewer members that are more similar.

The input into the clustering algorithm is the tiled dataset image stack, and the output is an x,y array where the x and y coordinates are the spatial coordinates of the input tiled image stack, and the value at each xy position is a label that indicates the cluster to which a given pixel belongs (cluster output array). Therefore, for example, in the cluster output array, pixels with a value of '1' belong to cluster number 1, pixels with a value of '2' belong to cluster number 2 and so forth for as many clusters as have been segmented by the algorithm.

The cluster output array of the clustering algorithm may be further analyzed by generating a histogram of the relative proportion of area occupied by each cluster. The histogram is determined by counting the number of pixels belonging to each cluster and dividing by the total number of pixels in the xy tiled array. This yields a percentage of the total area in the dataset and can be plotted in a bar plot to indicate which clusters are largest.

A cluster map may also be created by assigning a color to each cluster in the cluster output array and displaying on a computer screen. In this manner, pixels associated with cluster '0' may appear as a white area, pixels associated with cluster '1' are colored red, pixels associated with cluster '2' yellow, and so forth. The cluster map and the color overlay of the analyte images may be placed in alternate windows of a specialized image viewer to compare the spatial areas of various clusters with the relative expression level of different markers. The cluster map effectively identifies areas of similar and differing expression or activation patter for multiplexed biomarkers in anatomic context. In this way, the relationship between areas of differing expression or activation can be readily visualized.

Additionally, the cluster output array may be used to segment areas on a tiled input image stack and measure the values for each analyte for each 'pixel' (unit area) in a cluster area. In this way, the distribution of intensity values (proportional to expression level or activation) for a given biomarker may be plotted using a box plot (FIG. 11) for each analyte in a per-cluster fashion, or saved to a spreadsheet with a column for each analyte, and a row for each pixel or unit area. This capability provides the ability to report the biomarker levels in individual clusters of expression and facilitates the comparison of expression levels in different clusters.

VII. Application to Signal Transduction Pathway Analysis

Cells receive chemical and environmental signals at the membrane through receptors, and these signals are relayed through protein phosphorylation cascades. This signal transduction regulates the genetic machinery to alter cellular behavior in response to the stimulus. Each pathway can influence several biological outcomes. Dysregulation of these signaling pathways, whereby external stimuli may no longer be needed, can cause pathological aberration and the development of cancer. Therefore, numerous targeted therapeutics have been developed towards signaling pathways that are implicated in tumorigenesis and have been subjected to clinical trial (Tables 1 & 2).

TABLE 1

| PI3K Inhibitors | | MEK Inhibitors | |
|---|---|---|---|
| Agent | Target | Agent | Target |
| BKM120 | Class I PI3K | Trametinib (GSK1120212) | MEK1/2 |
| GS 1101 | Isoform specific (PI3Kδ) | Selumetinib (AZD6244) | MEK1/2 |
| BAY 80 6946 | Class I PI3K | GDC 0973 (XL518) | MEK1/2 |
| BEZ235 | PI3K/mTORC1/2 | BAY 86 9766 | MEK1/2 |
| GDC 0941 | Class I PI3K | Pimasertib (AS703026/ MSC1936369B) | MEK1/2 |
| PF 04691502 | PI3K/mTORC1/2 | PD325901 | MEK1/2 |
| PF 05212384 | PI3K/mTORC1/2 | CI 1040 | MEK1/2 |
| PX 866 | Class I PI3K | | |
| BYL719 | Isoform specific (PI3Kα) | | |
| GDC 0980 | PI3K/mTORC1/2 | | |
| SAR245408 (XL147) | Class I PI3K | | |
| SAR245409 (XL765) | PI3K/mTORC1/2 | | |
| GSK2126458 | PI3K/mTORC1/2 | | |

TABLE 2

| Trial | PI3K Inhibitor | MEK Inhibitor | Patient Population |
|---|---|---|---|
| NCT01363232 | BKM120 | MEK162 | Advanced solid tumors, including TNBC, pancreatic cancer, CRC, malignant melanoma, NSCLC, and other cancers with KRAS, BRAF, and NRAS mutation |
| NCT01337765 | BEZ235 | MEK162 | Advanced solid tumors, including TNBC, pancreatic cancer, CRC, malignant melanoma, NSCLC, and other cancers with KRAS, BRAF, and NRAS mutation |

TABLE 2-continued

| Trial | PI3K Inhibitor | MEK Inhibitor | Patient Population |
|---|---|---|---|
| NCT01390818 | SAR245409 | Pimasertib (MSC1936369B) | Advanced solid tumors, including either of the following: (1) cancer diagnosed with alteration in one or more of the following: PTEN, BRAF, KRAS, NRAS, PI3KCA, ErbB1, ErbB2, MET, RET, cKIT, GNAQ, GNA11; or (2) any of the following cancers: pancreatic, thyroid, colorectal, non small cell lung, endometrial, renal, breast, ovarian carcinoma, or melanoma |
| NCT01347866 | PF04691502 or PF05212384 | PD0325901 | Advanced cancers demonstrating KRAS or BRAF mutation and patients with advanced CRC with evidence of KRAS mutation and no more than 1 prior regimen of systemic therapy |
| NCT01155453 | BKM120 | Trametinib (GSK1120212) | Advanced solid tumors, including expansion arms consisting of RAS or BRAF mutant advanced NSCLC, ovarian cancer, or pancreatic cancer |
| NCT01392521 | BAY80 6946 | BAY86 9766 | Advanced solid cancers |
| NCT01449058 | BYL719 | MEK162 | Advanced CRC, esophageal cancer, pancreatic cancer, NSCLC, or other advanced solid tumors with documented RAS or BRAF mutations |
| NCT00996892 | GDC 0941 | GDC0973 | Advanced solid cancers |
| NCT01248858 | GSK2126458 | Trametinib (GSK1120212) | Advanced solid cancers |

By analyzing cell samples (such as tumor samples, cell lines, and cell smears) using the presently-disclosed image analysis techniques, areas that are segmented as clusters may have notably different levels of expression, phosphorylation, or activation for some markers, which could not previously be easily quantified or communicated previous to the development of this tool. Thus, heterogeneous patterns can be analyzed as indicated by multiplexed probing of protein activation or modification (such as by phosphorylation) and/or transcription factor expression, localization and/or translocation in solid tumor tissue and cell preparations. This novel capability is useful in the continuing development of next-generation companion diagnostics, for understanding the mechanisms of activity of new therapeutic agents, and for development of prognostic assays.

In an embodiment, a method of characterizing a tumor according to activation state of a signal transduction pathway in the tumor is disclosed, the method comprising analyzing an image of a sample of the tumor according to any of the methods of detecting and describing heterogeneity in a cell sample disclosed herein, wherein two or more analytes associated with a signal transduction pathway are labeled with the detectable marker. At least one of the markers (and preferably more than one of the markers) is labeled with an analyte-binding entity that is specific for a specific physiological state of an analyte associated with the signal transduction pathway. Thus, for example, an anti-phospho antibody can be used to specifically label a phosphorylated form of a protein involved in the signal transduction pathway. In some embodiments, the phosphorylation indicates activation of the protein (such as phosphorylation of S6 ribosomal protein). In other cases, phosphorylation signifies inactivation of the protein (such as phosphorylation of Src tyrosine kinase by C-terminal Src kinase (Csk) or phosphorylation of Glycogen synthase kinase 3 (GSK-3) by Akt)). In a further exemplary embodiment, the label is a semiconductor fluorescent nanoparticle (such as a QUANTUM DOT) and the signal therefrom is detected using hyperspectral detection.

VIII. Examples

To illustrate the presently-described image analysis methods and systems, a panel of six anti-phospho antibody-QUANTUM DOT conjugate pairs was developed for multiplexing, consisting of five effector components in the PI3K signaling pathway (pAKT473, pAKT308, pPRAS40, pS6, peIF4G) and one output effector component in the MAPK signaling pathway (pERK), a pathway that is involved in cross-talk with PI3K signaling.

A. Antibodies and Bioconjugations

Table 3 lists all primary antibodies used in this study. All primary antibodies were purchased as BSA-azide free formulations from Cell Signaling Technologies (Danvers, Mass.).

TABLE 3

List of tyrosine kinase pathway targets assessed and associated antibodies.

| Marker/ Antibody | Host species/ clonality | Description | Vendor | Cat. No. |
|---|---|---|---|---|
| AKT pSer 473 | Rabbit monoclonal | Synthetic phospho peptide Corresponding to residues surrounding Serr473 of human AKT. | Cell Signaling technology | 4060 |
| AKT pThr 308 | Rabbit monoclonal | Synthetic phospho peptide Corresponding to residues surrounding Thr308 of human AKT. | Cell signaling technology | 4056S |
| pPRAS40 | Rabbit monoclonal, Clone C77D7 | Synthetic phosphopeptide corresponding to residues surrounding Thr246 of human PRAS40. | Cell signaling technology | 2997 |
| pS6 | Rabbit Monoclonal | Synthetic phosphopeptide corresponding to residues surrounding Ser235 and Ser236 of human ribosomal protein S6 | Cell signaling technology | 4858 |
| pEIF4G | Rabbit polyclonal | Synthetic phosphopeptide corresponding to residues surrounding Ser1108 of human eIF4G | Cell signaling technology | 2441 |
| pERK1/2 | Rabbit monoclonal | Synthetic phosphopeptide corresponding to the sequence of p44/42 MAP kinase | Cell signaling technology | 4376 |

Hapten bioconjugates of the primary antibodies were developed and utilized as described in WO 2008-063378 A2. Anti-hapten-specific secondary mouse monoclonal antibodies were developed at Ventana Medical Systems, Inc., Tucson, Ariz. QUANTUM DOTS were purchased from Thermo Fisher Scientific (Eugene, Oreg.). Anti-hapten specific mouse monoclonal antibody-QUANTUM DOT conjugates were produced using standard bioconjugation methods (Greg T. Hermanson, Bioconjugate Techniques, $2^{nd}$ Ed. 2008) and used as described (U.S. Patent 2008-0212866). Specific bioconjugates and associated QUANTUM DOT-labelled anti-hapten antibodies are listed below at Table 4.

TABLE 4

Primary antibody-hapten conjugates and associated anti-hapten-quantum dot conjugates.

| Primary Antibody | Hapten bioconjugated to primary antibody | Associated anti-hapten: Quantum dotot conjugate |
|---|---|---|
| Phospho-AKT Ser473 | DIG | Anti-DIG: QUANTUM DOT565 |
| Phospho-AKT Thr308 | DNP | Anti-DNP: QUANTUM DOT655 |
| Phospho-PRAS40 Thr246 | NP | Anti-NP: QUANTUM DOT605 |
| Phospho-S6 Ser235/236 | BF | Anti-BF: QUANTUM DOT525 |
| Phospho-eIF4G Ser1108 | TS | Anti-TS: QUANTUM DOT585 |
| Phospho-ERK1/2 Thr202/Tyr204 | NCA | Anti-TS: QUANTUM DOT705 |

The following breast markers were purchased from Ventana Medical Systems, Inc. and used according to the manufacturer's recommendations: CONFIRM anti-Estrogen Receptor (ER) (SP1) (Cat #790-4324), CONFIRM anti-Progesterone Receptor (PR) (1E2) (Cat #790-2223), PATHWAY anti-HER-2/neu (4B5) (Cat #790-2991), CONFIRM anti-Ki-67 (30-9) (Cat #790-4286) and INFORM HER2 Dual ISH DNA Probe Cocktail Assay (VMSI Cat #780-4422). PTEN D4.3 was purchased from Cell Signaling Technologies (Danvers, Mass.).

B. Cell Models and Tumor Tissue Specimens

Breast cancer cell line model SKBR3 and the prostate adenocarcinoma cell line model LNCaP were cultured in McCoy's 5A medium supplemented with 10% FBS. SKBR3 cells were treated with the ATP-competitive pan-AKT kinase inhibitor drug GSK690693 at low nanomolar concentration (250 nM) for 24 hrs for antibody validation studies. After drug treatment, cells were washed using cold 1×PBS, fixed in cold 10% Neutral Buffered Formalin and embedded in paraffin for sectioning and slide preparation.

Slide preparations of paraffin embedded LNCaP cells untreated or treated with the PI3K inhibitor LY294002 (SignalSlide® Phospho-Akt (Ser473) IHC Controls; Cat #8101) were purchased from Cell Signaling Technologies (Danvers, Mass.). Tumor specimens were prospectively procured by Indivumed GmbH (Hamburg, Germany (Table 5)), or by OHSU Knight Diagnostic Laboratories (KDL).

TABLE 5

Breast cancer specimens prospectively procured by Indivumed.

| Tumor Specimen | Diagnosis | Tumor Size (cm) | Ischemia Time (mm) |
|---|---|---|---|
| 1-CA | moderately differentiated ductal carcinoma | 4.5 | 16 |
| 2-CA | moderately differentiated ductal carcinoma | 2.5 | 13 |

TABLE 5-continued

Breast cancer specimens prospectively procured by Indivumed.

| Tumor Specimen | Diagnosis | Tumor Size (cm) | Ischemia Time (mm) |
|---|---|---|---|
| 3-CA | poorly differentiated ductal carcinoma | 2.7 | 15 |
| 4-CA | poorly differentiated ductal carcinoma | 3.3 | 10 |
| 5-CA | poorly differentiated ductal carcinoma | 3.5 | 6 |

Cold ischemia times for the Indivumed specimens were 16 minutes or less FFPE breast tumor specimens with invasive ductal carcinoma (IDC) were retrospectively procured from OHSU Pathology. Calu-3 xenografts were procured at Ventana Medical Systems, Inc. (Tucson, Ariz.). All Indivumed, and Calu-3 xenograft specimens were fixed using the rapid two temperature fixation methodology described in Chafin et al. 2013 (incorporated herein by reference) and embedded in paraffin. Breast tumor-IDC samples were fixed in formalin, processed, and paraffin embedded using standard clinical practice. Areas of interest were punched from paraffin blocks with 1-2 mm coring devices, and re-embedded. All the FFPE specimens were cut as 4 µm thick serial sections for slide preparation, and one serial cut within 24-48 µm distance was stained by hematoxylin and eosin (H&E) according to standard protocols. Calu-3 xenograft slides (Fogh et al., 1977) were treated either with phosphatase buffer alone or with the addition of X. phosphatase (New England Biolabs, Ipswich, Mass.) to evaluate phospho-epitope specificity of primary antibodies.

C. Immunoblotting

Protein samples from SKBR3 cells were prepared by denaturing cell lysate in an equal volume of Laemmli sample buffer (Biorad, Hercules, Calif.) with 0.5 M dithiothreitol at 100° C. for 5 min. Proteins were separated by SDS-PAGE, transferred to polyvinylidene difluoride membranes, blotted with primary antibodies and detected with horseradish peroxidase-conjugated secondary antibodies. Protein bands were detected using ECL (Thermo Scientific).

D. Immunolabelling of Cells and Tumor Samples

Bright field IHC using DAB based detection was performed on FFPE specimens LnCap, SKBR3 and Calu-3 xenografts to determine optimal assay conditions for primary phosphoantibody staining using a Benchmark XT autostainer (Ventana Medical Systems, Tucson, Ariz.). The ULTRAVIEW UNIVERSAL DAB Detection Kit (VMSI Cat #760-500) was used. When necessary, either the OMNIMAP anti-Rb HRP component of the OMNIMAP DAB anti-Rb Detection Kit (VMSI Cat #760-149) or an anti-hapten specific-HRP secondary antibody conjugate was substituted for the ULTRAVIEW DAB Multimer (e.g. for unconjugated primary antibody or anti-hapten conjugated primary antibody evaluation, respectively). All HRP conjugates were incubated at 37° C. for 8 minutes.

Immunostaining for fluorescence spectral imaging was performed on FFPE specimens of SKBR3 cells and tumor tissue on a Benchmark XT autostainer (Ventana Medical Systems, Tucson, Ariz.), to evaluate phosphoprotein staining with the hapten-anti-hapten chemistry in FFPE cell and tumor specimens. All FFPE specimens (cell models, xenograft or tumor tissues) were subjected to automated deparaffinization in EZPREP buffer (VMSI Cat #950-102), and cell conditioning with CC1 buffer (VMSI Cat #950-124) for 90 min prior to antibody incubations. FFPE specimens were incubated with a single or a cocktail of hapten-conjugated primary antibodies (pS6:BF, pAKT 5473:DIG, peIF4G:TS, pPRAS40:NP, pERK 1/2:NCA, pAKT T308:DNP at 5, 15, 20, 20, 30, 12.5 μg/mL respectively) at 37° C. for 32 minutes. Following the primary antibody incubation step, samples were incubated by appropriate combination of secondary anti-hapten antibody QD conjugates (anti-BF: QD525, anti-DIG:QD565, anti-TS:QD585, anti-NP: QD6051, anti-NCA:QD625, anti-DNP:QD655 at 40, 50, 50, 70, 40, 30 nM concentrations respectively) at 37° C. for 32 minutes. Following automated staining with antibodies, samples were dehydrated in ethanol series, followed by xylene, and mounted using Cytoseal 60 (Thermo Scientific).

E. Pathologist Scoring and Identification of Tumor Regions

Tumor specimens from patients were stained by IHC for breast cancer functional markers ER, PR, Her2, Ki-67, PTEN and Her2 Dual ISH for INDIVUMED tumor specimens, and ER, PR, Her2 for OHSU-IDC specimens. Functional markers were purchased from Ventana Medical Systems, Inc. and used according to the manufacturer's recommendations. IHC staining of the breast cancer markers was scored by a Board certified pathologist according to standard practice (Wolff 2007, Hammond, 2010). A board certified pathologist identified the tumor regions on the H&E stained serial sections at 24-48 mm interval.

F. Mutational Analysis of Tumor Specimens.

Tumor samples were screened for relevant gene mutations. Pathologist identified tumor regions from the unstained FFPE sections were isolated for DNA extraction. 20 ng of DNA derived from FFPE tissue was amplified by PCR for mutational analysis, by using a panel that covers coding exons of 37 genes known to play a role in cancer. A custom Ion AMPLISEQ (Ion Torrent) solid tumor panel (Beadling 2013) was used to generate target amplicon libraries. Details of amplicon library preparation and sequencing are explained in Supplementary Methods: Preparation of amplicon libraries. For the OHSU IDC samples, mutational screening was performed using a multiplexed PCR-mass spectroscopy-based technique encompassing 643 point mutations in 53 genes, as previously described (Ang 2014). Gene mutations detected by sequencing are listed in Table 6.

G. Image Analysis

The imaging strategy utilized a closed-loop stabilized metal-halide arc light source (Exfo Exacte, Lumen Dynamics, ON, Canada, part # P010-00201R) capable of repeatable illumination fluence at the sample plane with less than 1% variation in absolute illumination level; the illumination level can also be adjusted in a linear manner at 1% increments. The illumination source provides a mechanism for calibrating the output at the sample plane to absolute units using an optical power measurement system (X-Cite Optical Power Meter and Sensor, Lumen Dynamics, ON, Canada, part # P010-00245R). This calibration device was used to calibrate the microprocessor in the light source to ensure that precisely 100 mw of excitation illumination was delivered to the sample plane through the imaging optical train and filters for each data acquisition.

In order to ensure that variations in staining intensity were due to variations in reporting molecule concentration, we ensured that the field of imaging was evenly illuminated. The Exfo Exacte light source is coupled to the microscope through a liquid light guide that serves to homogenize the light source prior to coupling to the microscope. Once coupled the field illumination is set up in a conventional Kohler fashion for incident light excitation. This configuration was confirmed to produce even field illumination across the region captured by the spectral imaging device.

The imaging system was based around a Zeiss Axiolmager M2 (Zeiss, Thornwood, N.Y., part #4300049902) stand equipped with a Zeiss-Marzhauser automated stage (part #4320249903) and automated z-axis. Filter turret (part #424907), camera ports(part #425504), and objective turret (part #424505) and tube lens turret(part #4253029901) all provided automation interfaces which were used to enable automated acquisition through custom software (VAIS Acquire)

For tissue anatomy pre-scan imaging broadband transmitted illumination was filtered through an interference filter (Omega Optical, Burlington, Vt. part #710DF20) to provide 710-nm wavelength illumination in a circumfrential oblique darkfield illumination strategy.

Tissue area pre-scans were collected using an EC Plan-Neofluar 10x/0.30 NA objective lens (Zeiss, Thornwood, N.Y., part #4203409901). A 0.5x c-mount adapter was used on the camera port set up for anatomy pre-scan imaging

TABLE 6

PIK3Ca genomic and expanded breast IHC biomarker profiles of Indivumed specimens.

| | Genomic Profile | | | | | Breast marker IHC/ISH Evaluation | | | | |
|---|---|---|---|---|---|---|---|---|---|---|
| Specimen | Genomic Mutations | Exon | Genotype | ER (% positive) | PR (% positive) | HER2 (Clinical) IHC | HER2 (Clinical) ISH | Ki67 (40x) - Hotspot | PTEN | Notes |
| 1-CA | PIK3CA | 9 | E545K | 100 | 1 | 2+ | Not amplified | 8% | 2+ in 100% | |
| 2-CA | all tested | | WT | 100 | 100 | 1+ | Failed | 15 | 2+ in 100% | |
| 3-CA | AKT1 | | E17K | 100 | 100 | 0 | Not amplified | 80 | 2+ in 100% | |
| 4-CA | all tested | | WT | 0 | 0 | 0 | Not amplified | 95 | 0 in 100% | Large area of infarct/TNBC |
| 5-CA | PIK3CA TP53 | 20 7 | H1047R R248W | 0 | 0 | 3+ | Amplified | 100 | 0 in 80%; 0-1+ in 20% | PTEN staining present particularly around necrotic areas |

(Zeiss, Thornwood, N.Y., part #426112). The 0.5× c-mount adapter was a provision to permit use of an imaging beamsplitter (Photometrics Dual-View 2, Photometrics, Tucson, Ariz.) that was configured to enable use of a fluorescent nuclear counterstain combined with the darkfield tissue image such that a 2-color tissue scan could be rapidly gathered and rendered in a manner analogous to a 2-color hematoxylin and eosin (H&E) image. For this study, use of only the refractive index (darkfield) component was deemed sufficient to recognize regions of tissue pathology that could be confirmed with an H&E stained serial section. Tissue area pre-scans were captured on a Photometrics CoolSNAP ES2 12-bit monochrome CCD camera (Photometrics, Tucson, Ariz.) based on a Sony ICX 285 microlensed chip with 6.5 micron pixels, with closed-loop cooling to 0 degrees C.

A refractive index contrast image of the tissue anatomy was produced that could be digitally rendered for annotation by a physician. In order to enable selection of tumor areas for multiplex imaging, the tissue regions were imaged using transmitted dark-field illumination at a 20-nm bandwidth centered around 710-nm wavelength. This method permits contrast of the overall tissue anatomy based on slight refractive index differences of the tissue from the surrounding mountant, but does not pose a risk of photodamage to fluors or tissue autofluorescence. Thus, high levels of illumination may be used and exposure times kept short for rapid acquisition of large areas.

By viewing the refractive image of the multiplexed stained tissue in a digital viewer, the technician was able to locate and annotate areas of interest (AOI) that were to be acquired using spectral imaging at high resolution to detect and quantify biomarkers. This permitted the refractive index image to be compared to a serial section of the same tissue that was stained with hematoxylin and eosin to confirm areas of anatomic pathology.

The camera used for spectral imaging was based around an uncooled implementation of the Sony ICX 285 monochrome chip with 6.5 micron pixels. The sensors used for spectral imaging were evaluated and characterized to provide 62 dB dynamic range digitized to 4096 grey levels at less than 1% deviation from linearity. Exposure times for interferometric capture were on the order of 10-ms and so the impact of dark current on noise was negligible compared to the read noise.

The excitation/emission filters for spectral fluorescence imaging were as follows: 380-nm center wavelength with 50-nm bandwidth for excitation (Omega Optical, Burlington, Vt., part # QMAX/EX355-405/25); dichFOVc beamsplitter with reflection band below 410-nm (Omega Optical, Burlington, Vt., part # XF2004/25.7*36), and a long pass filter with deep blocking transition at 420-nm (Omega Optical, Burlington, Vt., part #3001372).

All fluorescent spectral imaging was captured with a Plan-Apochromat 20×/0.8 NA M27 objective lens (Zeiss, Thornwood, N.Y., part #4206509901) A 1× c-mount was used on a second camera port for spectral image acquisition. In order to mitigate effects of chromatic aberration, z-stacking at 3 positions with overlapping depth of field was used. This practice was determined to permit capture of focused images of reporters across the detection spectrum under practical conditions.

Spectral data acquisition utilized a Sagnac interferometer (Applied Spectral Imaging, Migdal Ha'Emak, Isreal) coupled to the c-mount output consistent with the manner described in literature (Malik, et al. 1996, Garini, et al., 2006). The interferometer output is coupled to a CCD camera integrated into the spectral imaging device to digitize the interferogram at a series of path lengths.

In order to provide a fiducial wavelength reference encoded into the unprocessed spectral cubes, a 488-notch filter (Semrock, Inc., Rochester, N.Y.) was placed into the detection path in infinity space between the objective and the interferometer. The tissue autofluorescence has a broad peak covering the blue range of the spectrum and this notch filter encodes a narrow local minima into the tissue autofluorescence component of the raw data. This local minima spectral feature is then detected in analysis software and used to calibrate the alignment of reference spectra for the various emitting components to be unmixed in the analysis. This encoded calibration ensured that any small shifts in wavelength mapping in the raw data due to temperature-dependent fluctuation of the interferometer optics was mitigated to minimize potential for loss of precision in unmixing.

Custom system automation and acquisition software was developed in Python ['Ventana Analytical Imaging System' (VAIS) ACQUIRE] to configure and orchestrate the pre-scan and spectral automated acquisition workflow. The acquisition software leveraged a Python interface to low-level instrument control libraries for microscope, light source and pre-scan camera control. The software GUI permitted interactive selection of areas of relevant anatomic pathology, selection of structured sampling density over tumor area of interest (50%), selection of z-plane (3 planes at 1 µm spacing) such that they can be saved and reloaded to permit efficient repeating of acquisitions with identical instrument configuration. The acquisition interface permits definition of complex acquisition schemes, such as spectral acquisition at multiple z-planes, repeated over a series of regions sampling a large tumor area Basic control and low-level configuration of the interferometer were enabled through the ASI Spectral Imaging application (Applied Spectral Imaging, Migdal HaEmek, Isreal). High-level automation was enabled through our custom interface, which controlled the spectral imaging device indirectly through the ASI application.

The settings for the interferometer were optimized to produce wavelength images at approximately 100 sample points over the visible range between 400-nm and 800-nm wavelength after the interferograms were Fourier Transformed into the spectral image cubes representing 2-dimensions of space at approximately 100 wavelengths. For fluorescent spectral acquisition the exposure time was standardized to 8-ms per frame for the acquisition of the interferogram, this time was selected to provide signal within ¾ of the CCD well capacity for the brightest fluorescent samples encountered in experiments.

Custom analysis software ['Ventana Analytical Imaging System' (VAIS) ANALYSIS] was developed in Python to enable specialized processing of multidimensional raw data and distillation of relevant features for measurement, visualization, plotting and spreadsheet export. Unmixing of overlapping analyte signals was performed using an unconstrained least squares fitting approach (Garini et al. 2006) commonly used for decomposition of fluorescent signals.

Data was collected at magnification (32×) and captured high-resolution spectral data at each field coordinate in the grid. The data for each field were collected at multiple z positions through the z-axis to ensure capture through the tissue thickness and to alleviate axial chromatic aberration (colors coming to focus at different depths in the specimen).

The individual fields within an AOI were collected and stored in a directory structure so that the fields for an AOI could be grouped using the VAIS ANALYSIS software for further analysis. The data organization and dataset creation interface permitted grouping of fields for comparison.

After the multiplexed marker data was acquired, the analyte channels were unmixed through linear least-squares unmixing against reference spectra to glass, tissue autofluorescence, and each reporter quantum dot (525, 565, 585, 605, 625, 655) to provide pure analyte channel images that represent the staining intensity for each marker as captured under standardized conditions. The unmixing algorithm was determined to produce accurate results though experiments mixing multiple bands of transmitted and reflected light through the imaging system and performing the unmixing operation on the resulting control data. The performance of unmixing was further noted to reliably segment multiple markers that were targeted to different cell compartments in tissue. In this manner the accuracy of the spectral unmixing could be evaluated through inspection of the spatial localization of the signals in the resulting unmixed analyte images.

The unmixed stain channels for each field in a dataset were further segmented to select features of interest based on morphometric properties (size) and photometric properties (signal intensity range). These segmentations persist as part of the dataset object and can be re-segmented by opening the dataset in a VAIS viewer and changing the segmentation parameters, followed by saving the dataset under a new name.

Automatically segmented features were further inspected and edited by a technician using the VAIS viewer with annotation tools to mark features for analysis. In this manner, experimenters were enabled to designate areas that are to be included or excluded from analysis. As an example, investigators would designate a necrotic area be excluded from any downstream analysis. These annotations then persist as part of the 'dataset' and can be edited by other technicians who open the dataset with a specialized viewer and appropriate permissions.

Once a dataset is loaded into the heterogeneity analysis interface, each analyte for each field is loaded into an image 'stack' (3D array) such that the x and y axis are spatial coordinates and each layer of the z axis represents a different analyte map. Each field image stack is appended to the prior image stack on either an x or a y edge, so that the fields are tiled into a large x,y,z image that represents the tumor area. As each analyte field is loaded, the areas of each field that had been previously annotated to be included are left intact, and other areas were set to a value of zero.

Parameters were standardized to control whether pixels in the loaded layers are subjected to a median filter to homogenize signal over a given footprint area, or whether the signals are averaged over a given footprint area. For this study, the image resolution was reduced 75% to average over an 8×8 pixel footprint and a median filter was applied with a 2 pixel radius. These parameters determined the size of each 'super pixel' or unit area that is input to the cluster algorithm and served to decrease the impact of local fluctuations in signal due to noise. The next was the grouping of areas of similar expression pattern into 'clusters'. For cellular expression and activation heterogeneity analysis, we selected an algorithm that would find the denser 'point-clouds' formed in n-dimensional space, each point representing the vector formed by the 6 intensity values measured for our analytes. A density-based clustering algorithm called Mean-Shift (Comaniciu & Meer, 2002) was implemented. The Mean-Shift algorithm was adapted to segment differing expression patterns in our multiplex datasets. The cutoff for similarity in multi-marker expression specified through a parameter (Bandwidth) that describes the distribution cutoff. A Bandwidth Estimator function (Comaniciu & Meer, 2001, http://scikit-learn.org/stable/modules/generated/sklearn.cluster.estimate_bandwidth.html and https://github.com/scikit-learn/scikit-learn/blob/c957249/sklearn/cluster/mean_shift.py#L31) was used to determine the bandwidth to use, the bandwidth estimator takes inputs of number of pixels to sample and a quantile parameter. The bandwidth estimator samples a number of regions from the image (500 in the examples here), and determines bandwidth from the samples and the quantile (we used a quantile of 0.75, 0.5 is the median of pairwise distances between sample values).

The input to the Mean-Shift clustering algorithm is the tiled dataset image stack, and the output is an x,y array where the x and y coordinates are the spatial coordinates of the input tiled image stack, and the value at each xy position is a label that indicates the cluster number to which a given pixel belongs. Therefore, in the output array, pixels with a value of '1' belong to cluster number 1, pixels with a value of '2' belong to cluster number 2 and so forth for as many clusters as have been segmented by the algorithm.

A 'cluster map' was created by assigning a color to each number in the cluster output array and displaying on a computer screen. In this manner, cluster '0' may appear as a white area, pixels associated with cluster '1' are colored red, pixels associated with cluster '2' yellow, and so forth. The cluster map and the color overlay of the analyte images may be placed in alternate windows of a specialized image viewer to optical configuration for data collection compare the spatial areas of various clusters with the relative expression level of different markers. The cluster map effectively identifies areas of similar and differing expression or activation pattern for multiplexed biomarkers in anatomic context. In this way, the relationship between areas of differing expression or activation is readily visualized.

The cluster analysis output array was used to segment areas on the tiled input image stack and measure the values for each analyte at each 'pixel' (unit area) in a cluster area. In this way, the distribution of intensity values (reflecting expression level or activation) for a given biomarker was plotted using a box plot, for each analyte, in a per-cluster fashion and a row for each pixel or unit area.

H. Biomarker Intensity Analysis

Phosphorylation levels of all PI3K pathway proteins in stained cells and tumor tissue samples were quantified from the intensity of unmixed channels representing the staining intensity contribution for each marker. The averaged intensity for each image field was calculated from thresholded pixels (pixel values below 1 percent of the brightest signal in the field were excluded to remove non-relevant pixel contributions from unstained areas, and pixels above 95 percent of the maximum intensity were clamped at the 95 percent intensity level to remove spurious contributions from hot pixels to the average). The overall average intensity of phosphomarkers for each patient was calculated from combined averages of several randomly selected image fields.

I. Signaling Pathway Phenotype-Cluster Analysis

The mean-shift algorithm is a mode-seeking algorithm more generally applied for object tracking in machine vision and segmenting objects in color images. Here we have used the algorithm for segmenting areas based on the similarity of expression pattern among 6 markers. The use of this algorithm yields segmented groups of similar expression pattern in vector space and is tolerant of irregularly shaped distributions. Also, the algorithm functions without having to assume a discrete cut-off point for how 'different' clusters must be or forcing an assumed number of clusters on the data.

Various clustering patterns of phosphoprotein markers were identified by mean-shift cluster analysis implemented in VAIS Analysis using objects from the Scikit-learn Project (Pedregosa et al., 2011) with supporting code to handle multi-field image stacks as input. Input to the mean shift algorithm is an array of vectors, each vector is composed of the 6 marker values averaged for a standardized grid unit of area or 'super-pixel'. Super-pixels can be adjusted in size from single pixels to areas covering many pixels and are tiled in a contiguous fashion across the fields of view comprising the entire dataset being processed. The bandwidth parameter for the mean-shift algorithm was estimated using a bandwidth estimator with input parameters of 0.75 for the quantile and a sample size of 500. The resulting visualization displayed a color coded super-pixel map of each field of view tiled as a single two-dimensional image. A color coded histogram indicating the relative proportion of overall area occupied by each cluster is produced, as well as the distributions of super-pixel values for each marker for each cluster.

J. Hierarchical Dendrogram Analysis of Network Signaling Clusters

To rank similarity between the generated phospho-marker expression phenotypes, a non-parametric hierarchical analysis was used that employs a Euclidean distance metric (Hastie, T. et al. The elements of statistical learning. 2, Springer, 2009). Distances were computed between all combinations of phospho-marker expression phenotypes by calculating the vector difference between each of the phenotypes. Standard agglomerative, bottom-up, hierarchical analysis was used to rank and group network signaling clusters by the smallest Euclidean distances and plotted in dendrogram format.

K. Results

1. Characterization of Multiplexed Tissue Imaging Platform (MTIP) Functionality

A panel of six anti-phospho antibody-QD conjugate pairs were generated for multiplexing (Table 4) consisting of five effector components in the PI3K signaling pathway (pAKT473, pAKT308, pPRAS40, pS6, peIF4G) and one output effector component in the MAPK signaling pathway (pERK), a pathway that is involved in cross-talk with PI3K signaling (ref). A cocktail of all six haptenated anti-phosphomarker antibodies were incubated with tissue followed by incubation with a cocktail of six anti-hapten secondary antibody-QD conjugates (FIG. 14).

Figure 14A:
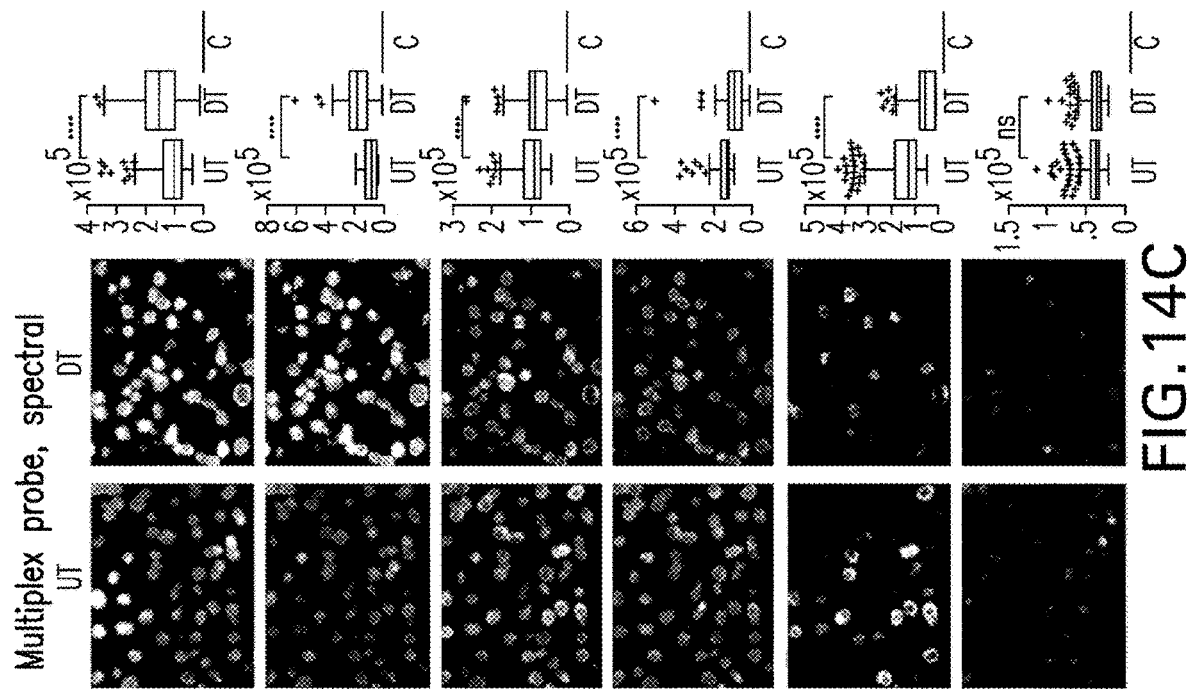
FIGS. 14A-14C: Comparison of staining behavior of haptenized-phosphoantibody-QD probes to reference immunoblots (a) by individual probe IHC as evaluated by immunofluorescence (b) and as a multiplexed cocktail of six haptenized-phosphoantibody-QD probes as evaluated by spectral imaging (c). Cell model were FFPE prepared SKBR3 cells in untreated (UT) and drug treated conditions (DT) using the ATP-competitive AKT kinase inhibitor (GSK690693). a) Immunoblots using unconjugated primary antibodies showing averaged phosphosignaling level of each protein species in untreated and drug treated (24 h) SKBR3 cells. Tubulin shown as control for protein loading. b) Example immunofluorescence images of phosphosignaing activity for each phosphoprotein species in SKBR3 cells as labeled by single hapten-antibody-QD in UT and DT conditions. c) Example spectrally unmixed images of phosphosignaing activity for each phosphoprotein species in SKBR3 cells as labeled by combined staining of all hapten-antibody-QD probes in UT and DT conditions. d) Note the heterogeneity of phosphosignaling strength in individual cells for both single and multiplexed labeling. Box plots corresponding to the spectral data in c) provide quantitative information of phosphomarker intensity as averaged over hundreds of cells from several ROIs. Box plot shown with Tukey whiskers for segmented cells (n=5 ROIs, 171-414 segmented features/condition). Asterisks represent significantly different conditions (p>0.0001), ns=not significant.
Figure 14B:
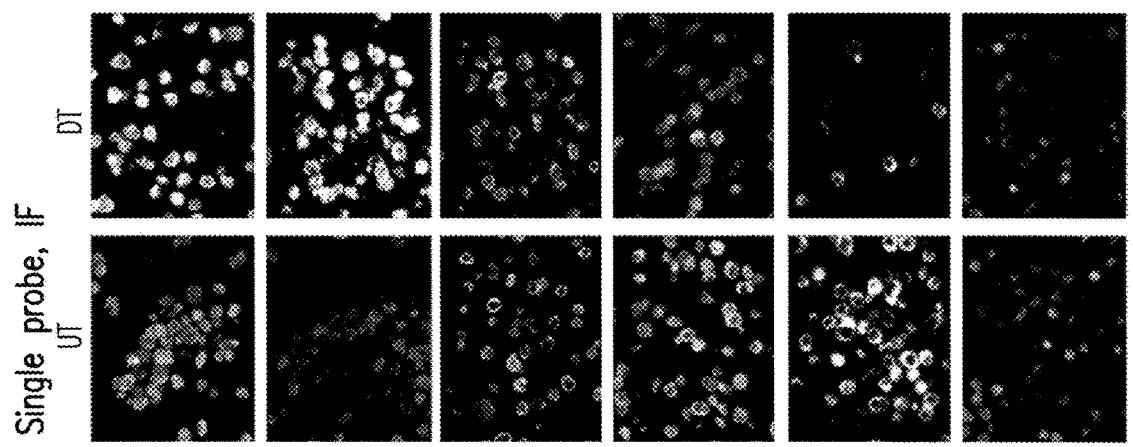
Figure 14C:
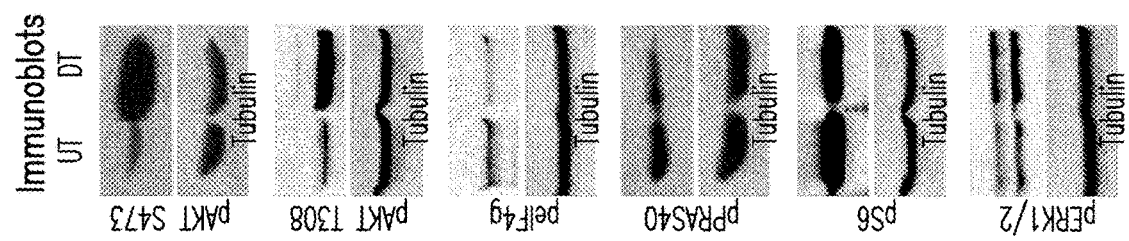
Figure 15A:
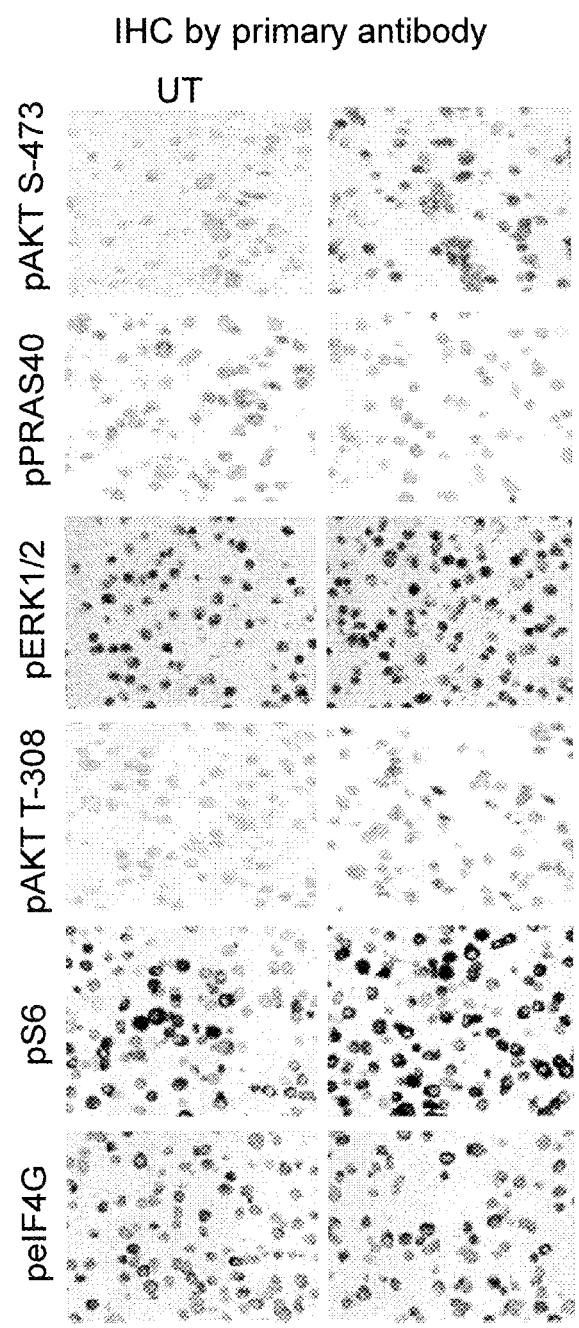
FIGS. 15A-15B: Antibody probe specificity validated by staining PI3K marker activity in untreated (UT) and pAKT inhibitor (GSK690693) drug treated (DT) SKBR3 cell FFPE slides by DAB IHC. (a) IHC staining using primary antibodies, (b) and haptenized primary antibodies using single unconjugated primary antibodies on LnCap cells showed expected reduction of all the PI3K marker activity upon LY294002 treatment and in phosphatase treated Calu-3 xenograft tissues, in comparison to control cell and tissues for all the phosphomarker antibodies.
Figure 15B:
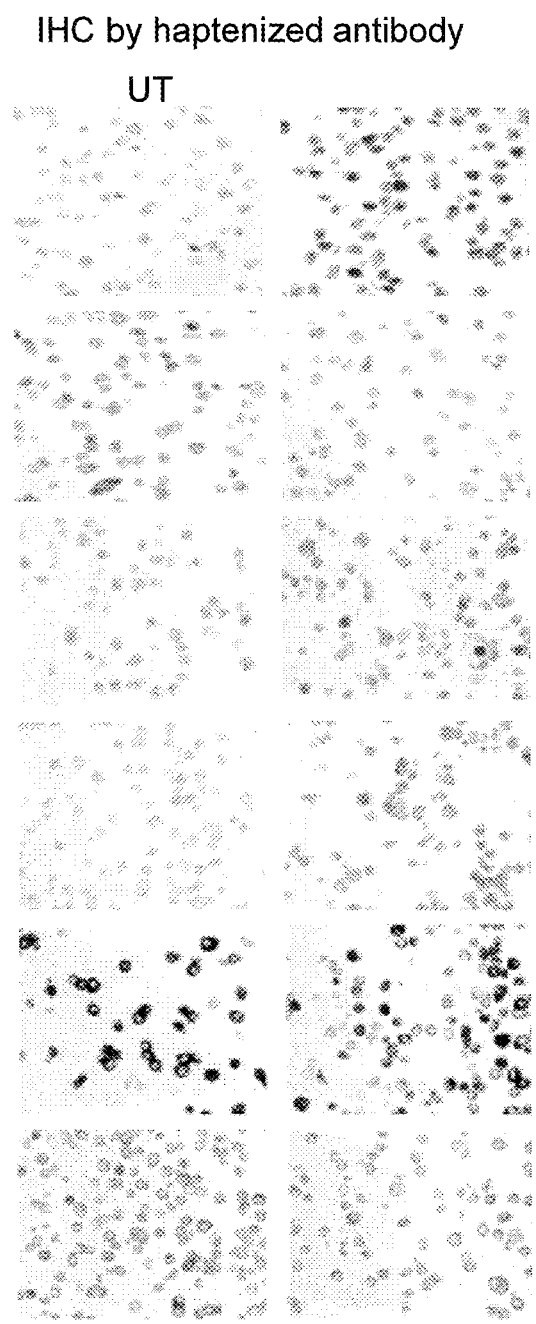
Figure 16:
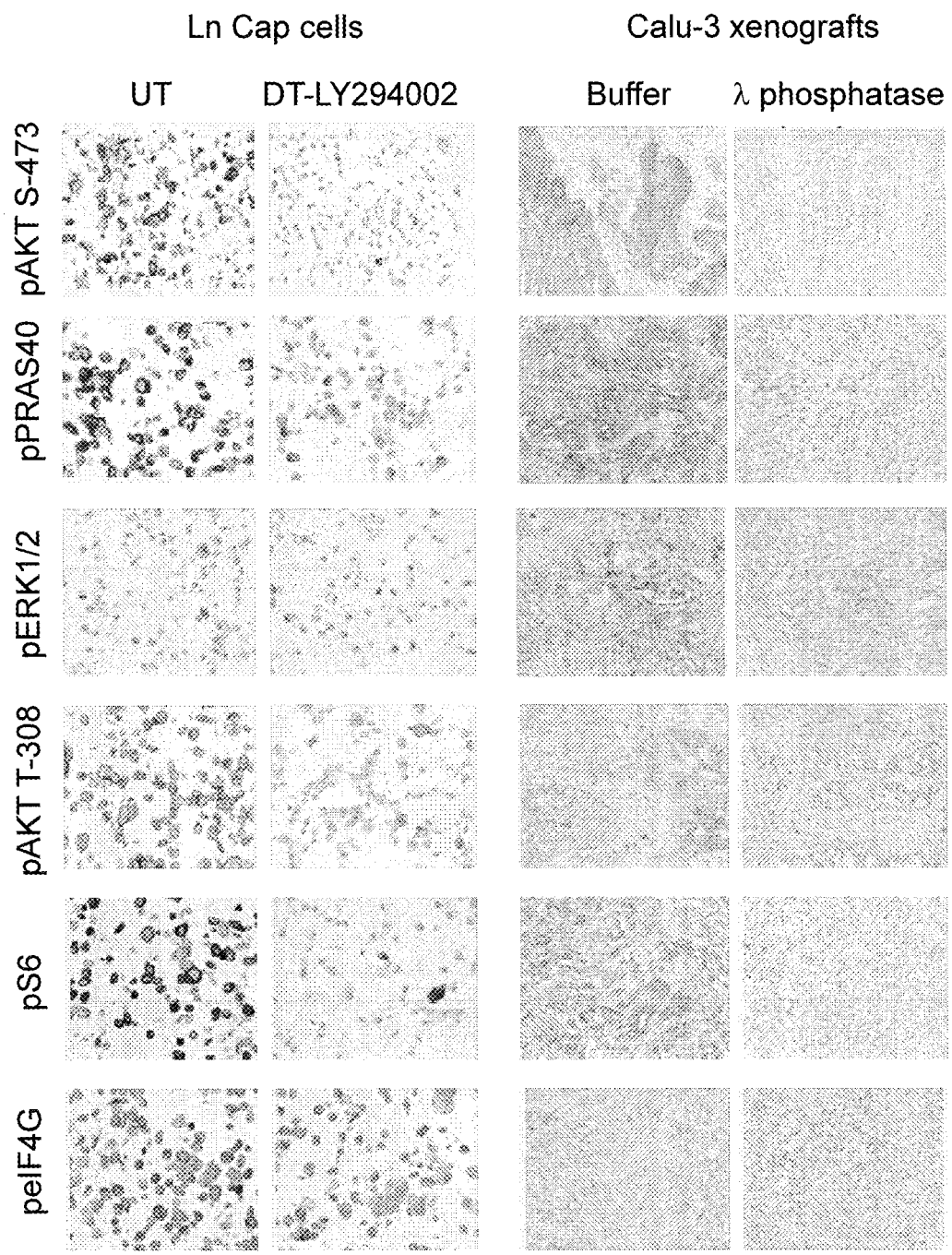
FIG. 16: FFPE-prepared model systems were used to optimize phopshoantibody staining conditions: LnCap cell lines which harbor the pTEN deletion and possess overactive PI3K signaling (McMenamin 1999, Cancer Res) and FFPE-prepared Calu-3 xenograft. LnCap cells and Calu-3 xenografts were, respectively, treated in the absence and presence LY294002 and phosphatase to inhibit PI3K signaling. IHC staining of using phosphoantibodies on LnCap cell lines (left panel) and in λ phosphatase treated Calu-3 xenografts (right panel) by IHC show optimized conditions for five PI3K and one MAPK pathway effector. As expected a broad loss of phopshofunctional expression is apparent in both LnCap cells after treatment with LY294002, and in λ phosphatase treated Calu-3 xenografts.

The specificity of the antibodies selected was tested using a series of IHC experiments using FFPE cell and xenograft model systems (FIGS. 14 15 and 16). The anti-phosphomarker hapten conjugated primary and anti-hapten monoclonal secondary functionality was tested using the SKBR3 cell line, a well-established breast cancer model of PI3K pathway activation (Englemen PNAS ref). SKBR3 cells were either untreated or treated with the AKT small molecule inhibitor GSK690693. The two cell populations were prepared as FFPE blocks and stained using the anti-phosphomarker primaries, followed by anti-hapten secondary antibodies conjugated to HRP to permit contrast through DAB. This permitted verification of the hapten-anti-hapten labeling scheme (FIG. 14; the DAB stain pattern was consistent with primary-anti-species secondary staining performed in parallel).

DAB IHC using single unconjugated primary antibodies on LnCap cell treated with LY294002 demonstrated broad loss of expression for all markers FIG. 15: LnCap). The expected loss of PI3K marker expression upon LY294002 treatment establishes the specificity of the unconjugated primary antibodies. Phospho-specificity of these primary antibodies was then established using phosphatase treated Calu-3 xenograft tissues, in which the staining was significantly reduced in phosphatase treated tissues for all the phosphomarker antibodies (FIG. 15: Calu-3). The functionality of quantum dot conjugated anti-hapten antibodies was evaluated by immunofluorescence (IF) staining on the SKBR3 blocks outlined above. First, the IF staining was performed using one phosphomarker at a time followed by hyperspectral imaging to separate the phosphomarker signal from autofluorescent background signal (FIG. 14a). This process revealed staining intensity patterns that were consistent with the results from DAB staining. This confirmed the expected functionality for our quantum-dot conjugated anti-hapten secondary reagents.

A multiplexed experiment was then conducted using the combined markers followed by hyperspectral imaging and processing to separate the signal contributions for each marker (FIG. 14b). For additional comparison, SKBR3 cell lysates were subjected to immunoblotting with all six phosphoantibodies (FIG. 14c). The results show that the pattern and expression of spectrally unmixed images for each marker are consistent when compared to IF and immunoblot results for the two cell populations (FIG. 14d). Both the AKT markers showed an anticipated relative increase in expression followed by GSK690693 drug treatment (Rhodes 2008). pPRAS40, pERK, and pS6 showed reduction in the expression following the drug treatment, but peIF4G did not show any significant change in the expression. The similarity of phosphomarker expression changes upon drug treatment detected using MTIP to that observed in the IF and immunoblot staining validate the specificity and functionality of the conjugated antibodies used in the multiplexed assay context.

2. MTIP Protein Profiling and Reproducibility

Figure 17A:
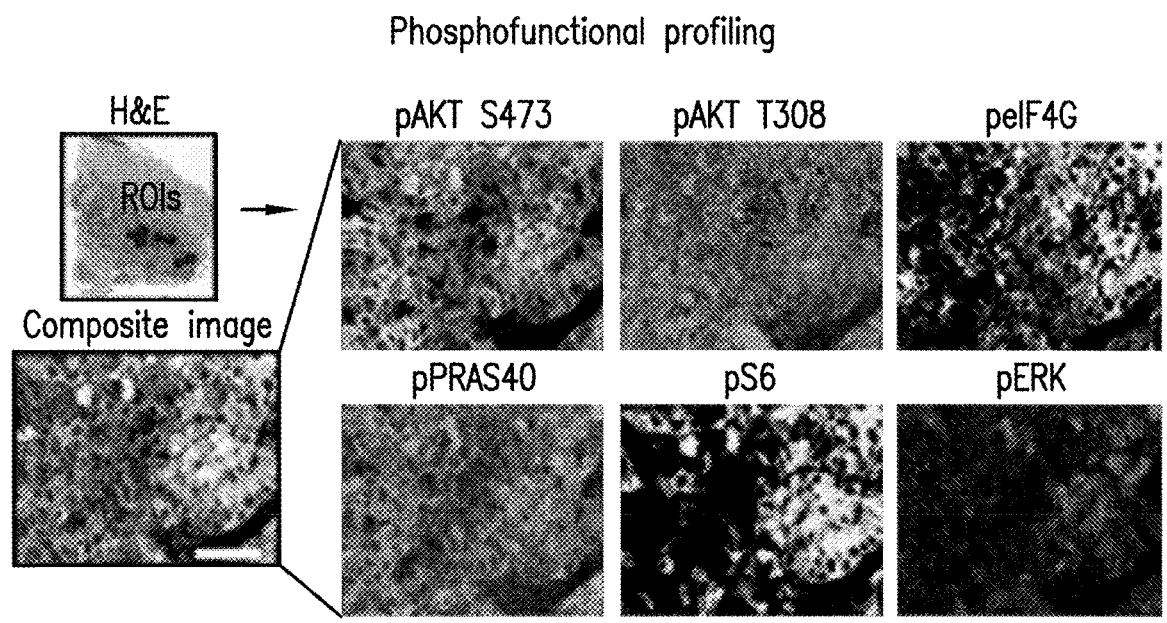
FIGS. 17A-17D: MTIP phosphofunctional profiling and reproducibility. a) ROIs for spectral imaging are randomly obtained in pathologist-annotated breast tumors by corresponding H&E slide (top left). Bottom left image shows the overlay of 6 unmixed, phosphomarker images from one ROI. Unmixed images, corresponding to 6 phopshoprotein channels of the ROI are shown on right side. Scale bar is 50 µm. b) H&E image (left) from one ROI, and the unmixed images 3 phosphomarkers (right of H&E image) are shown to indicate the distinctive phopshoexpression patterns in the epithelial and stromal regions in the tumor. c) The box plots (left) show that phopshoprobes label show higher PI3K signaling levels than in control. 5-CA, n=8 ROIs. C is control specimen stained in the absence of primary antibodies. The box plots (right) show that while PI3K signaling can be distinguished in tumor (T) area versus non-tumor adjacent (TA) areas, non-tumor adjacent areas can show similarity in PI3K signaling, indicating the value of phopshoprofiling information that accompanies morphological structure. Significant differences between the pairs are indicated by asterisks ($p>0.0001$). ns is non-significant. d) Multispectral PP-QD assays reproducibility demonstrated in breast tumor specimens. PP activity measured in serially cut patient tumor, FFPE specimens in triplicate slides/day, and repeated for 3 consecutive days. Number of ROIs imaged per slide=7. Left bar plot shows the normalized mean value of the phosphomarker intensities measured for 3 consecutive days (n=3 slides/day, 7 ROIs/slide). Intensity of each phosphomarker was normalized to the highest mean intensity value of that marker, across 3 days. Right bar plot shows the CV % of the absolute mean intensities, and normalized mean intensities of phosphomarkers measured from 9 serial slides (3 slides/day; 7 ROIs/slide). Mean intensity of each ROI was normalized to the total intensity of all the 6 phosphomarkers in each slide.
Figure 17B:
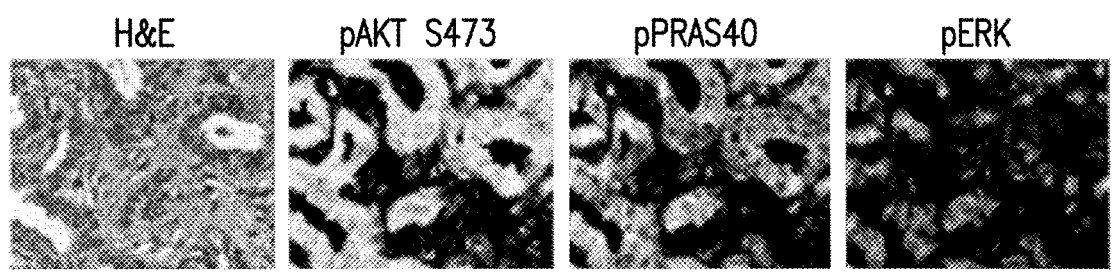
Figure 17C:
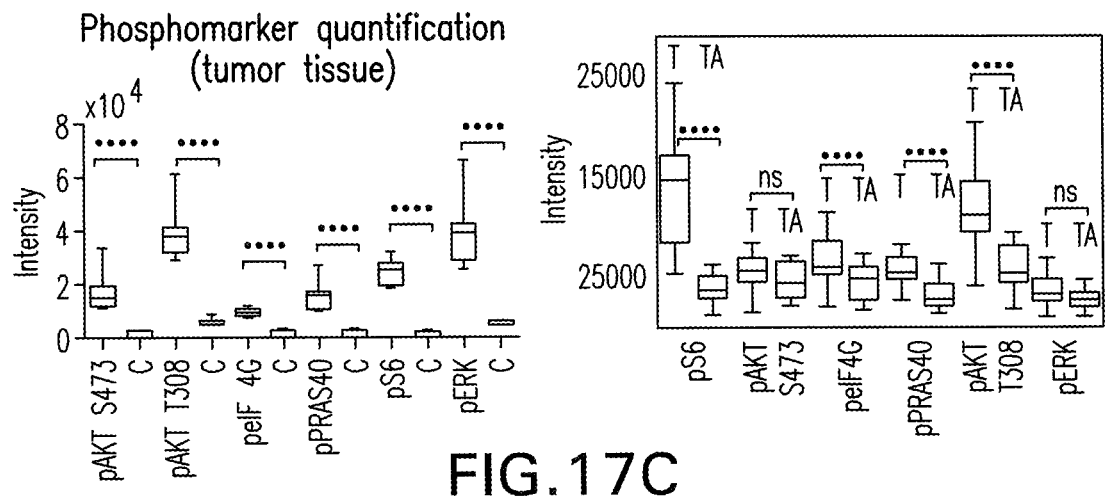

The performance of the MTIP was tested by staining a FFPE breast patient tumor sample with a known H1047R mutation in PIK3Ca confirmed via targeted sequencing (Table 5 and 6), Patient 5. (FIG. 17a). Each panel in FIG. 17a contains the staining pattern for all six phosphomarkers averaged over FOVs that were randomly selected across pathologist marked tumor regions. Spectrally unmixed images of the phosphomarkers from the same FOV shows heterogeneous staining patterns within a tumor region that reflect expected biological expression patterns for each marker. These data demonstrate the MTIP capability to detect multiplexed phosphomarker signaling over a wide dynamic range of expression and with sub-cellular spatial resolution in intact FFPE solid tumor tissue.

Figure 17D:
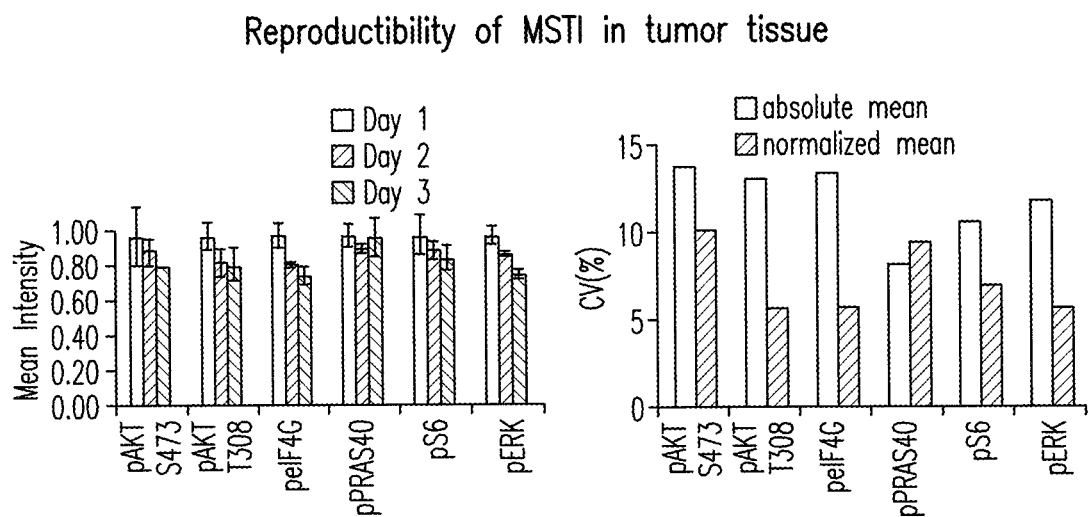

Reproducibility of MTIP performance was established using the Patient 5 sample (FIG. 17D). The assays were repeated in triplicate over 3 consecutive days (total n=9), and the expression levels of each marker measured as an average over the tissue area imaged in homologous ROI in adjacent serial sections The MTIP yields staining level measurements that vary within a narrow margin of 80% for each respective phospho-marker. The coefficient of variation among all the markers varied from 8 percent to 13.8 percent (white bars, left plot, FIG. 17D), indicating a level of reproducibility in the assay platform consistent with College of American Pathologists (CAP) guidelines for laboratory developed biochemical testing.

3. MTIP Protein Profiling in Breast Tumors With PI3K Pathway Mutations

Figure 18A:
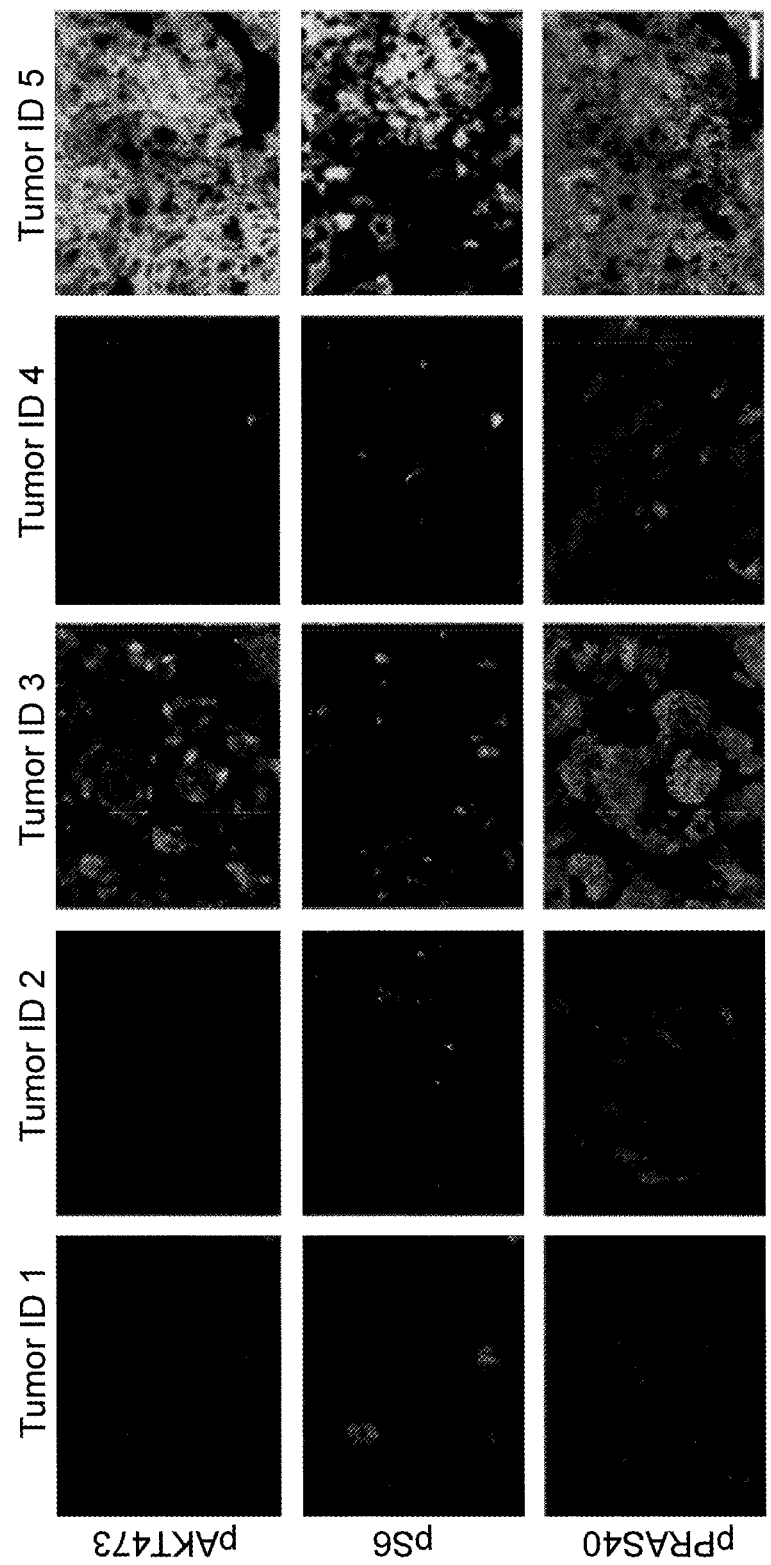
FIGS. 18A-18C: MTIP shows a diverse range of signaling levels for each phosphomarker type and breast tumor tissue. a) Examples showing phosphomarker expression in representative tumor regions from 5 patient tumors. Images processed identically for comparing intensity. Scale bar is 50 b) Box plots show the mean intensity of 6 phosphomarkers for 5 Induvimed patients. Whiskers are 1-99 percentile. n=8 ROIs/tumor. C is control specimen stained in the absence of primary antibodies. c) Mutational and functional characteristics of breast tumors evaluated. Eq is equivocal, representing uncertain diagnosis.
Figures 18B, 18C:
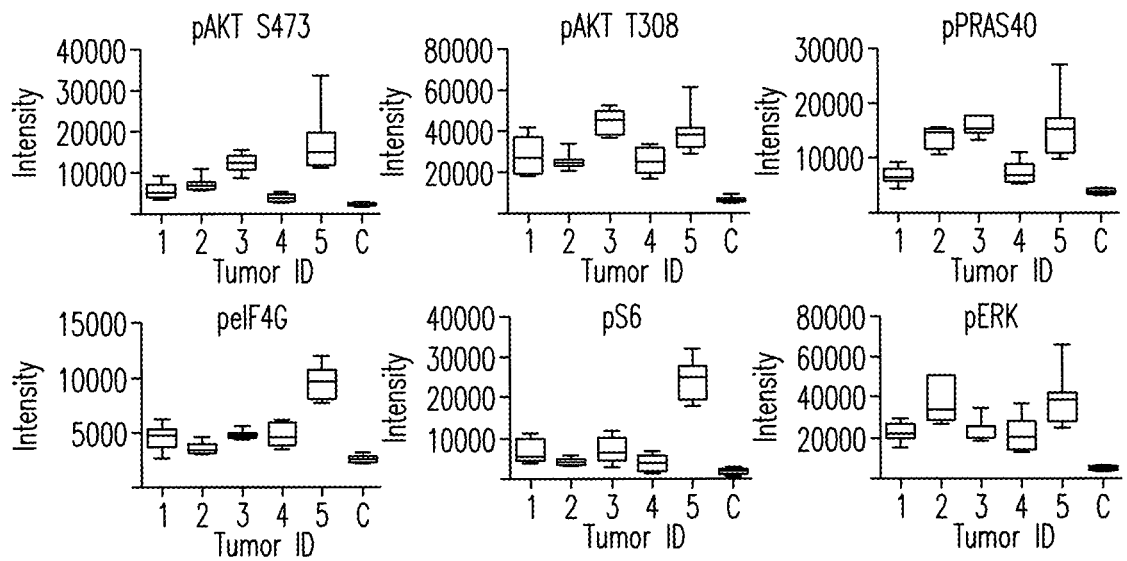

Quantitative, phosphoexpression profiling using MTIP was performed in a cohort of breast cancers representing common genomic aberrations in the PI3K pathway, as determined via targeted sequencing. Serial sections from these samples were also stained with breast markers, including ER, PR, Ki67, Her2 and PTEN, via IHC and scored by a pathologist to better understand other contributors to PI3K activation that may not be evident from genomic status alone (Table 6). MTIP revealed that individual tumors possessed complex patterns of PI3K pathway phosphoexpression (individual ROIs, FIG. 18a; averaged ROIs, FIG. 18b). Second the MTIP revealed significant inter-patient heterogeneity in phosphoexpression. MTIP revealed that PI3K pathway phosphoactivation could not necessarily be predicted by PIK3ca mutation status alone (FIG. 18c). For example, Patient 1 had the E545K mutation in PIK3Ca but did not show high levels of PI3K pathway activation. This specimen was also PTEN+ supporting low PI3K activation. Alternatively, the Patient 5 specimen maintained the H1047R mutation in PIK3ca as well as high Her2 expression and PTEN negativity (FIG. 18c), suggesting that additive inputs factor into PI3K pathway activation. These data indicate that multiplexed phosphoexpression profiling using MTIP may complement traditional IHC biomarker evaluation and genotype information for generating a more comprehensive analysis of tumorigenesis.

4. MTIP Maps Protein Heterogeneity in Breast Tumors

Figure 19C:
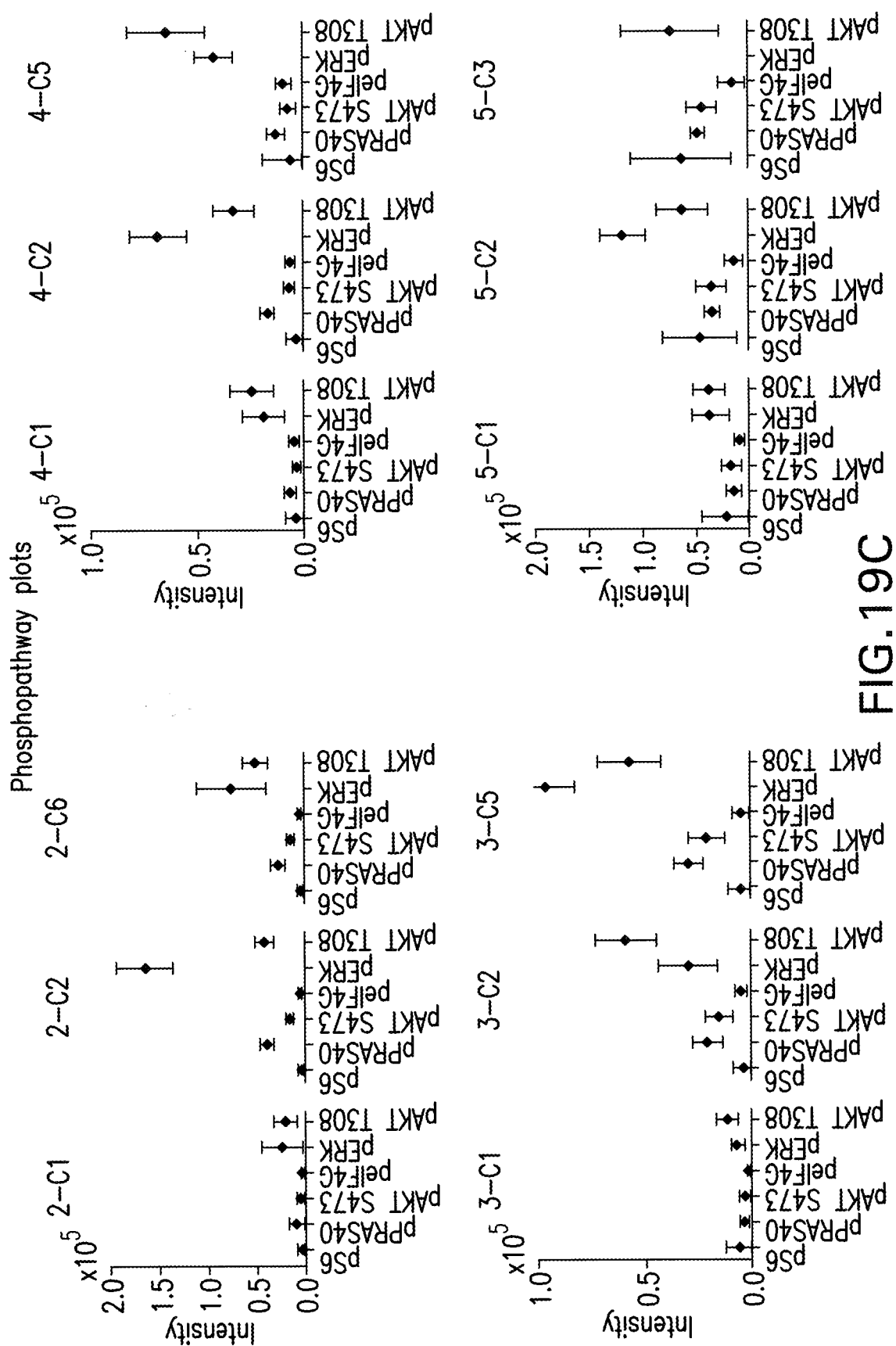
Figure 19D:
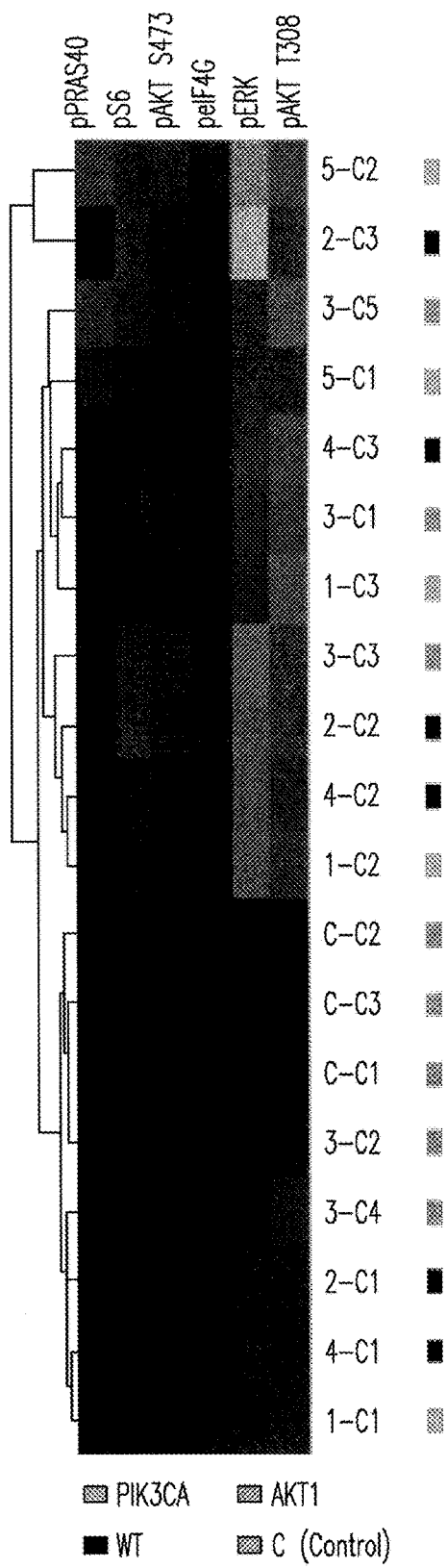

Computational pattern recognition was used to segment areas with similar expression patterns into phenotype populations or 'expression clusters'. Mean-shift cluster analysis was used to identify unique patterns of phosphorylation (FIG. 11). Phenotypes were defined as regions of the tumor that have similar patterns of relative phosphoprotein expression across the six markers; the two-dimensional tumor area belonging to each cluster is color coded to represent a recognized phenotype present in the captured tumor fields (n=8) (FIG. 19a). Each phenotypecluster was color-coded across the spatial expanse of the tumor (FIG. 19b) and the distribution of expression levels measured for each phosphomarker within the three largest phenotype-clusters (in terms of area) were plotted (FIG. 19c). Hierarchical clustering of phenotypes is shown in a heat map and ranked in a dendogram form (FIG. 19d). Examination of color-coded phenotype maps of four example tumors leads to several observations. First, multiple unique PI3K pathway phosphorylation phenotypes are present in a heterogeneous spatial distribution across individual tumors. Each patient has multiple distinct signaling pathway phosphorylation phenotypes within the same tumor tissue. Patient 3 has the same phenotypes recognized in all the regions of interest while patient 4 has some phenotypes unique to a subset of the captured regions. Prominent variability is evident in the pERK and pAKT308 ratios within and between tumors, and patterns of pAKT 473, pRAS40, pS6 seem to vary significantly between patients. Hierarchal analysis showed that expected PI3K pathway phosphorylation phenotypes are not well correlated to the recognized genotype (wild type, AKT1 or PIK3CA mutation) as described by per marker phosphoexpression profiling (FIGS. 18b and c and 19c). In all tumors, stromal tissue is segmented from epithelial tissue by lower phosphoactivation levels of all six PI3K network components (gray colored clusters, FIG. 19a, b, c). It is intriguing to note the presence of phenotypes that appeared only in small cellular groups (FIGS. 19b, 5-CA3, 3-CA1, and 2-CA1); such data indicate the need for further characterization of these particular anomolous epithelial subtypes. Thus, MTIP cluster analysis provides quantitative data on different phopshoactivation phenotypes; this information is lost in orthogonal methods that homogenize tissue material or average over larger areas.

Figures 20A, 20B, 20C:
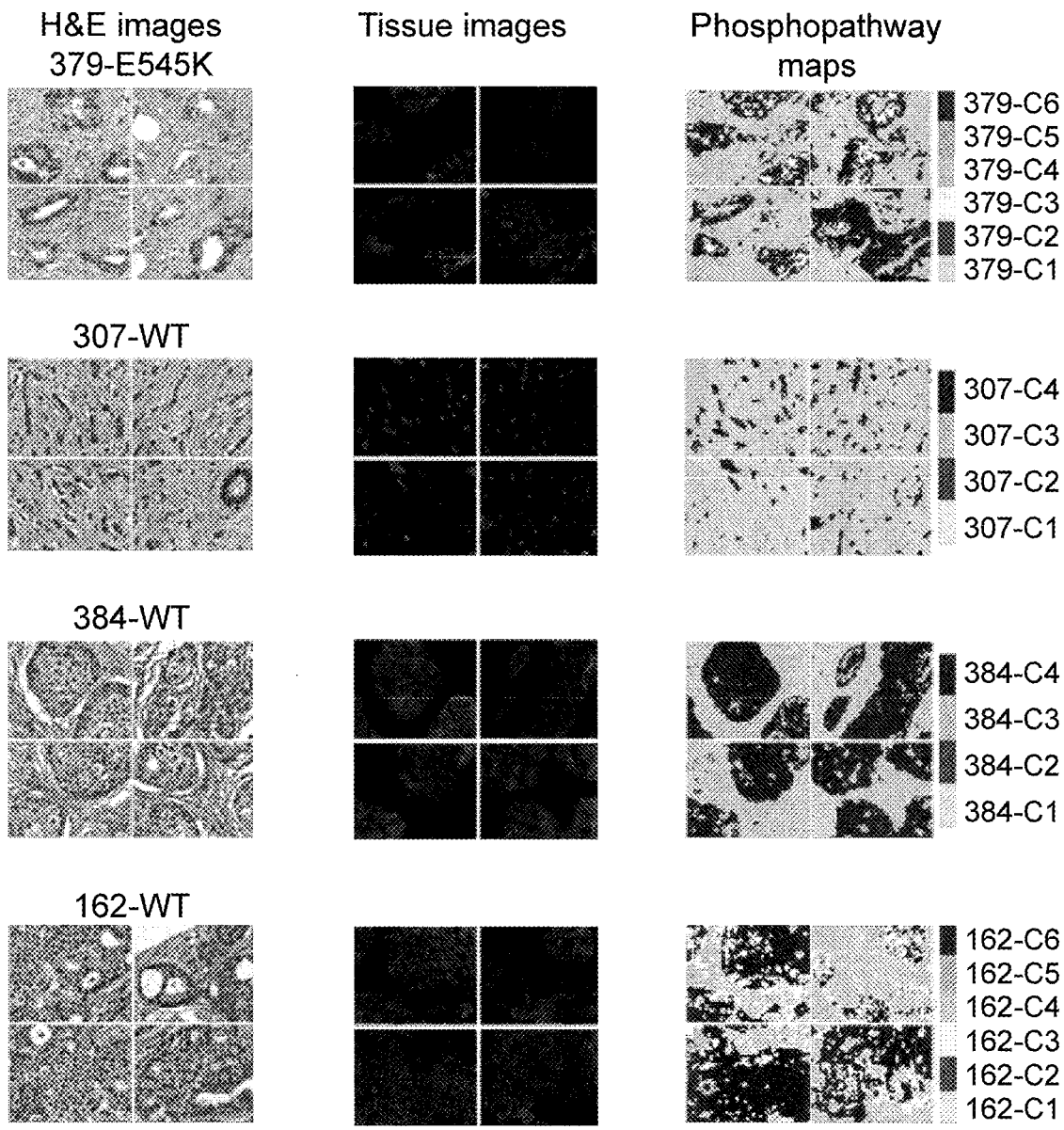
FIGS. 20A-20E: Quantitative analysis of network signaling reveals heterogeneity in phosphoprotein expression that does not group by tumor mutation. a) H&E images from serial sections of tumor lesions used for spectral imaging. H&E sections are 4-16 µm apart from the spectral image sections. b) Spectral images show the overlay of 5 individual phosphomarker layers. Spectral images are in corresponding positions to the H&E images on left panel. c) Cluster maps show the unique phosphoexpression patterns, which are color-coded. Clusters with high stromal content have the suffix '5', and those with high epithelial content have the suffix E. Cluster maps generated by applying mean shift cluster analysis algorithm on the phosphomarker intensities of 4 ROIs/patient. Scale bar is 80 µm in a, b, c and d. d) Cluster plots show the quantitative measurements of 5 phosphomarker intensities. 4 representative major cluster plots are show for each patient. The area of tissue occupied by each phosphomarker in clusters 379-C1, C2, C3, C6 are 60.1%, 32.9%, 6.15%, 0.15%; in clusters 307-C1, C2, C3, C4 are 89.1% 9.7%, 0.76%, 0.47%; in clusters 384-C1, C2, C3, C4 are 44.8%, 49.9%, 4.92%.
Figure 20D:
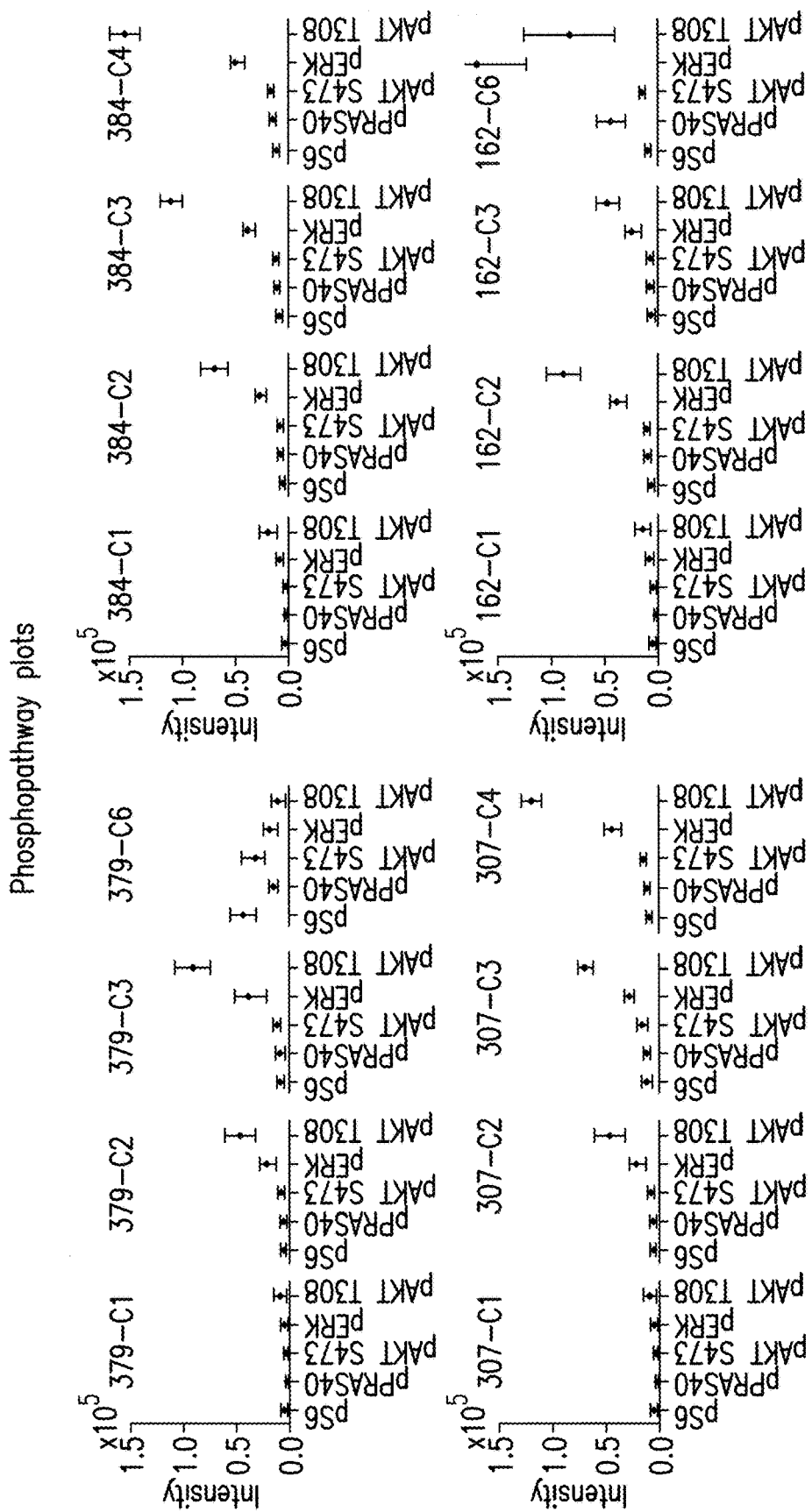
Figure 20E:
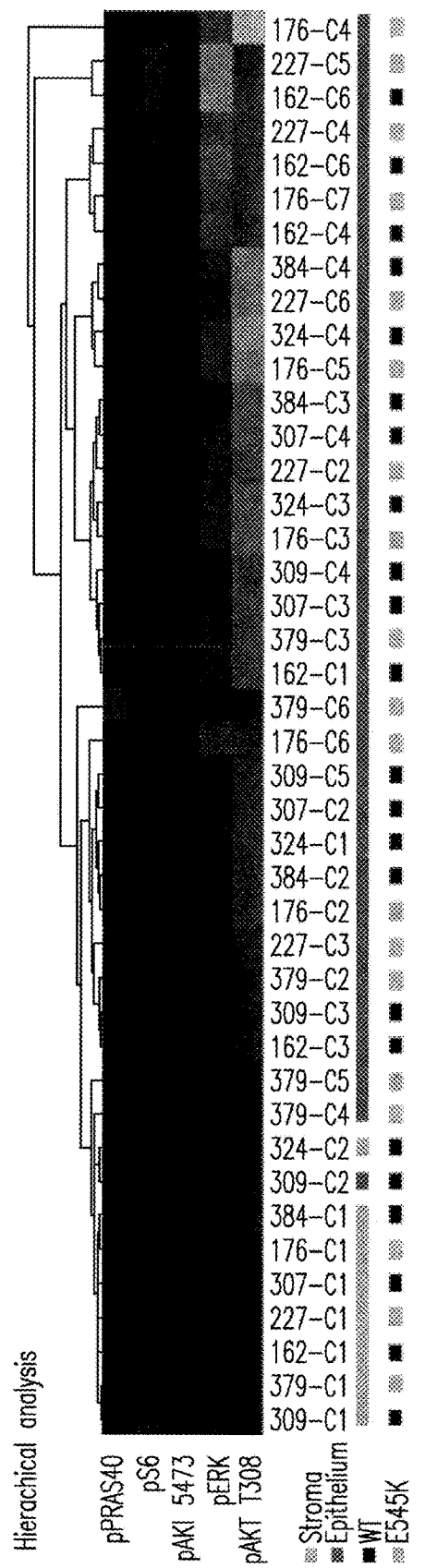

To further understand the heterogeneity of specimens with an identical PI3K pathway mutation, phosphosignaling network heterogeneity was evaluated in breast lesion specimens (FIG. 20) with well-defined regions of invasive ductal carcinoma (IDC) that were either PIK3Ca WT or PIK3Ca E545K (which has been shown to activate PI3K pathway signaling [Zardavas et al. 2014)]). The results from the cluster analysis were compared with the genomic status as for the previous cohort of patients (FIG. 20c-e). Small clusters of rare phenotype were present within larger regions containing different phenotypes (FIGS. 20a and b, 19a and b). While the distribution of the different phenotypes varied from patient to patient, the majority of phenotypes consisted of a pERK+pAKT T308 signature raised proportionally in magnitude, with pAKT 308 signal levels being higher than pERK levels in all the clusters (FIG. 20d). While hierarchal analysis showed phenotype grouping of stromal tissue regions, similar to the analysis in FIG. 19, these tumors did not show clear relationship between phospho-phenotype with the corresponding genotype (wild type or E545K mutation).

In these examples the genotype information alone appears insufficient to predict phosphoprotein activation levels. These results highlight the potential of MTIP to provide phospho-proteomic information that complements existing genomic and IHC biomarker information.

Figure 21:
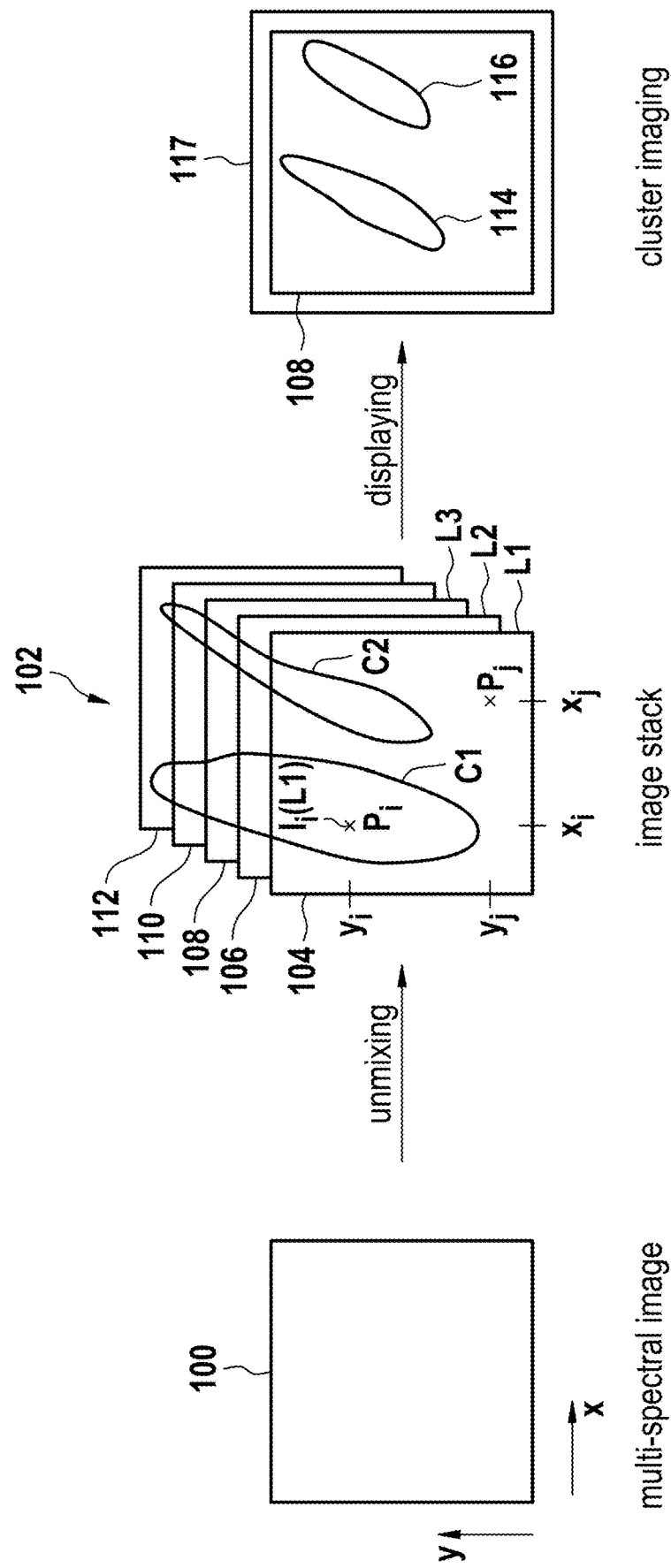
FIG. 21 is illustrative of an embodiment of an imaging method of the invention. A multi-spectral image 100 is provided in the x-y plane. The multi-spectral image 100 is unmixed by an unmixing operation in order to provide an image stack 102.

FIG. 21 is illustrative of an embodiment of an imaging method of the invention. A multi-spectral image 100 is provided in the x-y plane. The multi-spectral image 100 is unmixed by an unmixing operation in order to provide an image stack 102.

In the example considered here the number of channels n of the multi-spectral image 100 is n=5 such that the unmixing operation provides a number of n=5 layers L1 L2, L3, L4, L5 where each layer can be rendered as a respective single channel image. Hence, in the example considered here, the image stack 102 comprises a number of n=5 single channel images 104, 106, 108, 110 and 112. The image stack 102 that results from the unmixing operation creates a n+2 dimensional space where each point $P_i$ is given by its spatial coordinates in the x-y plane, i.e. $x_i$, $y_i$ and the respective intensity values on the n single channel images at the location $x_i$, $y_i$. For example, the intensity value on the L1 plane for point $P_i$ and hence the value of the third coordinate in the n+2 dimensional space of point $P_i$ is $I_i(L1)$, i.e. the intensity value on layer L1 at the location $x_i$, $y_i$. Likewise, the further coordinate values for point $P_i$ are given by $I_i(L2)$, (L3), $I_i(L4)$, and $I_i(L5)$. In other words, $$\text{point } P_i = (x_i, y_i, I_i(L2), I_i(L3), I_i(L4), I_i(L5)).$$

A clustering operation is then performed for clustering the points in the n+2 dimensional space given by the image stack 102 applying an unsupervised, non-parametric, density-based clustering algorithm, such as the mean-shift clustering algorithm. In the example considered here this provides a number of clusters, two of which are shown in FIG. 21 for illustrative purposes, namely the clusters C1 and C2. Each of the clusters that have been identified by the clustering algorithm contains a number of points of the image stack 102 that are relatively close in the n+2 dimensional space applying a suitable distance measure, such as an Euclidean distance measure, to measure the distance between two points $P_i$ and $P_j$ in the n+2 dimensional space.

For example, the heterogeneity of the cell sample from which the multi-spectral image 100 is obtained may be represented by the number of different clusters that are identified by the clustering algorithm. The result of the clustering can be visualized such as by entry of a user's selection of one of the single channel images 104-112, e.g. single channel image 108 which is rendered on a display device 117. The delimitations 114, 116 of the clusters C1 and C2 in the x-y plane are displayed as an overlay on the single channel image 108 by projecting the clusters C1 and C2 onto the x-y space. The resulting delimitations in the x-y space are shown by way of example as delimitation 114 for cluster C1 and delimitation 116 for cluster C2 on the display device 117.

In accordance with a further embodiment, the user may select multiple ones of the single channel images 104-112 such that these multiple single channel images are concurrently displayed on the display device. The delimitations 114 and 116 may be displayed on some or all of the displayed single channel images.

Embodiments of the invention are particularly advantageous as clusters that are not apparent to the human eye as they extend into the n+2 dimensional space that is hidden from the user's imagination become apparent due to the clustering in the n+2 dimensional space and subsequent cluster imaging in the x-y plane. In other words, embodiments of the invention enable to detect the existence of clusters in the image stack 102 that are formed across the layers of the image stack which provides critical information on the heterogeneity in a cell sample. The detection of such clusters, e.g. number of clusters and/or cluster locations, present important information on the basis of which conclusions on the state of the disease can be drawn, especially whether to administer a drug or not. For example, if the number of clusters is below a threshold, indicating a low degree of heterogeneity, this may suggest that administration of chemotherapy is not necessary. Further, the detection and imaging of cluster locations may provide important information for operation planning.

In accordance with an embodiment of the invention the points contained in the image stack 102 are low pass filtered by binning the points. For example, this can be implemented using a pxp square, such as a 2×2 square that is moved within the x-y plane. At each position of the pxp square an average for the intensity values of the points within that square is calculated per dimension and a single mean intensity value for each dimension is outputted for that position of the square which is then moved onto the next tile. Processing the entire image stack 102 in this way results in a reduction of the number of points by a factor of pxp. The reduced number of points results in a reduction of the execution time required for the clustering algorithm and a more stable clustering result due to the low pass filtering that eliminates noise. The result of the clustering, i.e. the delimitations 114 and 116, are then overlaid on the full resolution image, e.g. single channel image 108, as depicted in FIG. 21.

5. Discussion

The MTIP technology can capture and measure multiplexed phosphoprotein expression in cancer cell models and in clinical breast cancer tissues. We present a practical approach for identifying phenotypes and quantifying signaling pathway heterogeneity in breast cancer specimens using robust machine-learning pattern-recognition algorithms. We demonstrate the ability of the MTIP technology to provide relevant information about cellular phenotypes in characterized tumor samples; this information is inaccessible using current biomarkers by orthogonal approaches and therefore is complementary to existing biomarker and genomic information.

The PI3K pathway can be activated through several mechanisms including genomic mutations in PIK3Ca (found in ~30% of all breast cancers 8-10), loss of PTEN expression (e.g. via PTEN deletion or epigenetic silencing) and receptor tyrosine kinase (RTK) amplification (e.g. Her2 overexpression). Irregular PI3K pathway phosphorylation states are the consequence of PI3K pathway activation irrespective of the root of PI3K pathway alteration. Our experiments highlight the fact that PI3K pathway activation can stem from multiple inputs and indicates that prediction of phospho-activation phenotypes in diseased tissue is not easily performed using genotyping alone; the evaluation of PI3K pathway marker phosphorylation states using MTIP may therefore complement existing diagnostic tools.

Through heterogeneity analysis and phenotype clustering, the foregoing demonstrates the ability to resolve small, yet potentially important, populations of phenotypes that would be lost using conventional biochemical analysis. The results highlight the performance and relevance of MTIP in the proteomic quantification of network signaling pathway activation in the context of phenotypic heterogeneity. Phosphoexpression profiles derived from MTIP analysis may be correlated or compared with genomic and other biomarker information. In the context of PI3K signaling, several single agents targeting the PI3K pathway are under development and in various phases of clinical development (Hassan et al 2013; Fruman and Rommel Nat. Rev Drug Disco 2014). The foregoing results indicate that MTIP can identify patient specific phosphoexpression signatures that may impact personalized therapeutic decisions for inhibiting PI3K pathway activation. The future of successful targeted therapeutics, however, may rely on the use of pathway-specific inhibitors in various combinations (AL-Lazikani Nature Biotech 2012; Bozik et al 2013). In the context of multi-pathway phosphoexpression profiles (e.g. PI3K and MAPK as described in this work), MTIP can provide phospho-proteomic data that can contextualize the use of combination therapies on a per patient basis.

REFERENCES

Allan et al., *OMERO: flexible, model-driven data management for experimental biology*, Nature Methods Vol. 9, p. 245-253. (February 2012).

Ang et al., *Frequent phosphatidylinositol-3-kinase mutations in proliferative breast lesions*, Mod Pathol. 27(5): 740-50 (2014).

Ward, J. H., Jr. *Hierarchical Grouping to Optimize an Objective Function*, Journal of the American Statistical Association, 58, 236-244 (1963).

Gerdes, et al. 2013. Highly multiplexed single-cell analysis of formalin-fixed, paraffin-embedded cancer tissue. PNAS 110, 29 11982-11987

Giesen et al. 2013. Highly multiplexed imaging of tumor tissues with subcellular resolution by mass cytometry. Nat. Meth. 11, 417-422.

Qui et al. 2012. Extracting a Cellular Hierarchy from High-dimensional Cytometry Data with SPADE. Nat. Biotechnol. 29, 10: 886-891.

El-ad et al. 2014. viSNE enables visualization of high dimensional single-cell data and reveals phenotypic heterogeneity of leukemia. Nat. Biotechnol. 31, 6: 545-552.

Meric-Bernstam et al. 2014. Influence of Biospecimen Variables on Proteomic Biomarkers in Breast Cancer. Clin Cancer Res. 20: 3870-3883.

Comaniciu D and Meer P, "Mean Shift: A robust approach toward feature space analysis". IEEE Transactions on Pattern Analysis and Machine Intelligence. 2002. pp. 603-619.

Gerlinger et al. 2012. Intratumor Heterogeneity and Branched Evolution Revealed by Multiregion Sequencing. NEJM 366, 10: 883-892.

Yap et al. 2012. Intratumor Heterogeneity: Seeing the Wood for the Trees. Science Translational Medicine. 4, 127: 1-4.

Hirschfeld, T. (1976). Fellgett's Advantage in uv-VIS Multiplex Spectroscopy. Applied Spectroscopy 30, 1: 68-69

Perkins, W. D. (1987). Fourier Transform Infrared Spectroscopy Part II. Advantages of FT-IR. Topics in Chemical Instrumentation. 64, 11: A269-271.

Fellgett, P. B. (1958) J. Phys. Radium. 19, 187: 237

Jacquinot, P. (1954) Congres du GAMS, Paris

Malik, Z., Cabib, D., Buckwald, R. A., Talmi, A., Garini, Y., Lipson, S. G. (1996). Fourier transform multipixel spectroscopy for quantitative cytology. J. Microsc. 182, 2:133-140.

Svensson, M. A., LaFargue, C. J., MacDonald, T. Y., Pflueger, D., Kitabayashi, N., Santa-Cruz, A. M., Garsha, K. E., Sathyanarayana, U. G., Riley, J. P., Yun, C. S., Nagy, D., Kosmeder, J. W., Pestano, G. A., Tewari, A. K., Demichelis, F., Rubin, M. A. (2011). Testing mutual exclusivity of ETS rearranged prostate cancer. Nature Laboratory Investigation 91, 404-412.

Stéfan van der Walt, Johannes L. Schönberger, Juan Nunez-Inglesias, François Boulogne, Joshua D. Warner, Neil Yager, Emmanuelle Gouillart, Tony Yu and the scikit-image contributors. (2014). scikit-image: Image processing in Python. PeerJ 2:e453 http://dx.doi.org/10.7717/peerj.453\

Gerdes, et al. 2013. Highly multiplexed single-cell analysis of formalin-fixed, paraffin-embedded cancer tissue. PNAS 110, 29 11982-11987

Giesen et al. 2013. Highly multiplexed imaging of tumor tissues with subcellular resolution by mass cytometry. Nat. Meth. 11, 417-422.

Qui et al. 2012. Extracting a Cellular Hierarchy from High-dimensional Cytometry Data with SPADE. Nat. Biotechnol. 29, 10: 886-891.

El-ad et al. 2014. viSNE enables visualization of high dimensional single-cell data and reveals phenotypic heterogeneity of leukemia. Nat. Biotechnol. 31, 6: 545-552.

Meric-Bernstam et al. 2014. Influence of Biospecimen Variables on Proteomic Biomarkers in Breast Cancer. Clin Cancer Res. 20: 3870-3883.

Pinhel, I F, MacNeil, F A, Hills, M J, Salter, J, Detre, S, A'Hern, R, Nerurkar, A, Osin, P, Smith, I E, Dowsett, M (2010). Extreme loss of immunoreactive p-Akt and p-Erk1/2 during routine fixation of primary breast cancer. Breast Cancer Research 12:R76

Mertins, P, Yang, F, Liu, T, Mani, D R, Petyuk, V A, Gillette, M A, Clauser, K R, Qiao, J W, Gritsenko, M A, Moore, R J, Levine, D A, Townsend, R, Erdmann-Gilmore, P, Snider, J E, Davies, S R, Ruggles, K V, Fenyo, D, Kitchens, R T, Li, S, Olvera, N, Dao, F, Rodriguez, H, Chan, D W, Liebler, D, White, F, Rodland, K D, Mills, G B, Smith, R D, Paulovich, A G, Ellis, M, Carr, S A. 2014. Ischemia in tumors induces early and sustained phosphorylation changes in stress kinase pathways but does not affect global protein levels. Mol Cell Proteomics 13, 7: 1690-1704.

Chafin, D, Theiss, A, Roberts, E, Borlee, G, Otter, M, Baird, G S (2013). Rapid Two-Temperature Formalin Fixation. Plos One 8, 1: e54138.

Pedregosa, F, Varoquaux, G, Gramfort, A, Michel, V, Thirion, B, Grisel, O, Blondel, M, Prettenhofer, P, Weiss, R, Dubourg, V, Vanderplas, J, Passos, A, Cournapeau, D, Brucher, M, Perrot, M, Duchesnay, E. (2011). Scikit-learn: Machine Learning in Python. JMLR 12: 2825-2830

Fogh, J, Fogh, J M, Orfeo, T. (1977). One hundred and twenty-seven cultured human tumor cell lines producing tumors in nude mice. J Natl Cancer Inst 59:221-226.

Wagner, M K, Li, F, Li, J, Li, X-F, Le, C (2010). Use of quantum dots in the development of assays for cancer biomarkers. Anal Bioanal Chem 397:3213-3224.

Hu, P, Chu, G C-Y, Zhu, G, Yang, H, Luthrigner, D, Prins, G, Habib, F, Wang, Y, Wang, R, Chung, L W K, Zhau, H E. (2011). Multiplexed Quantum Dot Labeling of Activated c-Met Signaling in Castration-Resistant Human Prostate Cancer. PLoS ONE 6, 12: e28670

Tsurui, H, Nishimura, H, Hattori, S, Hirose, S, Okumura, K, Shirai, T. (2000). Seven-color fluorescence imaging of tissue samples based on fourier spectroscopy and singular value decomposition. J. Histochem. Cytochem. 48, 653-662.

Garini, Y, Gil, A, Bar-Am, I, Cabib, D, Katzlr, N (1999). Signal to noise analysis of multiple color fluorescence imaging microscopy. Cytometry, 35, 214-226.

Lansford, R, Bearman, G & Fraser, S E (2001). Resolution of multiple green fluorescent protein color variants and dyes using two-photon microscopy and imaging spectroscopy. J. Biomed. Opt. 6, 311-318.

Parimi et al., Automated Detection and Quantification of Prostate Cancer in Needle Biopsies by Digital Image Analysis, Open Journal of Pathology, Vol. 4, No. 3 (July 2014).

Nguyen et al., Automated Gland Segmentation and Classification for Gleason Grading of Prostate Tissue Images, 2010 20th International Conference on Pattern Recognition (ICPR), p. 1497-1500 (August 2010).

Ester et al., A density-based algorithm for discovering clusters in large spatial databases with noise", Proceedings of the Second International Conference on Knowledge Discovery and Data Mining (KDD-96), pp. 226-231 (AAAI Press 1996). ISBN 1-57735-004-9. CiteSeerX: 10.1.1.71.1980.

Frey & Dueck, Clustering by passing messages between data points, Science, Vol. 315, No. 5814, pp. 972-76 (2007).

Wolff et al., ASCO/CAP Guideline Recommendations for Human Epidermal Growth Factor Receptor 2 Testing in Breast Cancer, J. Clinical Oncology, Vol. 25, No. 1, p. 118-45 (epub Dec. 11, 2006).

Hammond et al., ASCO/CAP Guideline Recommendations for Immunohistochemical Testing of Estrogen and Progesterone Receptors in Breast Cancer, J. Clinical Oncology, Vol. 28, No. 16, p. 2784-95 (Apr. 19, 2010).

Beadling et al., Combining highly multiplexed PCR with semiconductor-based sequencing for rapid cancer genotyping. J Molecular Diagnostics, Vol. 15, pp. 171-76 (2013).

Rhodes et al., Characterization Of An Akt Kinase Inhibitor With Potent Pharmacodynamic And Antitumor Activity, Cancer Res., Vol. 68(7), pp. 2366-74. (Apr. 1, 2008).

Zong et al., ETS family transcription factors collaborate with alternative signaling pathways to induce carcinoma from adult murine prostate cells, Proc Natl Acad Sci, Vol. 106, pp. 12465-70 (2009).

Goldstein et al., Identification of a cell of origin for human prostate cancer, Science, Vol. 329, pp. 568-571 (2010).

Marusyk, et al., Intra-tumour heterogeneity: a looking glass for cancer?, Nature Reviews Cancer, Vol. 12, pp. 323-34 (May 2012).

The invention claimed is:

1. A method of characterizing heterogeneity in a cell sample comprising one or more analytes labeled with a detectable marker, the method comprising analyzing an image of the cell sample on a computer apparatus comprising a computer processor programmed to apply a cluster analysis to a dataset obtained from the image of the cell sample to create a cluster map comprising a plurality of clusters of expression patterns, wherein:
   (a) the dataset comprises an image stack for at least a portion of the image of the cell sample, wherein the image stack comprises a x-axis, a y-axis, and a z-axis, wherein the x-axis and the y-axis represent spatial coordinates within the portion of the image, and the z-axis comprises a number of n layers (L1, L2, L3 . . . , Ln), wherein each layer of the z-axis comprises intensity data for a single detectable marker at a plurality of x,y coordinates; and
   (b) the cluster analysis comprises applying an unsupervised, non-parametric, density-based clustering algorithm to the image stack, wherein the clustering algorithm clusters points $(P_i, P_j)$ defined by the dataset in at least a n+2 dimensional space, where each point is given by x,y coordinates and n intensity data values from the n layers at the respective x,y coordinate in the image stack, thereby generating the plurality of clusters, and
   (c) outputting of output data being representative of the result of the cluster analysis, the data being indicative of the heterogeneity in the cell sample,
wherein said dataset is obtained by a method comprising:
   (a1) calculating a field of view (FOV) sampling grid for each of a plurality of areas of interest (AOI) within the image;
   (a2) automatically collecting multi-spectral data and/or hyper-spectral data at single or multiple z-planes in each FOV;
   (a3) computationally segmenting detectable marker signals from the multi-spectral data and/or hyper-spectral data;
   (a4) selecting FOVs to be compared as a group in the cluster analysis into a dataset structure; and
   (a5) applying automatic morphological feature segmentation to each detectable marker signal of each FOV in the data set.

2. The method of claim 1, wherein the image is a multi-channel image and wherein the n layers are obtained by unmixing the multi-channel image.

3. The method of claim 1, wherein the outputting of the data is performed by displaying the multi-channel image and/or one or more single channel images, wherein a single channel image is given by displaying one of the n layers, by visualizing the delimitations of the clusters in the multi-channel image and/or the at least one single channel image.

4. The method of claim 1, further comprising generating a cluster histogram that indicates a proportional area for each cluster in the dataset, the cluster histogram being the data that is output in step c.

5. The method of claim 1, further comprising binning the points of the n+2 dimensional space for low pass filtering the image stack and reducing the x,y resolution to provide a binned image stack, wherein the cluster analysis in step b is performed on the binned image stack.

6. The method of claim 1, wherein the portion of the image is at least one FOV within at least one AOI of the cell sample.

7. The method of claim 1, wherein the output data comprises data indicative of the number of clusters in the result of the cluster analysis.

8. The method of claim 1, wherein the density based clustering algorithm is a Mean-Shift clustering algorithm, wherein an input to the Mean-Shift clustering algorithm is the image stack, and an output of the Mean-Shift algorithm is an x,y array where the x and y coordinates are spatial coordinates of the input image stack, and the value at each x,y coordinate is a label that indicates the cluster number to which a given x,y coordinate belongs.

9. The method of claim 1, wherein the image of the tissue sample is a refractive index contrast image of tissue anatomy that can be digitally rendered for annotation by a physician, and wherein the AOI is selected based on tissue anatomy.

10. The method of claim 1, wherein the FOV sampling grid comprises a plurality of FOVs at regularly spaced intervals across the AOI.

11. The method of claim 1, wherein the multi-spectral data and/or the hyper-spectral data from each FOV z-plane is automatically saved in a nested data structure or data base with metadata attributes to patient, assay, biopsy, section, AOI position, and/or FOV position.

12. The method of claim 1, wherein:
   (a4a) the FOVs selected to be compared as a group correspond to different tumor foci in the same tissue section; or
   (a4b) the FOVs are grouped on the basis of a biopsy taken from the same patient for comparison to a different biopsy taken from the same patient; or
   (a4c) the FOVs are grouped on the basis of tumor location; or
   (a4d) the FOVs are grouped based on the patient for comparison to another patient; or
   (a4e) the FOVs are grouped on the basis of tumor genotype.

13. The method of claim 1, wherein the morphological feature segmentation is based on size constraints, intensity constraints, or a combination of size constraints and intensity constraints.

14. The method of any of claim 1, wherein the method for obtaining the dataset further comprises:
   (a6) manually designating regions in one or more FOVs to include or exclude from the cluster analysis.

15. The method of claim 1, wherein the detectable marker generates a signal that is separable from other markers and tissue on basis of spectral or other physical characteristics when co-localized, and quantifiable.

16. The method of claim 15, wherein the detectable marker is attached to an antibody.

17. The method of claim 1, wherein the detectable label is attached to at least one antibody that specifically binds to at least one phosphorylated protein.

18. The method of claim 17, wherein the at least one phosphorylated protein is a member of a PI-3 kinase signal transduction pathway or a MAP kinase signal transduction pathway.

19. The method of claim 17, wherein the at least one phosphorylated protein is selected from the group consisting of AKT, PRAS40, S6, EIF4G, and ERK1/2.

20. A method of characterizing heterogeneity in a cell sample comprising one or more analytes labeled each with a detectable marker, the method comprising:
   (a) generating a field of view (FOV) image stack for each of a plurality of FOVs within one or more areas of interest (AOI) of the cell sample, wherein each FOV image stack of the plurality of FOV image stacks comprises a x-axis, a y-axis, and a z-axis, wherein the x-axis and the y-axis represent spatial coordinates within the field of view, and the z-axis comprises one or more layers, wherein each layer of the one or more layers of the z-axis comprises intensity data for a single detectable marker at a plurality of x,y-coordinates;
   (b) appending each FOV image stack of the plurality of FOV image stacks on one of an x-edge or a y-edge of another FOV image stack to generate a 3D tiled image that represents the entire AOI of the cell sample; and
   (c) applying an unsupervised, non-parametric, density-based clustering algorithm to the generated tiled image to compute an expression cluster map comprising a plurality of clusters, wherein each pixel in the expression cluster map is grouped into one cluster of the plurality of clusters, and where each cluster comprises a different expression pattern for each of the detectable markers.

* * * * *